(12) United States Patent
Mahaffey et al.

(10) Patent No.: US 10,122,747 B2
(45) Date of Patent: *Nov. 6, 2018

(54) RESPONSE GENERATION AFTER DISTRIBUTED MONITORING AND EVALUATION OF MULTIPLE DEVICES

(71) Applicant: LOOKOUT, INC., San Francisco, CA (US)

(72) Inventors: Kevin Patrick Mahaffey, San Francisco, CA (US); Timothy Micheal Wyatt, Toronto (CA); Brian James Buck, Livermore, CA (US); John Gunther Hering, San Francisco, CA (US); Amit Gupta, San Francisco, CA (US); Alex Cameron Abey, Livermore, CA (US)

(73) Assignee: LOOKOUT, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/660,864

(22) Filed: Jul. 26, 2017

(65) Prior Publication Data

US 2017/0339178 A1 Nov. 23, 2017

Related U.S. Application Data

(63) Continuation-in-part of application No. 14/099,737, filed on Dec. 6, 2013, now Pat. No. 9,753,796.

(51) Int. Cl.
*G06F 17/30* (2006.01)
*H04L 29/06* (2006.01)
(Continued)

(52) U.S. Cl.
CPC ......... *H04L 63/1425* (2013.01); *H04L 43/10* (2013.01); *H04L 67/16* (2013.01)

(58) Field of Classification Search
CPC ................. H04L 63/1425; G06F 11/0766
See application file for complete search history.

(56) References Cited

U.S. PATENT DOCUMENTS

| 3,416,032 A | 12/1968 | Jahns et al. |
| 4,553,257 A | 11/1985 | Mori et al. |
| (Continued) | | |

FOREIGN PATENT DOCUMENTS

| GB | 2430588 | 3/2007 |
| WO | 2005101789 | 10/2005 |
| (Continued) | | |

OTHER PUBLICATIONS

Notification of Transmittal of International Search Report and the Written Opinion on the International Searching Authority, or the Declaration, International Application No. PCT/US2014/68915, filing date Dec. 5, 2014, dated Mar. 2, 2015.

(Continued)

*Primary Examiner* — Syed H Hasan
(74) *Attorney, Agent, or Firm* — Dergosits & Noah LLP

(57) ABSTRACT

Data is collected from a set of devices according to a data collection policy. The data is associated with device configuration, device state, or device behavior. A norm is established using the collected data. A different data collection policy is established based on the norm. Data is collected from a particular device according to the different data collection policy. The norm is compared to the data collected from the particular device. If there is a deviation outside of a threshold deviation between the norm and the data collected from the particular device, a response is initiated.

20 Claims, 13 Drawing Sheets

(51) Int. Cl.
*H04L 12/26* (2006.01)
*H04L 29/08* (2006.01)

(56) References Cited

U.S. PATENT DOCUMENTS

| | | | |
|---|---|---|---|
| 5,319,776 A | 6/1994 | Hile et al. |
| 5,574,775 A | 11/1996 | Miller et al. |
| 5,715,518 A | 2/1998 | Barrere et al. |
| 6,185,689 B1 | 2/2001 | Todd et al. |
| 6,269,456 B1 | 7/2001 | Hodges et al. |
| 6,272,353 B1 | 8/2001 | Dicker et al. |
| 6,301,668 B1 | 10/2001 | Gleichauf et al. |
| 6,453,345 B2 | 9/2002 | Trcka et al. |
| 6,529,143 B2 | 3/2003 | Mikkola et al. |
| 6,654,801 B2 | 11/2003 | Mann et al. |
| 6,696,941 B2 | 2/2004 | Baker |
| 6,792,543 B2 | 9/2004 | Pak et al. |
| 6,836,655 B1 | 12/2004 | Watler et al. |
| 6,892,225 B1 | 5/2005 | Tu et al. |
| 6,907,530 B2 | 6/2005 | Wang |
| 6,959,184 B1 | 10/2005 | Byers et al. |
| 6,975,941 B1 | 12/2005 | Lau et al. |
| 7,020,895 B2 | 3/2006 | Albrecht |
| 7,023,383 B2 | 4/2006 | Stilp et al. |
| 7,069,589 B2 | 6/2006 | Schmall et al. |
| 7,096,368 B2 | 8/2006 | Kouznetsov et al. |
| 7,123,933 B2 | 10/2006 | Poor et al. |
| 7,127,455 B2 | 10/2006 | Carson et al. |
| 7,159,036 B2 | 1/2007 | Hinchliffe et al. |
| 7,159,237 B2 | 1/2007 | Schneier et al. |
| 7,171,690 B2 | 1/2007 | Kouznetsov et al. |
| 7,178,166 B1 | 2/2007 | Taylor et al. |
| 7,181,252 B2 | 2/2007 | Komsi |
| 7,210,168 B2 | 4/2007 | Hursey et al. |
| 7,228,566 B2 | 6/2007 | Caceres et al. |
| 7,236,598 B2 | 6/2007 | Sheymov et al. |
| 7,237,264 B1 | 6/2007 | Graham et al. |
| 7,266,810 B2 | 9/2007 | Karkare et al. |
| 7,290,276 B2 | 10/2007 | Ogata |
| 7,304,570 B2 | 12/2007 | Thomas et al. |
| 7,305,245 B2 | 12/2007 | Alizadeh-Shabdiz |
| 7,308,256 B2 | 12/2007 | Morota et al. |
| 7,308,712 B2 | 12/2007 | Banzhof |
| 7,325,249 B2 | 1/2008 | Sutton et al. |
| 7,346,605 B1 | 3/2008 | Hepworth |
| 7,356,835 B2 | 4/2008 | Gancarcik et al. |
| 7,376,969 B1 | 5/2008 | Njemanze et al. |
| 7,386,297 B2 | 6/2008 | An |
| 7,392,043 B2 | 6/2008 | Kouznetsov et al. |
| 7,392,543 B2 | 6/2008 | Szor |
| 7,397,424 B2 | 7/2008 | Houri |
| 7,397,434 B2 | 7/2008 | Mun et al. |
| 7,401,359 B2 | 7/2008 | Gartside et al. |
| 7,403,762 B2 | 7/2008 | Morgan et al. |
| 7,414,988 B2 | 8/2008 | Jones et al. |
| 7,415,270 B2 | 8/2008 | Wilhelmsson et al. |
| 7,415,536 B2 | 8/2008 | Nakazawa |
| 7,433,694 B2 | 10/2008 | Morgan et al. |
| 7,467,206 B2 | 12/2008 | Moore et al. |
| 7,471,954 B2 | 12/2008 | Brachet et al. |
| 7,472,422 B1 | 12/2008 | Agbabian |
| 7,474,897 B2 | 1/2009 | Morgan et al. |
| 7,493,127 B2 | 2/2009 | Morgan et al. |
| 7,493,403 B2 | 2/2009 | Shull |
| 7,502,620 B2 | 3/2009 | Morgan et al. |
| 7,515,578 B2 | 4/2009 | Alizadeh-Shabdiz |
| 7,525,541 B2 | 4/2009 | Chun et al. |
| 7,526,297 B1 | 4/2009 | Holur et al. |
| 7,526,541 B2 | 4/2009 | Roese et al. |
| 7,533,144 B2 | 5/2009 | Kassab |
| 7,539,882 B2 | 5/2009 | Jessup et al. |
| 7,551,579 B2 | 6/2009 | Alizadeh-Shabdiz |
| 7,551,929 B2 | 6/2009 | Alizadeh-Shabdiz |
| 7,634,800 B2 | 12/2009 | Ide et al. |
| 7,685,132 B2 | 3/2010 | Hyman |
| 7,696,923 B2 | 4/2010 | Houri |
| 7,761,583 B2 | 7/2010 | Shull |
| 7,768,963 B2 | 8/2010 | Alizadeh-Shabdiz |
| 7,769,396 B2 | 8/2010 | Alizadeh-Shabdiz et al. |
| 7,774,637 B1 | 8/2010 | Beddoe et al. |
| 7,783,281 B1 | 8/2010 | Cook et al. |
| 7,809,353 B2 | 10/2010 | Brown et al. |
| 7,809,366 B2 | 10/2010 | Rao et al. |
| 7,809,936 B2 | 10/2010 | Einloth et al. |
| 7,813,745 B2 | 10/2010 | Li |
| 7,818,017 B2 | 10/2010 | Alizadeh-Shabdiz et al. |
| 7,835,754 B2 | 11/2010 | Alizadeh-Shabdiz et al. |
| 7,856,234 B2 | 12/2010 | Alizadeh-Shabdiz et al. |
| 7,856,373 B2 | 12/2010 | Ullah |
| 7,861,303 B2 | 12/2010 | Kouznetsov et al. |
| 7,877,784 B2 | 1/2011 | Chow |
| 7,907,966 B1 | 3/2011 | Mammen |
| 7,916,661 B2 | 3/2011 | Alizadeh-Shabdiz et al. |
| 7,991,854 B2 | 8/2011 | Bahl |
| 7,999,742 B2 | 8/2011 | Alizadeh-Shabdiz et al. |
| 8,014,788 B2 | 9/2011 | Alizadeh-Shabdiz et al. |
| 8,019,357 B2 | 9/2011 | Alizadeh-Shabdiz et al. |
| 8,031,657 B2 | 10/2011 | Jones et al. |
| 8,037,203 B2 | 10/2011 | Accapadi et al. |
| 8,054,219 B2 | 11/2011 | Alizadeh-Shabdiz |
| 8,087,082 B2 | 12/2011 | Bloch et al. |
| 8,089,398 B2 | 1/2012 | Alizadeh-Shabdiz |
| 8,089,399 B2 | 1/2012 | Alizadeh-Shabdiz |
| 8,090,386 B2 | 1/2012 | Alizadeh-Shabdiz |
| 8,099,764 B2 | 1/2012 | Herzog et al. |
| 8,108,555 B2 | 1/2012 | Awadallah et al. |
| 8,121,617 B1 | 2/2012 | LaGrotta et al. |
| 8,126,456 B2 | 2/2012 | Lotter et al. |
| 8,127,158 B2 | 2/2012 | Jessup et al. |
| 8,127,358 B1 | 2/2012 | Lee |
| 8,135,395 B2 | 3/2012 | Cassett et al. |
| 8,195,196 B2 | 6/2012 | Haran et al. |
| 8,239,275 B1 | 8/2012 | Lyren |
| 8,259,568 B2 | 9/2012 | Laudermilch et al. |
| 8,261,351 B1 | 9/2012 | Thornewell et al. |
| 8,266,288 B2 | 9/2012 | Banerjee et al. |
| 8,266,324 B2 | 9/2012 | Baratakke et al. |
| 8,346,860 B2 | 1/2013 | Berg et al. |
| 8,356,080 B2 | 1/2013 | Luna et al. |
| 8,364,785 B2 | 1/2013 | Plamondon |
| 8,370,580 B2 | 2/2013 | Mobarak et al. |
| 8,370,933 B1 | 2/2013 | Buckler |
| 8,401,521 B2 | 3/2013 | Bennett et al. |
| 8,447,856 B2 | 5/2013 | Drako |
| 8,463,915 B1 | 6/2013 | Kim |
| 8,484,332 B2 | 7/2013 | Bush et al. |
| 8,504,775 B2 | 8/2013 | Plamondon |
| 2001/0044339 A1 | 11/2001 | Cordero et al. |
| 2002/0042886 A1 | 4/2002 | Lahti et al. |
| 2002/0087483 A1 | 7/2002 | Harif |
| 2002/0108058 A1 | 8/2002 | Iwamura |
| 2002/0124187 A1 | 9/2002 | Lyle |
| 2002/0156780 A1 | 10/2002 | Hertz |
| 2002/0178383 A1 | 11/2002 | Hrabik |
| 2002/0183060 A1 | 12/2002 | Ko et al. |
| 2002/0191018 A1 | 12/2002 | Broussard |
| 2002/0194473 A1 | 12/2002 | Pope |
| 2003/0028803 A1 | 2/2003 | Bunker et al. |
| 2003/0046134 A1 | 3/2003 | Frolick et al. |
| 2003/0079145 A1 | 4/2003 | Kouznetsov et al. |
| 2003/0115485 A1 | 6/2003 | Milliken et al. |
| 2003/0120951 A1 | 6/2003 | Gartside et al. |
| 2003/0131148 A1 | 7/2003 | Kelley et al. |
| 2003/0236990 A1* | 12/2003 | Hrastar ............... H04L 41/0893 726/11 |
| 2004/0022258 A1 | 2/2004 | Tsukada et al. |
| 2004/0024736 A1* | 2/2004 | Sakamoto ......... G06F 17/30371 |
| 2004/0025042 A1 | 2/2004 | Kouznetsov et al. |
| 2004/0058644 A1 | 3/2004 | Saigo et al. |
| 2004/0133624 A1 | 7/2004 | Park |
| 2004/0158741 A1 | 8/2004 | Schneider |
| 2004/0163079 A1 | 8/2004 | Noy |
| 2004/0185900 A1 | 9/2004 | McElveen |
| 2004/0199665 A1 | 10/2004 | Omar et al. |

(56) References Cited

U.S. PATENT DOCUMENTS

| | | |
|---|---|---|
| 2004/0209608 A1 | 10/2004 | Kouznetsov et al. |
| 2004/0215511 A1 | 10/2004 | Ehrich |
| 2004/0225887 A1 | 11/2004 | O'Neil et al. |
| 2004/0259532 A1 | 12/2004 | Isomaki et al. |
| 2005/0010821 A1 | 1/2005 | Cooper et al. |
| 2005/0015443 A1 | 1/2005 | Levine et al. |
| 2005/0037775 A1 | 2/2005 | Moeglein et al. |
| 2005/0044418 A1 | 2/2005 | Miliefsky |
| 2005/0074106 A1 | 4/2005 | Orlamunder et al. |
| 2005/0076246 A1 | 4/2005 | Singhal |
| 2005/0091308 A1 | 4/2005 | Bookman et al. |
| 2005/0125779 A1 | 6/2005 | Kelley et al. |
| 2005/0130627 A1 | 6/2005 | Calmels et al. |
| 2005/0138395 A1 | 6/2005 | Benco et al. |
| 2005/0138413 A1 | 6/2005 | Lippmann et al. |
| 2005/0138450 A1 | 6/2005 | Hsieh |
| 2005/0154796 A1 | 7/2005 | Forsyth |
| 2005/0183143 A1 | 8/2005 | Anderholm |
| 2005/0186954 A1 | 8/2005 | Kenney |
| 2005/0197099 A1 | 9/2005 | Nehushtan |
| 2005/0221800 A1 | 10/2005 | Jackson et al. |
| 2005/0227669 A1 | 10/2005 | Hapamas |
| 2005/0237970 A1 | 10/2005 | Inoue |
| 2005/0240999 A1 | 10/2005 | Rubin et al. |
| 2005/0254654 A1 | 11/2005 | Rockwell |
| 2005/0261919 A1 | 11/2005 | Kundtz |
| 2005/0278777 A1 | 12/2005 | Loza |
| 2005/0282533 A1 | 12/2005 | Draluk et al. |
| 2006/0026283 A1 | 2/2006 | Trueba |
| 2006/0026467 A1 | 2/2006 | Nehab |
| 2006/0073820 A1 | 4/2006 | Craswell et al. |
| 2006/0075388 A1 | 4/2006 | Kelley et al. |
| 2006/0080680 A1 | 4/2006 | Anwar et al. |
| 2006/0095454 A1 | 5/2006 | Shankar et al. |
| 2006/0095965 A1 | 5/2006 | Phillips et al. |
| 2006/0101518 A1 | 5/2006 | Schumaker et al. |
| 2006/0130145 A1 | 6/2006 | Choi et al. |
| 2006/0150238 A1 | 7/2006 | D'Agostino |
| 2006/0150256 A1 | 7/2006 | Fanton et al. |
| 2006/0161628 A1 | 7/2006 | Nagy |
| 2006/0179485 A1 | 8/2006 | Longsine et al. |
| 2006/0217115 A1 | 9/2006 | Cassett et al. |
| 2006/0218482 A1 | 9/2006 | Ralston et al. |
| 2006/0224742 A1 | 10/2006 | Shahbazi |
| 2006/0236325 A1 | 10/2006 | Rao et al. |
| 2006/0253205 A1 | 11/2006 | Gardiner |
| 2006/0253584 A1 | 11/2006 | Dixon et al. |
| 2006/0272011 A1 | 11/2006 | Ide et al. |
| 2006/0277408 A1 | 12/2006 | Bhat et al. |
| 2006/0294582 A1 | 12/2006 | Linsley-Hood et al. |
| 2007/0005327 A1 | 1/2007 | Ferris |
| 2007/0011319 A1 | 1/2007 | Mcclure et al. |
| 2007/0015519 A1 | 1/2007 | Casey |
| 2007/0016953 A1 | 1/2007 | Morris et al. |
| 2007/0016955 A1 | 1/2007 | Goldberg et al. |
| 2007/0021112 A1 | 1/2007 | Byrne et al. |
| 2007/0028095 A1 | 2/2007 | Allen et al. |
| 2007/0028303 A1 | 2/2007 | Brennan |
| 2007/0028304 A1 | 2/2007 | Brennan |
| 2007/0038677 A1 | 2/2007 | Reasor et al. |
| 2007/0050471 A1 | 3/2007 | Patel et al. |
| 2007/0064636 A9 | 3/2007 | Koch et al. |
| 2007/0086476 A1 | 4/2007 | Iglesias et al. |
| 2007/0089165 A1 | 4/2007 | Wei et al. |
| 2007/0090954 A1 | 4/2007 | Mahaffey |
| 2007/0118669 A1 | 5/2007 | Rand et al. |
| 2007/0129114 A1 | 6/2007 | Small et al. |
| 2007/0129136 A1 | 6/2007 | Walker |
| 2007/0130330 A1 | 6/2007 | Ridel |
| 2007/0154014 A1 | 7/2007 | Aissi et al. |
| 2007/0174472 A1 | 7/2007 | Kulakowski |
| 2007/0174490 A1 | 7/2007 | Choi et al. |
| 2007/0186282 A1 | 8/2007 | Jenkins |
| 2007/0190995 A1 | 8/2007 | Wang et al. |
| 2007/0206633 A1 | 9/2007 | Melamed |
| 2007/0214245 A1 | 9/2007 | Hamalainen et al. |
| 2007/0214504 A1 | 9/2007 | Milani Comparetti et al. |
| 2007/0220608 A1 | 9/2007 | Lahti et al. |
| 2007/0240127 A1 | 10/2007 | Roques et al. |
| 2007/0240218 A1 | 10/2007 | Tuvell et al. |
| 2007/0240221 A1 | 10/2007 | Tuvell et al. |
| 2007/0240222 A1 | 10/2007 | Tuvell et al. |
| 2007/0248047 A1 | 10/2007 | Shorty et al. |
| 2007/0250627 A1 | 10/2007 | May et al. |
| 2007/0253377 A1 | 11/2007 | Janneteau et al. |
| 2007/0293263 A1 | 12/2007 | Eslambolchi et al. |
| 2007/0297610 A1 | 12/2007 | Chen et al. |
| 2008/0028470 A1 | 1/2008 | Remington et al. |
| 2008/0046369 A1 | 2/2008 | Wood |
| 2008/0046557 A1 | 2/2008 | Cheng |
| 2008/0047007 A1 | 2/2008 | Satkunanathan et al. |
| 2008/0049653 A1 | 2/2008 | Demirhan et al. |
| 2008/0065507 A1 | 3/2008 | Morrison et al. |
| 2008/0070495 A1 | 3/2008 | Stricklen et al. |
| 2008/0072329 A1 | 3/2008 | Herschaft et al. |
| 2008/0086638 A1 | 4/2008 | Mather |
| 2008/0086773 A1 | 4/2008 | Tuvell et al. |
| 2008/0086776 A1 | 4/2008 | Tuvell et al. |
| 2008/0096531 A1 | 4/2008 | McQuaide et al. |
| 2008/0109871 A1 | 5/2008 | Jacobs |
| 2008/0127171 A1 | 5/2008 | Tarassov |
| 2008/0127179 A1 | 5/2008 | Moss et al. |
| 2008/0127334 A1 | 5/2008 | Gassoway |
| 2008/0127336 A1 | 5/2008 | Sun et al. |
| 2008/0132218 A1 | 6/2008 | Samson et al. |
| 2008/0134281 A1 | 6/2008 | Shinde et al. |
| 2008/0140767 A1 | 6/2008 | Rao et al. |
| 2008/0148381 A1 | 6/2008 | Aaron |
| 2008/0165952 A1 | 7/2008 | Smith |
| 2008/0172746 A1 | 7/2008 | Lotter et al. |
| 2008/0178294 A1 | 7/2008 | Hu et al. |
| 2008/0181116 A1 | 7/2008 | Kavanaugh et al. |
| 2008/0186162 A1 | 8/2008 | Rajan et al. |
| 2008/0196104 A1 | 8/2008 | Tuvell et al. |
| 2008/0200160 A1 | 8/2008 | Fitzpatrick et al. |
| 2008/0208786 A1 | 8/2008 | Serrano-Morales |
| 2008/0208950 A1 | 8/2008 | Kim et al. |
| 2008/0209557 A1 | 8/2008 | Herley et al. |
| 2008/0235801 A1 | 9/2008 | Soderberg et al. |
| 2008/0268870 A1 | 10/2008 | Houri |
| 2008/0274723 A1 | 11/2008 | Hook et al. |
| 2008/0276111 A1 | 11/2008 | Jacoby et al. |
| 2008/0281691 A1 | 11/2008 | Pearson |
| 2008/0293396 A1 | 11/2008 | Barnes et al. |
| 2008/0307243 A1 | 12/2008 | Lee |
| 2008/0318562 A1 | 12/2008 | Featherstone et al. |
| 2008/0320312 A1 | 12/2008 | Duffus |
| 2009/0042598 A1 | 2/2009 | Blinnikka et al. |
| 2009/0043657 A1 | 2/2009 | Swift |
| 2009/0064330 A1 | 3/2009 | Shraim |
| 2009/0068994 A1 | 3/2009 | Murphy |
| 2009/0070283 A1 | 3/2009 | Kang et al. |
| 2009/0106778 A1 | 4/2009 | Pomeroy et al. |
| 2009/0119143 A1 | 5/2009 | Silver |
| 2009/0131080 A1 | 5/2009 | Nadler |
| 2009/0172227 A1 | 7/2009 | Taylor et al. |
| 2009/0199298 A1 | 8/2009 | Miliefsky |
| 2009/0205016 A1 | 8/2009 | Milas |
| 2009/0205047 A1 | 8/2009 | Podjarny |
| 2009/0248623 A1 | 10/2009 | Adelman et al. |
| 2009/0249497 A1 | 10/2009 | Fitzgerald |
| 2009/0253410 A1 | 10/2009 | Fitzgerald et al. |
| 2009/0292487 A1 | 11/2009 | Duncan et al. |
| 2009/0293125 A1 | 11/2009 | Szor |
| 2009/0300763 A1 | 12/2009 | Harvey et al. |
| 2009/0318197 A1 | 12/2009 | Ron et al. |
| 2010/0011029 A1 | 1/2010 | Niemela |
| 2010/0019731 A1 | 1/2010 | Connolly et al. |
| 2010/0064341 A1 | 3/2010 | Aldera |
| 2010/0088173 A1 | 4/2010 | Kulla |
| 2010/0088398 A1 | 4/2010 | Plamondon |
| 2010/0097494 A1 | 4/2010 | Gum et al. |
| 2010/0100591 A1 | 4/2010 | Mahaffey et al. |
| 2010/0100939 A1 | 4/2010 | Mahaffey et al. |

(56) References Cited

U.S. PATENT DOCUMENTS

| | | |
|---|---|---|
| 2010/0100959 A1 | 4/2010 | Mahaffey |
| 2010/0100963 A1 | 4/2010 | Mahaffey et al. |
| 2010/0100964 A1 | 4/2010 | Mahaffey et al. |
| 2010/0115092 A1 | 5/2010 | Westin |
| 2010/0138501 A1 | 6/2010 | Clinton et al. |
| 2010/0151817 A1 | 6/2010 | Lidstrom |
| 2010/0154032 A1 | 6/2010 | Ollmann |
| 2010/0173658 A1 | 7/2010 | Fan et al. |
| 2010/0210240 A1 | 8/2010 | Mahaffey et al. |
| 2010/0212010 A1 | 8/2010 | Stringer et al. |
| 2010/0240419 A1 | 9/2010 | Horino |
| 2010/0241739 A1 | 9/2010 | Reus et al. |
| 2010/0313270 A1 | 12/2010 | Kim et al. |
| 2010/0317324 A1 | 12/2010 | Brown et al. |
| 2010/0332593 A1 | 12/2010 | Barash et al. |
| 2010/0332680 A1 | 12/2010 | Anderson et al. |
| 2011/0047033 A1 | 2/2011 | Mahaffey et al. |
| 2011/0047594 A1 | 2/2011 | Mahaffey et al. |
| 2011/0047597 A1 | 2/2011 | Mahaffey et al. |
| 2011/0047620 A1 | 2/2011 | Mahaffey et al. |
| 2011/0113242 A1 | 5/2011 | McCormack |
| 2011/0119765 A1 | 5/2011 | Hering et al. |
| 2011/0145920 A1 | 6/2011 | Burgess et al. |
| 2011/0171923 A1 | 7/2011 | Daly et al. |
| 2011/0213869 A1 | 9/2011 | Korsunsky |
| 2011/0241872 A1 | 10/2011 | Mahaffey |
| 2011/0276961 A1 | 11/2011 | Johansson et al. |
| 2011/0286437 A1 | 11/2011 | Austin et al. |
| 2011/0296510 A1 | 12/2011 | Hatlelid et al. |
| 2012/0042382 A1 | 2/2012 | Mahaffey |
| 2012/0060222 A1 | 3/2012 | Burgess et al. |
| 2012/0069131 A1 | 3/2012 | Abelow |
| 2012/0072569 A1 | 3/2012 | Xu |
| 2012/0084836 A1 | 4/2012 | Mahaffey et al. |
| 2012/0084864 A1 | 4/2012 | Mahaffey et al. |
| 2012/0096555 A1 | 4/2012 | Mahaffey |
| 2012/0110174 A1 | 5/2012 | Mahaffey et al. |
| 2012/0110345 A1 | 5/2012 | Pigeon |
| 2012/0110633 A1 | 5/2012 | An et al. |
| 2012/0124239 A1 | 5/2012 | Shribman et al. |
| 2012/0159636 A1 | 6/2012 | Pandya et al. |
| 2012/0164982 A1 | 6/2012 | Klein |
| 2012/0179801 A1 | 7/2012 | Luna et al. |
| 2012/0179814 A1 | 7/2012 | Swildens et al. |
| 2012/0188064 A1 | 7/2012 | Mahaffey et al. |
| 2012/0192016 A1* | 7/2012 | Gotesdyner ......... H04L 12/6418 714/47.3 |
| 2012/0196571 A1 | 8/2012 | Grkov et al. |
| 2012/0215938 A1 | 8/2012 | Fletcher et al. |
| 2012/0233656 A1 | 9/2012 | Rieschick et al. |
| 2012/0233695 A1 | 9/2012 | Mahaffey et al. |
| 2012/0246499 A1 | 9/2012 | Jessup et al. |
| 2012/0255010 A1 | 10/2012 | Sallam |
| 2012/0259954 A1 | 10/2012 | McCarthy et al. |
| 2012/0278467 A1 | 11/2012 | Schneider |
| 2012/0291133 A1 | 11/2012 | Nagpal et al. |
| 2012/0303735 A1 | 11/2012 | Raciborski et al. |
| 2012/0317153 A1 | 12/2012 | Parthasarathy et al. |
| 2012/0317233 A1 | 12/2012 | Redpath |
| 2012/0317370 A1 | 12/2012 | Luna |
| 2012/0324076 A1 | 12/2012 | Zerr et al. |
| 2012/0324094 A1 | 12/2012 | Wyatt et al. |
| 2012/0324259 A1 | 12/2012 | Aasheim et al. |
| 2012/0324568 A1 | 12/2012 | Wyatt et al. |
| 2013/0013775 A1 | 1/2013 | Baumback et al. |
| 2013/0019311 A1 | 1/2013 | Swildens et al. |
| 2013/0023209 A1 | 1/2013 | Fisher et al. |
| 2013/0031600 A1 | 1/2013 | Luna et al. |
| 2013/0041946 A1 | 2/2013 | Joel et al. |
| 2013/0041974 A1 | 2/2013 | Luna et al. |
| 2013/0047034 A1 | 2/2013 | Salomon et al. |
| 2013/0054796 A1 | 2/2013 | Baumback et al. |
| 2013/0067054 A1 | 3/2013 | Pulleyn et al. |
| 2013/0086682 A1 | 4/2013 | Mahaffey et al. |
| 2013/0137376 A1 | 5/2013 | Fitzgerald et al. |
| 2013/0157692 A1 | 6/2013 | Hall et al. |
| 2013/0232433 A1 | 9/2013 | Krajec et al. |
| 2014/0105003 A1 | 4/2014 | Austin et al. |
| 2014/0259092 A1 | 9/2014 | Boucher et al. |
| 2014/0281548 A1 | 9/2014 | Boyer et al. |
| 2014/0282860 A1 | 9/2014 | Efrati |
| 2014/0331294 A1 | 11/2014 | Ramallo |
| 2014/0378117 A1 | 12/2014 | Vendrow et al. |
| 2015/0026600 A1 | 1/2015 | Dunn et al. |
| 2015/0172311 A1 | 6/2015 | Freedman et al. |
| 2016/0112445 A1 | 4/2016 | Abramowitz |
| 2017/0339178 A1* | 11/2017 | Mahaffey ............ H04L 63/1425 |

FOREIGN PATENT DOCUMENTS

| | | |
|---|---|---|
| WO | 2006110181 | 10/2006 |
| WO | 2007081356 | 7/2007 |
| WO | 2008007111 | 1/2008 |
| WO | 2008057737 | 5/2008 |
| WO | 2010048218 | 4/2010 |
| WO | 2010048220 | 4/2010 |
| WO | 2012027588 | 1/2012 |
| WO | 2013089576 A1 | 6/2013 |

OTHER PUBLICATIONS

Richardson, Alexis, "Introduction to RabbitMQ", Google UK, available at http://www.rabbitmq.com/resources/google-tech-talk-final/alexis-google-rabbitmq-talk.pdf, retrieved on Mar. 30, 2012, 33 pages, published on Sep. 25, 2008.

Fisher, Oliver, "Malware? We Don't Need No Stinking Malware!", Google, available at http://googlewebmastercentral.blogspot.com/2008/10/malware-we-dont-need-no-stinking.html, retrieved on Mar. 30, 2012, published on Oct. 24, 2008, 11 pages.

Reardon, Marguerite, "Mobile Phones That Track Your Buddies," Cnet, available at <http://news.cnet.com/Mobile-phones-that-track-your-buddies/2100-1039_3-6135209.html, retrieved Mar. 30, 2012, published on Nov. 14, 2006, 6 pages.

Fette, Ian "Understanding Phishing and Malware Protection in Google Chrome," The Chromium Blog, available at http://blog.chromium.org/2008_11_01_archive.html, retrieved on May 17, 2011, published on Nov. 14, 2008, 6 pages.

Kincaid, Jason "Urban Airship Brings Easy Push Notifications to Android," TechCrunch, available at http://techcrunch.com/2010/08/10/urban-airship-brings-easy-push-notifications-to-android/, retrieved on Jun. 16, 2011, published on Aug. 10, 2010, 5 pages.

Keane, Justin K. "Using the Google Safe Browsing API from PHP," Mad Irish, Aug. 7, 2009, available at http://www.madirish.net/node/245, retrieved Mar. 30, 2012, published on Aug. 7, 2009, 5 pages.

Jefferies, Charles P. "Webroot AntiVirus 2010 With Spy Sweeper Review," Notebook Review, available at http://wwww.notebookreview.com/default.asp?newsID=5700&review=Webroot+AntiVirus+2010+With+Spy+Sweeper+Review, retrieved on May 18, 2011, published on Jun. 22, 2010, 3 pages.

"Berry Locator", available at http://www.mobireport.com/apps/bl/, retrieved on Aug. 10, 2011, published Feb. 8, 2008.

Wikipedia, "Firefox Browser", available at http://en.wikipedia.org/wiki/Firefox_browser, retrieved on Aug. 10, 2011, published on Dec. 15, 2005.

F-Secure, "F-Secure Mobile Security for S60 Users Guide", pp. 1-34, retrieved on Aug. 10, 2011, published on Jan. 26, 2009.

Wikipedia, "Java Virtual Machine", available at http://en.wikipedia.org/wiki/Java_virtual_machine, retrieved on Aug. 10, 2011, published on Dec. 9, 2003.

Kaspersky "Kaspersky Mobile Security", available at http://usa.kaspersky.com/products-services/home-computer-security, published on Jan. 1, 2007, retrieved on Oct. 21, 2008.

"Kaspersky Mobile Security", Kaspersky Lab 2008, available at http://www.kaspersky.com/kaspersky_mobile_security, retrieved on Sep. 11, 2008, published on Jun. 22, 2010, 3 Pages.

Symantec, "Symantec Norton Smartphone Security", available at http://www.symantec.com/norton/smartphone_security, retrieved on Oct. 21, 2008, published on Jan. 1, 2007.

(56) References Cited

OTHER PUBLICATIONS

"PhoneBak PDA Phone Anti-theft software for your PDA phone", 2007, Bak2u Pte Ltd (Singapore) pp. 1-4.

"PhoneBak: Mobile Phone Theft Recovery Software", 2007, Westin Tech.

Symantec, "Symantec Endpoint Security, Data Sheet and Product Screen Shot", retrieved on Oct. 21, 2008, published on Jun. 15, 2008.

Symantec, "Symantec Mobile Security Suite for Windows Mobile, Data Sheet and Product Screen Shot", available at http://www.symantec.com/norton/smartphone_security, retrieved on Oct. 21, 2008, published on Mar. 1, 2008.

TippingPoint "TippingPoint Security Management System (SMS)", available at http://www.tippingpoint.com/products_sms.html, retrieved on Oct. 21, 2008, published on Mar. 31, 2005, 2 pages.

Summerson, Cameron "5 Android Antivirus Apps Compared, Find Out Which Ones Are Worth Having!," Android Headlines, available at http://androidheadlines.com/2011/03/5-android-antivirus-apps-comapred-find-out-which-ones-are-worth-having.html, retrieved on Mar. 30, 2012, published on Mar. 8, 2011, 9 pages.

"Android Cloud to Device Messaging Framework," Google Code Labs, available at http://code.google.com/android/c2dm/, retrieved on Sep. 14, 2011, published on Apr. 11, 2011, 9 pages.

"BlackBerry Push Service Overview," available at http://us.blackberry.com/developers/platform/pushapi.isp#tab_tab_resources, retrieved on Sep. 14, 2011, published on Nov. 6, 2010, 21 pages.

"eSoft unveils SiteFilter 3.0 for OEMs," Infosecurity, Mar. 23, 2010, available at http://www.infosecurity-magazine.com/view/8273/esoft-unveils-sitefilter-30-for-oems/, retrieved on Mar. 30, 2012, published on Mar. 23, 2010, 2 pages.

"Get the Physical Location of Wireless Router From its MAC Address (BSSID)," Coderrr, available at http://coderrr.wordpress.com/2008/09/10/get-the-physical-location-of-wireless-router-from-its-mac-address-bssid/, retrieved on Mar. 30, 2012, published on Sep. 12, 2008, 13 pages.

"Hooking—Wikipedia, the Free Encyclopedia," Wikipedia, available at http://web.archive.org/web/20100415154752/http://en.wikipedia.org/wiki/Hooking, retrieved Mar. 30, 2012, published on Apr. 15, 2010, 6 pages.

Mytton, David "How to Build an Apple Push Notification Provider Server (Tutorial)," Server Density, available at http://blog.serverdensity.com/2009/07/10/how-to-build-an-apple-push-notification-provider-server-tutorial/, retrieved on Apr. 2, 2012, published on Jul. 10, 2009, 33 pages.

"Pidgin the Universal Chat Client," Pidign, available at http://www.pidgin.im/, retrieved Sep. 14, 2011, published on May 1, 2007, 14 pages.

Pogue, David "Simplifying the Lives of Web Users," The New York Times, available at http://www.nytimes.com/2010/08/19/technology/personaltech/19pogue.html, retrieved May 17, 2011, Published on Aug. 18, 2010, 5 pages.

"Twilio Cloud Communications Web Service API for Building Voice and SMS Applications," Twilio, available at http://www.twilio.com, retrieved Sep. 14, 2011, published on Jun. 5, 2008, 12 pages.

"Understanding Direct Push," Microsoft, Feb. 18, 2009, available at http://technet.microsoft.com/en-us/library/aa997252(v=exchg.80).aspx, retrieved on Mar. 30, 2012, published on Feb. 18, 2009, 3 pages.

"Urban Airship: Powering Modern Mobile," available at http://urbanairship.com/products/, retrieved on Sep. 16, 2011, published on Feb. 19, 2010, 14 pages.

"zVeloDB URL Database," zVelo, available at https://zvelo.com/technology/zvelodb-url-database, retrieved Mar. 30, 2012, published on Jan. 21, 2012, 2 pages.

"Amazon.com: Mining the Web Discovering Knowledge from Hypertext Data (9781558607545): Soumen Chakrabarti: Books", Amazon available at http://www.amazon.com/exec/obidos/ASIN/1558607544/, retrieved on Jun. 7, 2012, published on Dec. 13, 2001, pp. 1-7.

Clickatell, available at http://www.clickatell.com, retrieved Sep. 14, 2011, published on Jan. 18, 2011, 11 pages.

Dashwire: Manage Your Cell Phone on the Web, News Blog, with Jessica Dolocourt, Oct. 29, 2007, 5:00am PDT <http://news.cnet.com/8301-10784_3-9805657-7.html> retrieved Jun. 15, 2009; pp. 1-3.

Diligenti, M., et al. Focused Crawling Using Context Graphs:, Proceedings of the 26th VLDB Conference, Cairo, Egypt, pp. 1-8, available at www.vldb.org/conf/2000/P257.pdf, retrieved on Oct. 21, 2008, published on Sep. 10, 2000.

Grafio "Stay Secure", available at http://widgets.opera.com/widget/4405/, retrieved Oct. 21, 2008, published on Sep. 29, 2008.

McAfee, Internet Archive, Way Back Machine, available at <http://web.archive.org/web/20080611095201/www.qualys.com/solutions/vulnerability_management>retrieved Feb. 24, 2011, 1 page.

HTC "Mobile Wipe Smart Phone Management", pp. 1-4, published on Dec. 5, 2007, retrieved on Dec. 5, 2007.

PagerDuty, available at http://www.pagerduty.com, retrieved on Sep. 14, 2011, published on Jun. 6, 2009, 23 pages.

PCT "International Search Report and Written Opinion of the International Searching Authority for PCT/US2009/061370", dated Dec. 14, 2009.

PCT "International Search Report and Written Opinion of the International Searching Authority for PCT/US2009/061372", dated Mar. 24, 2010; received on Mar. 29, 2010.

PCT, "International Search Report and Written Opinion of the International Searching Authority for PCT/US2011/049182", dated Dec. 23, 2011.

Prey, available at http://preyproject.com/, retrieved Jan. 10, 2012, published on May 16, 2009, 4 pages.

Qualys, "Executive Dashboard," Internet Archive, Way back Machine, availble at <http://web.archive.org/web20080507161417/www.qualys.com/products/screens/?screen=Executive + Dashboard>, retrieved Feb. 23, 2011, 1 page.

Qualys, "Vulnerability Management," Internet Archive, Way Back Machine, available at <http://web.archive.org/web/20080611095201/www.qualys.com/solutions/vulnerability_management> Retrieved Feb. 24, 2011, 1 page.

Real World Computing, Jun. 16, 2008 (PC Pro), pp. 1-2.

Simone, "Playing with ActiveMQ," Mostly Useless, available at http://www.mostly-useless.com/blog/2007/12/27/playing-with-activemq/, retrieved Mar. 30, 2012, published on Dec. 27, 2007, 6 pages.

Teh, Joe, "Norton 360 Version 3.0 Review," Mar. 9, 2009, Available at <http://techielobang-com/blog/2009/03/09/norton-360-version-30-review/> Retrieved Feb. 23, 2011, 12 pages.

Trillian, available at http://www.trillian.im/, retrieved on Sep. 14, 2011, published on Oct. 11, 2007, 24 pages.

Non-Final Office Action dated Apr. 14, 2011 for U.S. Appl. No. 12/255,614, filed Oct. 21, 2008; pp. 1-6.

Non-Final Office Action dated Apr. 13, 2011 for U.S. Appl. No. 12/255,621, filed Oct. 21, 2008; pp. 1-7.

Final Office Action dated Feb. 1, 2011 for U.S. Appl. No. 12/255,626, filed Oct. 21, 2008; pp. 1-18.

Non-Final Office Action dated Mar. 24, 2011 for U.S. Appl. No. 12/255,635, filed Oct. 21, 2008; pp. 1-17.

Notice of Allowance dated Nov. 3, 2011 for U.S. Appl. No. 12/255,632, filed Oct. 21, 2008; pp. 1-5.

Non-Final Office Action dated Apr. 13, 2011 for U.S. Appl. No. 12/255,632, filed Oct. 21, 2008; pp. 1-7.

Non-Final Office Action dated Dec. 26, 2012 for U.S. Appl. No. 13/160,382, filed Jun. 14, 2011; pp. 1-23.

U.S. Appl. No. 12/372,719, entitled "System and Method for Remotely Securing or Recovering a Mobile Device," filed Feb. 17, 2009, now U.S. Pat. No. 8,467,768.

U.S. Appl. No. 13/423,036, entitled "System and Method for Remotely Initiating Playing of Sound on a Mobile Device," filed Mar. 16, 2012.

U.S. Appl. No. 14/051,343, entitled "Systems and Methods for Locking and Disabling a Device in Response to a Request," filed Oct. 10, 2013, now U.S. Pat. No. 9,179,434.

(56) References Cited

OTHER PUBLICATIONS

U.S. Appl. No. 13/842,884, entitled "Systems and Methods for Device Broadcast of Location Information When Battery is Low," filed Mar. 15, 2013, now U.S. Pat. No. 8,682,400.
U.S. Appl. No. 14/050,804, entitled "Systems and Methods for Applying a Security Policy to a Device Based on Location," filed Oct. 10, 2013, now U.S. Pat. No. 9,167,550.
U.S. Appl. No. 14/050,644, entitled "Systems and Methods for Displaying Location Information of a Device," filed Oct. 10, 2013, now U.S. Pat. No. 9,100,925.
U.S. Appl. No. 14/051,261, entitled "Systems and Methods for Applying a Security Policy to a Device Based on a Comparison of Locations," filed Oct. 10, 2013, now U.S. Pat. No. 8,825,007.
U.S. Appl. No. 14/051,373, entitled "Systems and Methods for Transmitting a Communication Based on a Device Leaving or Entering an Area," filed Oct. 10, 2013, now U.S. Pat. No. 8,774,788.
U.S. Appl. No. 13/849,379, entitled "Systems and Methods for Remotely Controlling a Lost Mobile Communications Device," filed Mar. 22, 2013, now U.S. Pat. No. 8,929,874.
U.S. Appl. No. 14/937,781, entitled "Methods and Systems for Addressing Mobile Communications Devices That Are Lost or Stolen But Not Yet Reported As Such," filed Nov. 10, 2015, now U.S. Pat. No. 8,051,480.
U.S. Appl. No. 12/868,669, entitled "System and Method for Server-Coupled Malware Prevention," filed Aug. 25, 2010, now U.S. Pat. No. 8,347,386.
U.S. Appl. No. 13/460,549, entitled "System and Method for Server-Coupled Application Re-Analysis," filed Apr. 30, 2012, now U.S. Pat. No. 8,544,095.
U.S. Appl. No. 13/461,054, entitled "System and Method for Server-Coupled Application Re-Analysis to Obtain Characterization Assessment," filed May 1, 2012, now U.S. Pat. No. 8,745,739.
U.S. Appl. No. 13/461,984, entitled "System and Method for Server-Coupled Application Re-Analysis to Obtain Trust, Distribution and Rating Assessment," filed May 2, 2012, now U.S. Pat. No. 8,752,176.
U.S. Appl. No. 13/689,588, entitled "System and Method for Preventing Malware on a Mobile Communication Device," filed Nov. 29, 2012, now U.S. Pat. No. 8,875,289.
U.S. Appl. No. 14/318,450, entitled "System and Method for Creating and Applying Categorization-Based Policy to Secure a Mobile Communications Device From Access to Certain Data Objects," filed Jun. 27, 2014, now U.S. Pat. No. 9,294,500.
U.S. Appl. No. 15/498,325, entitled "System and Method for Assessing Data Objects on Mobile Communications Devices," filed Apr. 26, 2017.
International Pat. App. No. PCT/US11/49182, entitled "System and Method for Server-Coupled Malware Prevention," filed on Aug. 25, 2011.
U.S. Appl. No. 14/071,366, entitled "System and Method for Secure Network Connections," filed Nov. 4, 2013.
U.S. Appl. No. 14/072,718, entitled "Method and System for Evaluating Security for an Interactive Service Operation by a Mobile Device," filed Nov. 5, 2013, now U.S. Pat. No. 9,307,412.
U.S. Appl. No. 14/063,342, entitled "System and Method for Creating and Assigning a Policy for a Mobile Communications Device Based on Personal Data," filed Oct. 25, 2013, now U.S. Pat. No. 9,642,008.
U.S. Appl. No. 15/473,252, entitled "System and Method for Creating and Assigning a Policy for a Mobile Communications Device Based on Personal Data," filed Mar. 29, 2017.
U.S. Appl. No. 13/686,028, entitled "System and Method for Developing, Updating, and Using User Device Behavioral Context Models to Modify User Device and Application State, Settings and Behavior for Enhanced User Security," filed Nov. 27, 2012, now U.S. Pat. No. 8,655,307.
U.S. Appl. No. 14/092,195, entitled "System and Method for Using Context Models to Control Operation of a Mobile Communications Device," filed Nov. 27, 2013, now U.S. Pat. No. 9,408,143.
U.S. Appl. No. 15/189,556, entitled "Modify Mobile Device Settings for Resource Conservation," filed Jun. 22, 2016.
U.S. Appl. No. 14/099,737, entitled "Distributed Monitoring, Evaluation, and Response for Multiple Devices," filed Dec. 6, 2013.

* cited by examiner

RESPONSE GENERATION AFTER DISTRIBUTED MONITORING AND EVALUATION OF MULTIPLE DEVICES

CROSS-REFERENCE TO RELATED APPLICATIONS

The present application is a continuation-in-part of U.S. patent application Ser. No. 14/099,737, entitled "DISTRIBUTED MONITORING, EVALUATION, AND RESPONSE FOR MULTIPLE DEVICES," filed on Dec. 6, 2013, which is incorporated by reference in its entirety.

BACKGROUND

The present disclosure relates to the field of device monitoring and more particularly, to systems and techniques for gathering data across a large-scale of computing devices, evaluating the data, and responding accordingly.

Computing devices, especially mobile communications devices, are becoming increasingly ubiquitous. People can be found using their computing devices in their homes and offices, at the airport, in coffee shops and libraries, and many other places. Mobile apps and web apps are used for both personal and business purposes. People use their computing devices for tasks as diverse and varied as socializing, entertainment, business productivity, checking the weather, reading the news, managing their finances, shopping, making appointments with their doctor, checking their business and personal e-mail, and producing work-related reports and analysis—just to name a few examples.

The rise and ubiquity of such devices has been accompanied by a rise in malicious software or malware (e.g., computer viruses, ransomware, worms, trojan horses, rootkits, keyloggers, dialers, spyware, adware, malicious browser helper objects (BHOs), or rogue security software), device robberies, information and identity theft, snooping, eavesdropping, and other unsavory acts. Users have seen their bank accounts emptied, identities stolen, and personal health information improperly accessed. Corporations have seen their intellectual property stolen, trade secrets misappropriated, and so forth. There can be defects or bugs in the device software, hardware, or both. Such defects can produce incorrect or unexpected results, or unintended behavior.

There is a continuing need to develop improved systems and techniques for monitoring computing device activity, quickly and accurately identifying threats, and responding accordingly.

BRIEF SUMMARY

Systems and methods are provided for device monitoring, said devices can include mobile communications devices, sessile devices (such as part of the IoT (Internet of Things)), and other computing or sensing devices. In a specific implementation, data is collected from a set of computing devices. The data is associated with the devices, mobile application programs (apps), web applications, users, or combinations of these.

The data can relate to the state of the devices, apps, web applications, users, for example, their configuration, settings, properties, content of files or data stores. The data can relate to events or sequences of events which occur on the device, involving a change in state or the invocation of apps, web applications, system services or components in software or firmware or hardware. The process of collecting such data is referred to as monitoring or acquisition. A norm is established in an analysis process using the collected data. The analysis process uses risk models, correlation of states and events or event sequences, and prior knowledge concerning known bad actors (applications, websites, etc.), and known bad behaviors (for example, malformed content, vulnerability exploits, etc.).

The norm is compared with data collected from a particular computing device. If there is a deviation outside of a threshold deviation between the norm and the data collected from the particular computing device, or if any interaction with a known bad actor is detected, or if any known bad behaviors are detected, a response is initiated.

Responses can include modifying data collection and monitoring criteria for what data is collected when and from which devices. Responses can include determining what collected data is to be evaluated or analyzed where and how. E.g., a response to the detection of anomalous boot files or executables could include a modification to monitoring to collect the content of such files for additional analysis and evaluation and subsequent response. Responses can include notification and alerting of a user or administrator or analyst, via email or SMS or interactive voice response (IVR) or instant messaging or chat or via device push services or via user interface popups, or via entering or modifying records in a system used for workflow such as a trouble ticket system. Responses can include taking actions on a device, such as sounding an alarm, locking a device, full or selective wiping of a device, performing other commands such as blocking or uninstalling an application, blocking a web app, or other commands. Responses can include revoking access to network services, e.g., email or web browsing or push services or cellular voice or SMS service. The process of monitoring or acquisition is controlled by a policy, which may include sets of norms or models of behavior, as well as appropriate responses to be triggered based on monitoring activity. Norms and models of behavior can embody elements of risk assessment, or can control subsequent monitoring activity or particular responses.

In a specific implementation, a method includes at a server accessing a database system comprising data collected from a plurality of devices, at the server, establishing a norm by processing the collected data, at the server comparing the norm with data collected from a first device of the plurality of devices, at the server determining that a deviation between the norm and the data collected from the first device is outside of a threshold deviation, and upon the determination, generating an alert by the server.

The collected data may include context information associated with an event that occurred on a device, context information associated with a state change that occurred on a device, context information associated with configuration settings on a device, monitored information associated with firmware contents, versions, structure, or permissions on a device, monitored information associated with application behavior on a device, or combinations of these.

The step of generating the alert may include blocking the first device from accessing a service, transmitting to the first device instructions to uninstall an application program on the first device, transmitting a message to an administrator, or combinations of these.

In a specific implementation, the database system includes a first database, and a second database. The first database is associated with an organization, comprises data collected from a first subset of the plurality of devices, and the devices in the first subset are associated with the organization. The second database includes data collected from a second subset of the plurality of device, and the devices in the second subset are not associated with the organization.

In another specific implementation, a method includes at a server, monitoring a plurality of devices, based on the monitoring, at the server establishing a norm, at the server determining that activity associated with a first device of the plurality of devices is outside the norm, and upon the determination, altering the monitoring of the first device by the server. The step of altering the monitoring of the first device may include increasing the monitoring of the first device, or decreasing the monitoring of the first device.

In a specific implementation, the norm indicates that a first event occurs during a first context, and the step of determining that activity on the first device is outside the norm includes determining that the first event occurred on the first device during a second context, different from the first context. Determining that activity on the first device is outside the norm may include receiving from the first device an indication that a shared library has been loaded on the first device from a memory card.

The method may further include generating a model of characteristics for a specific application program on the plurality of device, and the step of determining that activity on the first device is outside the norm may include determining that an application program, on the first device and identified as being the same as the specific application program, has a characteristic that is not included in the model of characteristics.

Monitoring the plurality of devices may include monitoring a first subset of the plurality of devices for first events associated with an application program on the plurality of devices, and monitoring a second subset of the plurality of devices for second events associated with the application program, where the second subset of devices is not monitored for the first events, and the first subset of devices is not monitored for the second events.

In a specific implementation, a method includes at a server, distributing first policies to a plurality of devices, at a server, receiving, from the plurality of devices, data responsive to the first policies, at the server establishing a normal pattern of activity using the data, at the server comparing the normal pattern with a first pattern of activity associated with a first device of the plurality of devices, at the server determining that the first pattern of activity violates the normal pattern of activity, and upon the determination, transmitting by the server a second policy to the first device to replace the first policy distributed to the first device.

The first policy may specify collection of a first level of detail, and the second policy may specify collection of a second level of detail, greater than the first level of detail. The first policy may specify sampling data associated with the first device at a first frequency, and the second policy specify sampling the data at a second frequency, greater than the first frequency. In an implementation, the received data does not comprise personally identifiable information (PII).

In a specific implementation, a violation of the normal pattern of activity is detected when the normal pattern of activity specifies a first sequence of events, and the first pattern of activity specifies a second sequence of the events, different from the first sequence.

Other objects, features, and advantages of the present invention will become apparent upon consideration of the following detailed description and the accompanying drawings, in which like reference designations represent like features throughout the figures.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Figure 1:
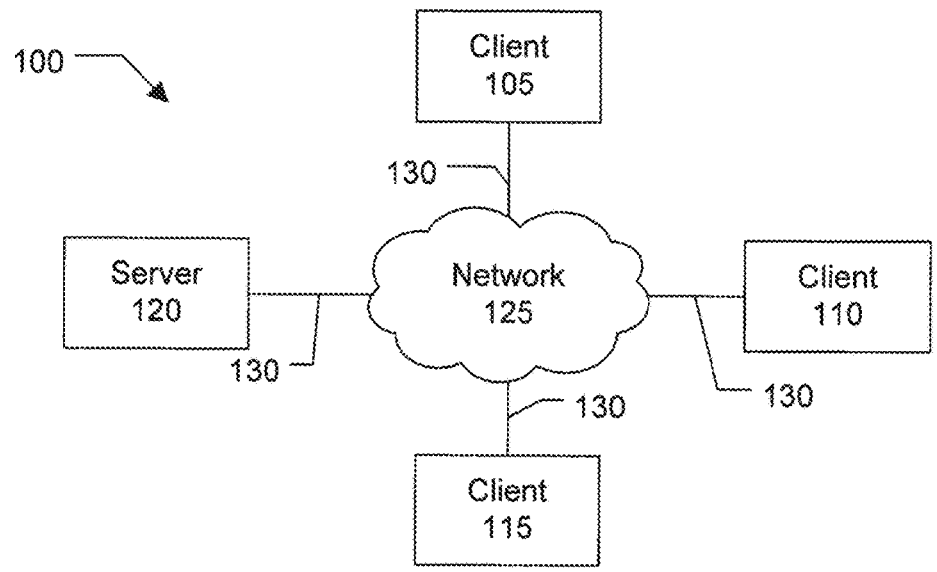
FIG. 1 shows a simplified block diagram of a specific embodiment of a system for computing device monitoring, evaluation, and response implemented in a distributed computing network connecting a server and clients.

FIG. 1 is a simplified block diagram of a distributed computer network 100 incorporating a specific embodiment of a system for distributed monitoring, evaluation, and response for multiple devices. Computer network 100 includes a number of client systems 105, 110, and 115, and a server system 120 coupled to a communication network 125 via a plurality of communication links 130. Communication network 125 provides a mechanism for allowing the various components of distributed network 100 to communicate and exchange information with each other.

Communication network 125 may itself be comprised of many interconnected computer systems and communication links. Communication links 130 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, Internet telephony, IP telephony, digital voice, voice over broadband (VoBB), broadband telephony, Voice over IP (VoIP), public switched telephone network (PSTN), and others. While in one embodiment, communication network 125 is the Internet, in other embodiments, communication network 125 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment and does not limit the scope of the systems and methods as recited in the claims. One of ordinary skill in the art would recognize other variations, modifications, and alternatives. For example, more than one server system 120 may be connected to communication network 125. As another example, a number of client systems 105, 110, and 115 may be coupled to communication network 125 via an access provider (not shown) or via some other server system.

Client systems 105, 110, and 115 typically request information from a server system which provides the information. Server systems by definition typically have more computing and storage capacity than client systems. However, a particular computer system may act as both a client or a server depending on whether the computer system is requesting or providing information. Aspects of the system may be embodied using a client-server environment or a cloud computing environment.

Server 120 is responsible for receiving information requests from client systems 105, 110, and 115, performing processing required to satisfy the requests, and for forwarding the results corresponding to the requests back to the requesting client system. The processing required to satisfy the request may be performed by server system 120 or may alternatively be delegated to other servers connected to communication network 125.

Client systems 105, 110, and 115 enable users to access and query information or applications stored by server system 120. A client system is a computing device. Some example client systems include desktop computers, portable electronic devices (e.g., mobile communications devices, smartphones, tablet computers, laptops) such as the Samsung Galaxy Tab®, Google Nexus devices, Amazon Kindle®, Kindle Fire®, Apple iPhone®, the Apple iPad®, Microsoft Surface®, the Palm Pre™, or any device running the Apple iOS™, Android™ OS, Google Chrome OS, Symbian OS®, Windows Mobile® OS, Windows Phone, BlackBerry OS, Embedded Linux, webOS, Palm OS® or Palm Web OS™.

In a specific embodiment, a "web browser" application executing on a client system enables users to select, access, retrieve, or query information and/or applications stored by server system 120. Examples of web browsers include the Android browser provided by Google, the Safari® browser provided by Apple, Amazon Silk® provided by Amazon, the Opera Web browser provided by Opera Software, the BlackBerry® browser provided by Research In Motion, the Internet Explorer® and Internet Explorer Mobile browsers provided by Microsoft Corporation, the Firefox® and Firefox for Mobile browsers provided by Mozilla®, and others (e.g., Google Chrome).

Figure 2:
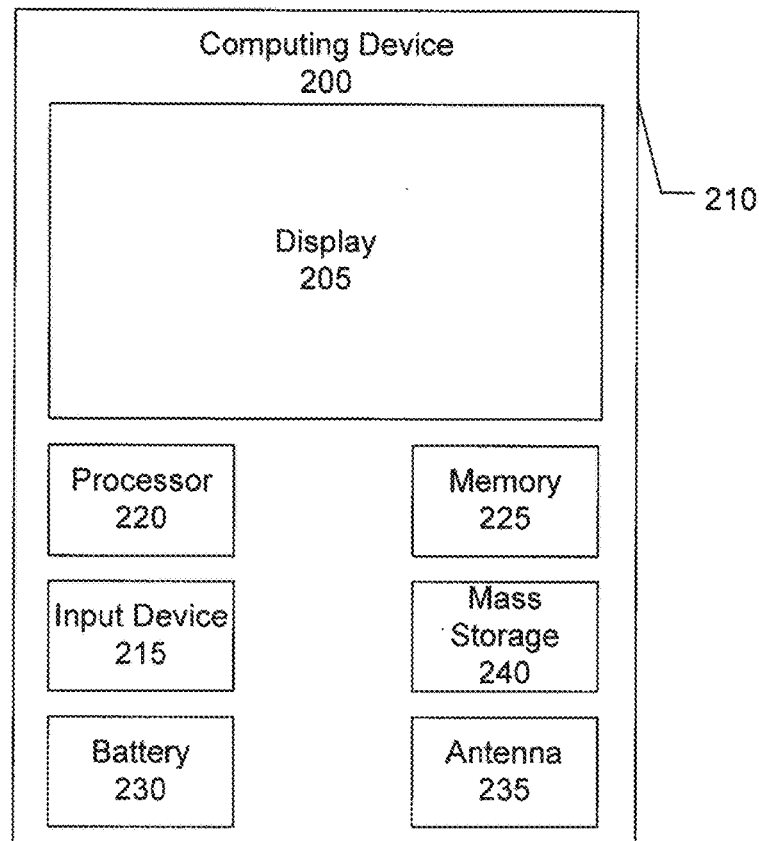
FIG. 2 shows a more detailed diagram of an example client of the system.

FIG. 2 shows an example computer system such as a client system. In an embodiment, a user interfaces with the system through a client system, such as shown in FIG. 2. In this example, a computing device 200 is a mobile communications or portable electronic device that includes a display, screen, or monitor 205, housing 210, and input device 215. Housing 210 houses familiar computer components, some of which are not shown, such as a processor 220, memory 225, battery 230, speaker, transceiver, antenna 235, microphone, ports, jacks, connectors, camera, input/output (I/O) controller, display adapter, network interface, mass storage devices 240, and the like.

Input device 215 may also include a touchscreen (e.g., resistive, surface acoustic wave, capacitive sensing, infrared, optical imaging, dispersive signal, or acoustic pulse recognition), keyboard (e.g., electronic keyboard or physical keyboard), buttons, switches, stylus, or combinations of these.

Mass storage devices 240 may include flash and other nonvolatile solid-state storage or solid-state drive (SSD), such as a flash drive, flash memory, or USB flash drive. Other examples of mass storage include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), battery-backed-up volatile memory, tape storage, reader, and other similar media, and combinations of these.

The system may also be used with computer systems having different configurations, e.g., with additional or fewer subsystems. For example, a computer system could include more than one processor (i.e., a multiprocessor system, which may permit parallel processing of information) or a system may include a cache memory. The computer system shown in FIG. 2 is but an example of a computer system suitable for use.

Other configurations of subsystems suitable for use will be readily apparent to one of ordinary skill in the art. For example, in a specific implementation, the computing device is mobile communications device such as a smartphone or tablet computer. Some specific examples of smartphones include the Droid Incredible and Google Nexus One, provided by HTC Corporation, the iPhone or iPad, both provided by Apple, and many others. The computing device may be a laptop or a netbook. In another specific implementation, the computing device is a non-portable computing device such as a desktop computer or workstation.

A computer-implemented or computer-executable version of the program instructions useful to practice the systems and techniques described in this application may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software useful to practice the techniques described in this application may be stored or reside in RAM or cache memory, or on mass storage device 240. The binary, machine-executable version of the software may also be stored in a ROM or an EEPROM, or an FPGA, or within an ASIC, or within a Trusted Platform Module (TPM) or Trusted Execution Environment (TEE). The source code of this software may also be stored or reside on mass storage device 240 (e.g., flash drive, hard disk, magnetic disk, tape, or CD-ROM). As a further example, code useful for practicing the techniques described in this application may be transmitted via wires, radio waves, or through a network such as the Internet. In another specific embodiment, a computer program product including a variety of software program code to implement features described in this application is provided.

Computer software products may be written in any of various suitable programming languages, such as C, C++, C#, Pascal, Fortran, Perl, Matlab (from MathWorks, www.mathworks.com), SAS, SPSS, JavaScript, CoffeeScript, Objective-C, Objective-J, Ruby, Python, Erlang, Lisp, Scala, Clojure, and Java. The computer software product may be an independent application with data input and data display modules. Alternatively, the computer software products may be classes that may be instantiated as distributed objects. The computer software products may also be component software such as Java Beans (from Oracle) or Enterprise Java Beans (EJB from Oracle).

An operating system for the system may be the Android operating system, iPhone OS (i.e., iOS), Windows Phone, Symbian, BlackBerry OS, Palm web OS, bada, Embedded Linux, MeeGo, Maemo, Limo, Tizen, or Brew OS. Other examples of operating systems include one of the Microsoft Windows family of operating systems (e.g., Windows 95, 98, Me, Windows NT, Windows 2000, Windows XP, Windows XP x64 Edition, Windows Vista, Windows 7, Windows 8, Windows CE, Windows Mobile, Windows Phone 7), Linux, HP-UX, UNIX, Sun OS, Solaris, Mac OS X, Alpha OS, AIX, IRIX32, or IRIX64. Other operating systems may be used.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these.

For example, data and other information may be passed between the computer and components (or steps) of a system useful in practicing the systems and methods in this application using a wireless network employing a protocol such as Wi-Fi (IEEE standards 802.11, 802.11a, 802.11b, 802.11e, 802.11g, 802.11i, 802.11n, 802.11ac, 802.11ad, 802.11ah, 802.15, 802.16, and 802.20, just to name a few examples). For example, signals from a computer may be transferred, at least in part, wirelessly to components or other computers.

Figure 3:
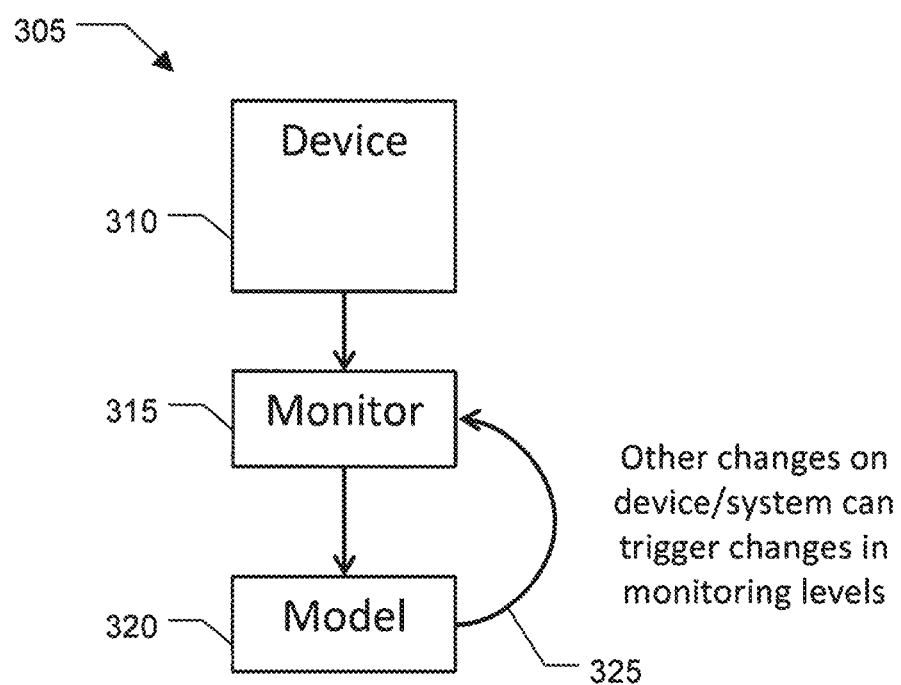
FIG. 3 shows a flow for monitoring, evaluating, and responding.

FIG. 3 shows a process flow 305 for a monitoring system. A feature of the system provides for monitoring of the "herds" of computing devices, and evaluating and responding with policies dealing with malware, lost or stolen devices, and other situations.

The system can gather information across an internet-scale of multiples of devices of different configurations and characteristics, states, and behaviors. This patent application describes techniques for gathering that information, and defining norms of configuration, state, and behavior based on that information, and using the norms to determine indicators of conditions, to modify monitoring policies, to tailor evaluation policies, and to customize response policies. The system can use data gathering of different aspects across the whole population of devices to build a composite behavioral picture.

In the process example shown in FIG. 3, a set of computing devices 310 are monitored 315 by the system. The monitoring is used to develop models 320. The models or data identified through the models can be feedback 325 into the monitoring process to identify computing devices that deviate from the models.

Figure 4:
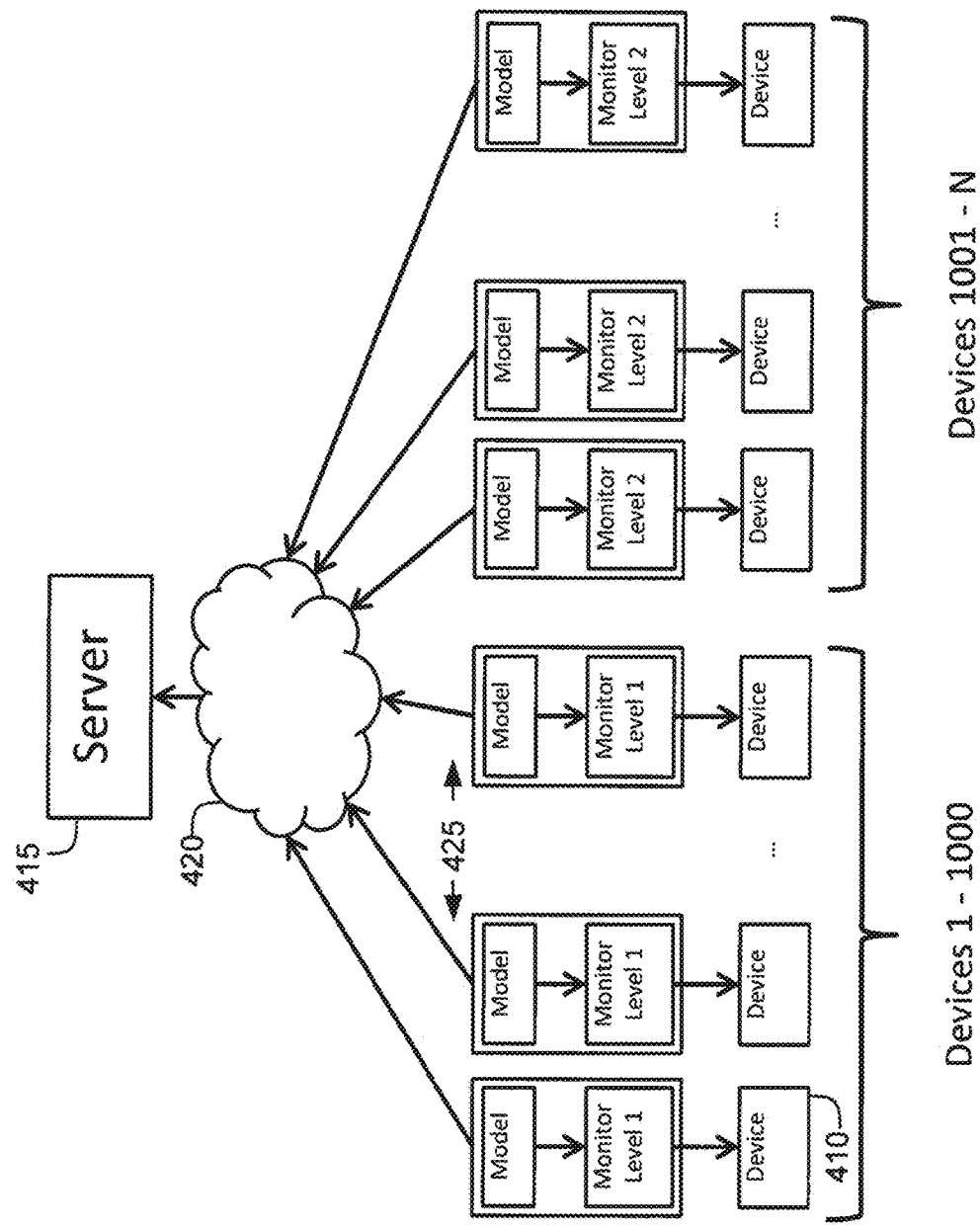
FIG. 4 shows a block diagram of different levels of monitoring on different devices.
Figure 5:
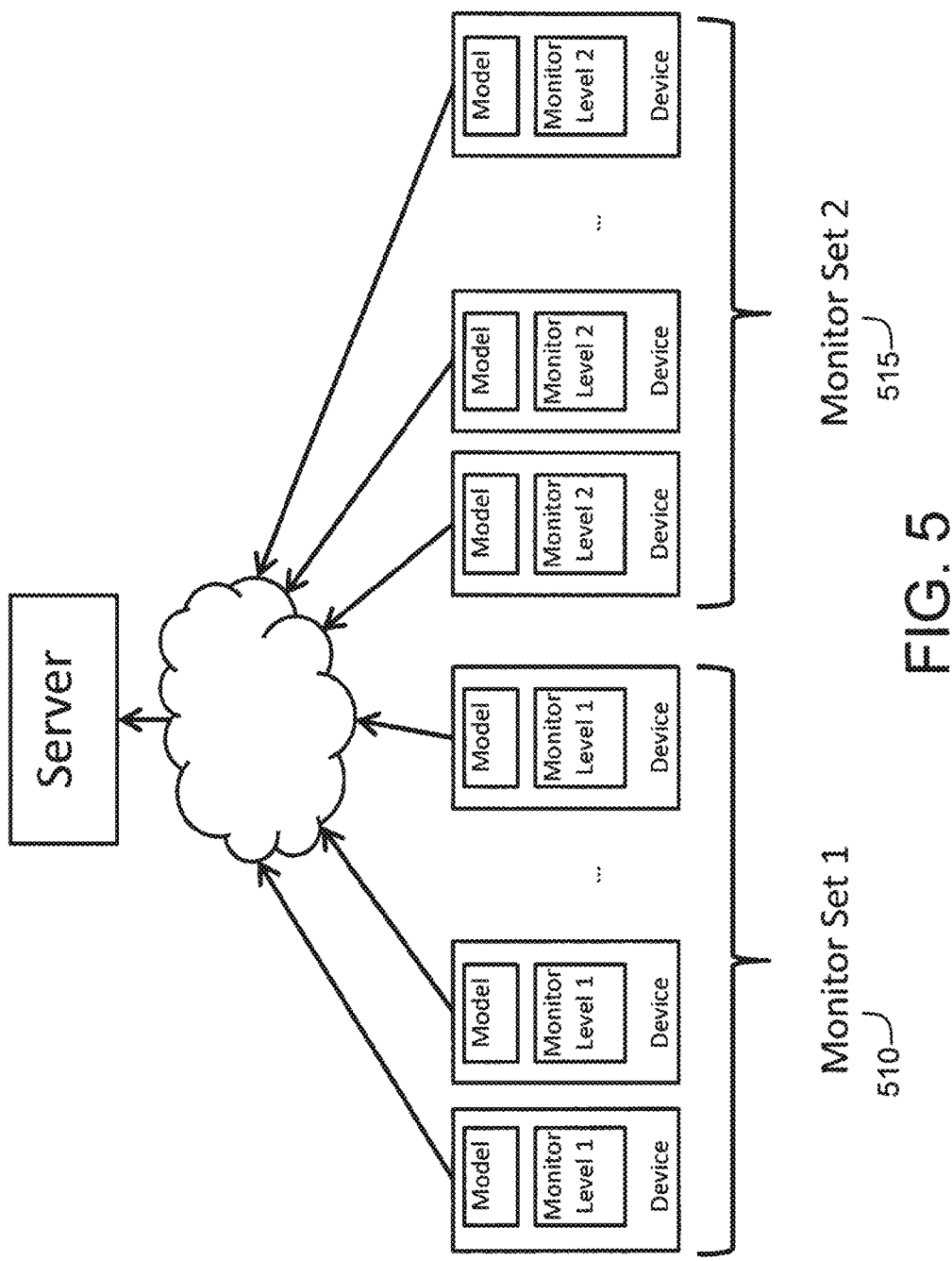
FIG. 5 shows another block diagram of different levels of monitoring on different devices.

FIGS. 4-5 show simplified block diagrams of an environment in which a monitoring, evaluation, and response system may be implemented. As shown in FIG. 4, a herd or set of computing devices 410 are connected to a server 415 over a network 420. A set of monitoring processes 425 monitor the computing devices. Data from the monitoring is transmitted over the network to the server.

There can be different levels of monitoring. For example, there can be a first monitor set 510 (FIG. 5) and a second monitor set 515. In the example shown in FIGS. 4-5, the first monitor set includes devices 1-1000. The second monitor set includes devices 1001-N. Monitoring in the first monitor set is according to a level 1 monitoring. Monitoring in the second monitor set is according to a level 2 monitoring, different from the level 1 monitoring.

The differences in the monitoring levels can include differences in the amount of data collected, type of data collected, data collection sampling frequency, timing of data collection, location of data collection, depth of data collection, or combinations of these. For network connections, the depth of data collection can include just domain names, or domain names and size of data transmitted and length or duration of connections, or content that is transmitted or received on a network connection.

The capability to vary the monitoring levels allows for balancing among the competing desires to collect a comprehensive dataset, maintain privacy, and make judicious use of the limited computing resources available to a computing device. Further detail is provided below.

It should be appreciated that a monitor set can include any number of devices including tens, hundreds, thousands, hundreds of thousands, millions, or even hundreds of millions of devices. A number of devices in a set can be different from or the same as a number of devices in another set. A monitoring set can be generated using any attribute or combination of attributes associated with a computing device.

In various implementations, the system sends models using data from all over the world to a device. The system provides for the signing of models, authentication, authorization, and permissioning. The system provides for prevention of reversing models. The system obtains monitoring output from other signed models. The system factors out common elements to avoid having to do the common elements more than once.

For example, some data collection or monitoring and acquisition activities can be accomplished from some devices and not have to be performed on other devices, or some analysis activities on common components or elements or applications having been performed once do not have to be performed again, once it has been determined that these elements are truly common. A monitoring model on a device may only send data which differs from the behavior anticipated by the model.

Table A below gives detail for a specific flow of the system shown in FIGS. 4 and 5.

TABLE A

| Step | Description |
|---|---|
| 1 | An application (or app) is installed on a device. The application may be first encountered from a crawler or from the system seeing it on a different device. |

TABLE A-continued

| Step | Description |
|---|---|
| 2 | A monitoring model for new applications or new applications of a particular type or category or signer known good or bad or unknown or source of application given known good or bad or unknown source (e.g., App Store website, sideload, etc.) is applied. |
| 3 | Information about the application is sent to a server. Referring existing matters to the server may include part or all of the application or signature or hash identifier. The server handles cases of this application never having seen before or is relatively new and not fully characterized in terms of behavior yet or new with respect to the device configuration context; or is well characterized. |
| 4 | If the application is well characterized, the server sends a model for monitoring and a model for evaluation and a policy for response to the device which can include at one extreme do nothing or at other extreme blocking the application from executing on the device or allowing it to execute in local device sandbox with fake data or replacing the application by stub which can obtain local application context sensors configuration, etc., |
| 5 | The application can be transported to the server if a server copy of the application is not already available. The application runs at the server in a highly instrumented environment in which requests by the application for device local information are delegated to a stub on the actual device via communications between the server and device and display actions sent from server to device and user interactions sent from device to the server execution environment.<br>If an application is not well characterized in terms of its behaviors, additional monitoring policies may be pushed to devices to obtain more detailed information which can be used to characterize the behavior, or special dynamic analysis or manual analysis may be performed on a copy of the application in a real or emulated test environment, which may simulate a variety of other environmental or sensor or other conditions (such as simulated geographical location) to explore possible application behaviors. |

In an implementation, a method includes receiving information associated with an application program installed on computing device, determining that the information is insufficient to characterize the application program, based on the determination, transmitting to the computing device a policy to collect additional information associated with the application program, permitting the application program to execute on the computing device to obtain the additional information, and based on the additional information, characterizing the application program.

If the application program is characterized as malware, the method may include not permitting the application program to execute. If the application program is not characterized as malware, the method may include continuing to permit the application program to execute. In an embodiment the same process described above is applied to other non-application software installed on the device; e.g., modules, components, and libraries of the operating system or of firmware for the device or for any of the device components, such as sensors, the baseband processor, and other auxiliary processors.

Output from the system can include a trend report that shows trending of adoption of the new app. The system can support the modifying of monitor models on multiple devices to share monitor activities by type of information, amount of information, or both. The above can apply not just to applications, but also web applications or firmware or OS modifications or updates, etc. Aspects of the system can also be applied to new devices (e.g., Galaxy s8 when seen for the first time will get adjusted models for monitor, evaluate, and response).

Aspects of the system can also be applied to new network endpoints, to new behaviors seen by an application, to new context seen by a device (e.g., a device in a geographic location not seen before, e.g., a device that has never been in China before but is now, may modify policies for monitoring, evaluating, and responding at the device or via server models for MER (monitoring, evaluating, and responding)), to a network connection not seen before, to context combinations such as a known network connection (e.g., an SSID) seen in a previously unseen location.

In a specific implementation, monitoring is used to support the creation and enforcement of a policy to protect personal data. In this specific implementation, personal data stored on the device is identified. The system creates a policy based on the identified personal data, monitors the identified personal data based on the policy, and reports any access to the identified personal data based on the policy.

As discussed in U.S. patent application Ser. No. 14/063,342, filed Oct. 25, 2013, which is incorporated by reference, examples of the previously mentioned data include, but are not limited to, personal data associated with the user of the device.

For example, the personal data may include personally identifiable information (PII) that may be used to identify the user of the device. In some embodiments, the PII may include any information about the user of the device that can be used to distinguish or trace the user's identity as well as information that is linked to the user of the device.

Examples of such PII include, but are not limited to, the user's name, social security number, date and place of birth, mother's maiden name, driver's license number, passport number, firearm owner's identification card, username, email address, security questions and answers, digital certificates associated with the user, gender, marital status, race, religion, salary, biometric information (e.g., height, weight, eye color, hair color, fingerprint scans, retinal scans, medical information), financial information (e.g., credit card numbers, verification codes, expiration dates, debit card numbers, bank account numbers), family information (e.g., dependents, children, spouse, parents), emergency contact information, etc. These are just some examples of PII.

Additional examples of personal data associated with the user of the device may include, but are not limited to, contacts of the user of the device (e.g., an address book or phone number contact list), short message service (SMS) contacts, SMS messages transmitted or received by the user of the device, email contacts, email database (e.g., the device may store emails from an email account of the user), email messages transmitted or received by the device, phone logs, web logs or browser history (e.g., which websites has the user of the device visited), cookies, and phone numbers.

Further examples of personal data may include information that may be used to identify the device. For example, the personal data may include, but is not limited to, International Mobile Station Equipment Identity (IMEI), International Mobile Subscriber Identity (IMSI), Integrated Circuit Card Identifier (ICCID), Mobile Equipment Identifier (MEID), Electronic Serial Numbers (ESN), Unique Device Identifier (UDID), Media Access Control (MAC) Address, the applications that are installed on the device, and a phone number associated with the device.

Still further examples of personal data may include data from one or more components of the device (e.g., camera, speaker, network interface, sensor(s)). For example, the personal data may include images or photos taken by the camera, location information from the sensor of the device (e.g., a current physical location of the device), a location history of the device, or a log or history of domains, IP addresses, other devices that the device has communicated with. Additionally, location information or other PII may be embedded as metadata, e.g., Exchangeable image file format (Exif) metadata. Such information is usually placed automatically by applications or cameras into image files without the actions of a user.

Additional examples of personal data may include data which can be used to make inferences about other user personal data. For example, an application that obtains repeated process memory size of a browser application's process can use that information to fingerprint which websites the user is visiting. Thus, although the occasional access to process memory size information does not expose personal data, the repeated access to this information can expose personal data.

Detection of repeated access and reporting of repeated access to such system level information that can be used for inferences about other personal data may also be included as personal data. Another example of system related information which can be used to infer personal data is the set of plugins or extensions installed in a browser application. The combination of the browser's user-agent string and the list of installed plugins or extensions can fingerprint a user that may be used to uniquely identify a particular device or user.

Thus, an application that attempts to retrieve the complete list of installed plugins or extensions for a browser application can be considered to be accessing another type of personal data. Similarly, devices frequently broadcast the names (SSIDs) of their favorite or recently connected to networks to facilitate discovery and subsequent connection to known or preferred networks. These network names (SSIDs) constitute another example of personal data which can be used to make inferences about other user personal data.

For example, the names may reveal recent user locations, user buying preferences, user medical conditions (user's device is trying to connect to "Oncology-Clinic-Free-Wifi") or other items of a personal nature that can be inferred. In such a case it may be advisable to adjust settings or use application wrappers or operating system functions or hooks to prevent the device from broadcasting some or all of such network names according to a privacy policy. Devices can still connect to such networks by passive discovery (listening for network names broadcast from network access points). Such inferred information could be used by a listener for targeting advertisements or tailoring search results presented to a user of the device. Similarly, an application running on the device may attempt to obtain this list of recently used network names (SSIDs).

As such, the personal data may include PII data, application related information (e.g., which applications are installed on the device), device related information (e.g., identifiers associated with the device), communication related information (e.g., phone logs, emails, SMS messages, etc.), information obtained by the device (e.g., location information), or any personal files or data stored by the user (e.g., files in the file system). Such data may be personal to the user and use of the device.

Figure 6:
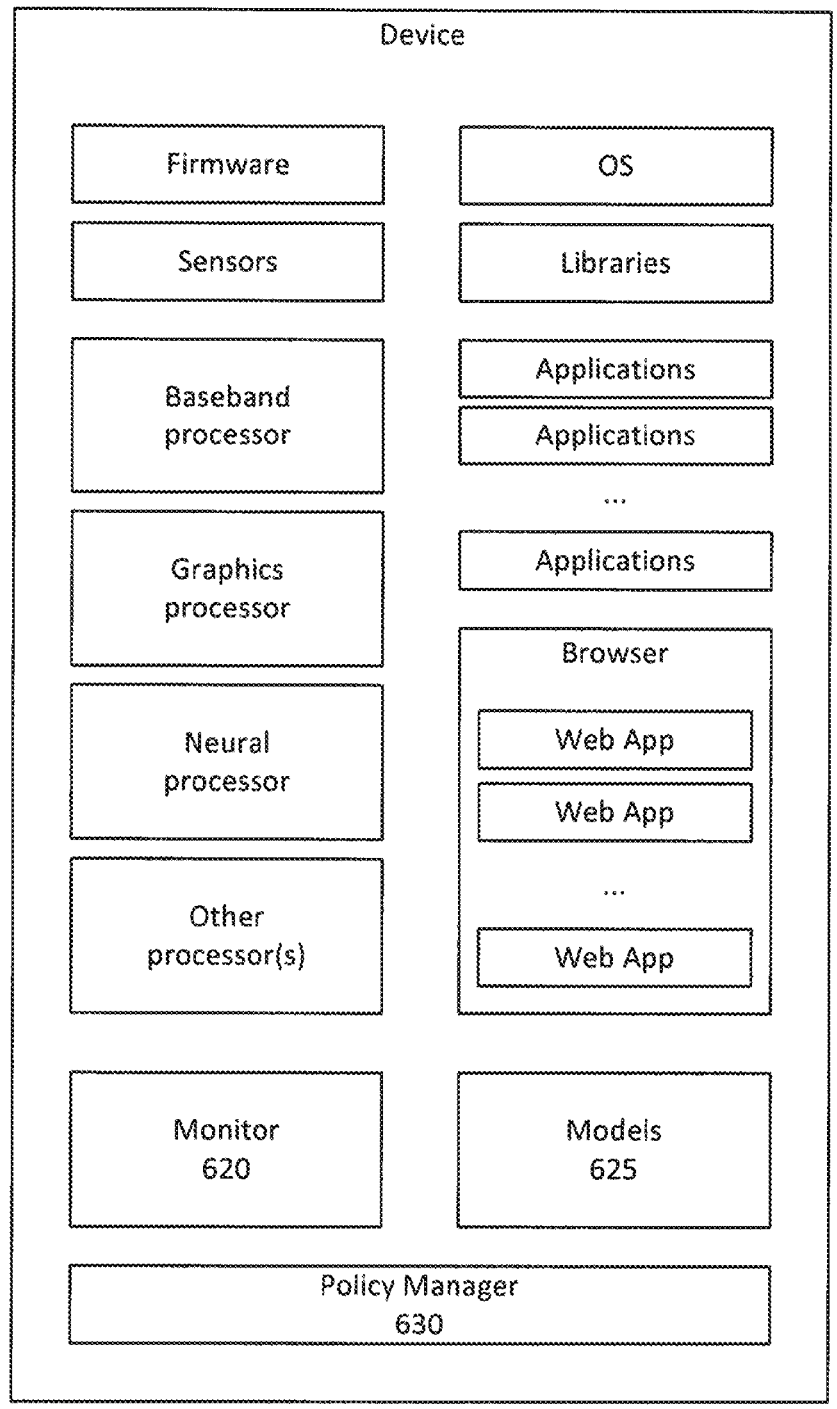
FIG. 6 shows a block diagram of a computing device having a monitoring module, models, and a policy manager.

FIG. 6 shows a block diagram of a client device 605 that may be monitored. In an implementation, the client is computing device with hardware and software such as shown in FIG. 2 and described above. The device includes one or more hardware and software components described. For example, the device may include firmware, sensors, baseband processor, general processor, graphics processor, neural processor, one or more other processors, operating system, libraries, applications, and browser which can access web applications. In a specific embodiment, a device can be a sessile device as in "thing" of IoT (Internet of Things).

FIG. 6 further shows the internal subsystem modules or components that may be included in a monitoring, evaluation, and response system. These modules include a monitor 620, models 625, and a policy manager 630. These modules are functional entities where the implementation of the functions may vary. For example, in some cases, the monitor and policy manager are combined into one code module. In other cases, the monitor and policy manager reside in separate code modules.

The monitor is responsible for observing configuration, state, and behavior on the device. More particularly, the monitor may observe configuration or state on device components, central processing unit, (CPU), other processors (graphics processing unit (GPU), network processing unit (NPU), etc.), baseband processor, sensors (GPS, accelerometer, compass, etc.), digital signal processor (DSPs), microphone, speaker, display, touch sensor, biometric sensors, firmware (for device as a whole or for components) (version, levels, updates, file locations, permissions, contents, etc.), operating system (version, levels, updates, file locations, permissions, contents, etc.), system or other libraries (version, levels, updates, file locations, permissions, contents, etc.), applications (signer, origin (store, website, sideload, file locations, permissions, contents, etc.), its components and their source), web applications (uniform resource locator (url) and domain of origin, version information, etc.), cloud or web services (url and domain, version information, etc.), behavior of same (outputs, connections made to other components, to network locations, to file system, etc.), or combinations of these. Sideload can refer to transferring data between two local devices such as between a computer (e.g., desktop computer) and a mobile communications device. Alternatively, sideloading can refer to installing an application (e.g., for Android, an APK formatted application package) from a third party website (e.g., installing an APK formatted application package onto an Android device from a website other than Google Play).

Models indicate what behaviors are normal. Models can be on the server, device, or both. Constructing models for devices, components, applications, and so forth is facilitated through the collection at a server of many pieces of information from a device. In the scenario of ongoing monitoring, the determination of what is to be monitored can be controlled dynamically by a plurality of models for monitoring. There can be models for monitoring or policies; models or policies for evaluating; and policies for responding. There can be monitoring policies, and behavior norms, and evaluation policies, and response policies. The evaluation policies can include rules-based responses; or machine learning (ML)-based classifiers; or executable code embodying heuristics.

A model can represent the system's understanding of what constitutes normal device usage including the context in which such use occurs. A context describes the conditions under which device usage, non-usage, or both occur. Context can be used to automatically configure the computing device by enforcing the appropriate policies. Determining context allows the system to discover what the user is currently doing, anticipate or predict what the user is likely to do next, and configure the computing device accordingly.

There can be instantaneous, historical, and derivative context. Instantaneous context includes configuration, state, and activities or events happening now or in the present. Historical context includes history (over several time scales)

of configuration, state, and activities or events happening in the past, which could be the recent past, or could be months ago. Derivative context can refer to higher level context constructs, as discussed in U.S. patent application Ser. No. 13/686,028's context situations and context behaviors. Derivative context can refer to changes in types or levels of configuration, state, activities, events, or combinations of these.

In general, the context can include measurements or observations of configuration, state, activities, events, sequences thereof, of elements of the device, the user and the user's activity, of the environment (geographical, network, etc.) in which the device currently finds itself, and of other devices or elements external to the device itself. The context information may be used to help cluster or determine norms of other data or behaviors collected from the device.

Context can apply to any component or actor within the environment. For example, there can be user context, device context, or device components, such as baseband processor context, or sensor context (e.g., accelerometer, GPS, etc.). There can be network context (networks connected to, network destinations contacted, protocols used, frequency of communication, metadata about or actual data communicated). There can be neighboring device context. There can be categorical context: context of all devices with these same device components, versions of firmware, levels of operating system.

There can many different levels of context abstraction. For example, the context "commute to work" may be further detailed as "commute to work in car" or "commute to work on train." These different levels of abstraction allow the system to provide very fine-grained control for adapting device behavior, identifying anomalies, responding to threats, and identifying false positives and negatives. An observed behavior on a device may be normal in one context but anomalous in a different context.

Context can include geographical location information, applications used, time and date information, and other information. In general the term context refers to any information that can be used to describe the internal state, events, or history of an entity, where an entity is a person, place, or object or part thereof that is considered relevant to any interaction between a user and applications, and the external state, events, or history of other entities or the environment, where environment refers to the computing environment of the device and its components and operating system and applications as well as to the external physical environment of the device and the user. This includes the user and the applications themselves.

Figure 8:
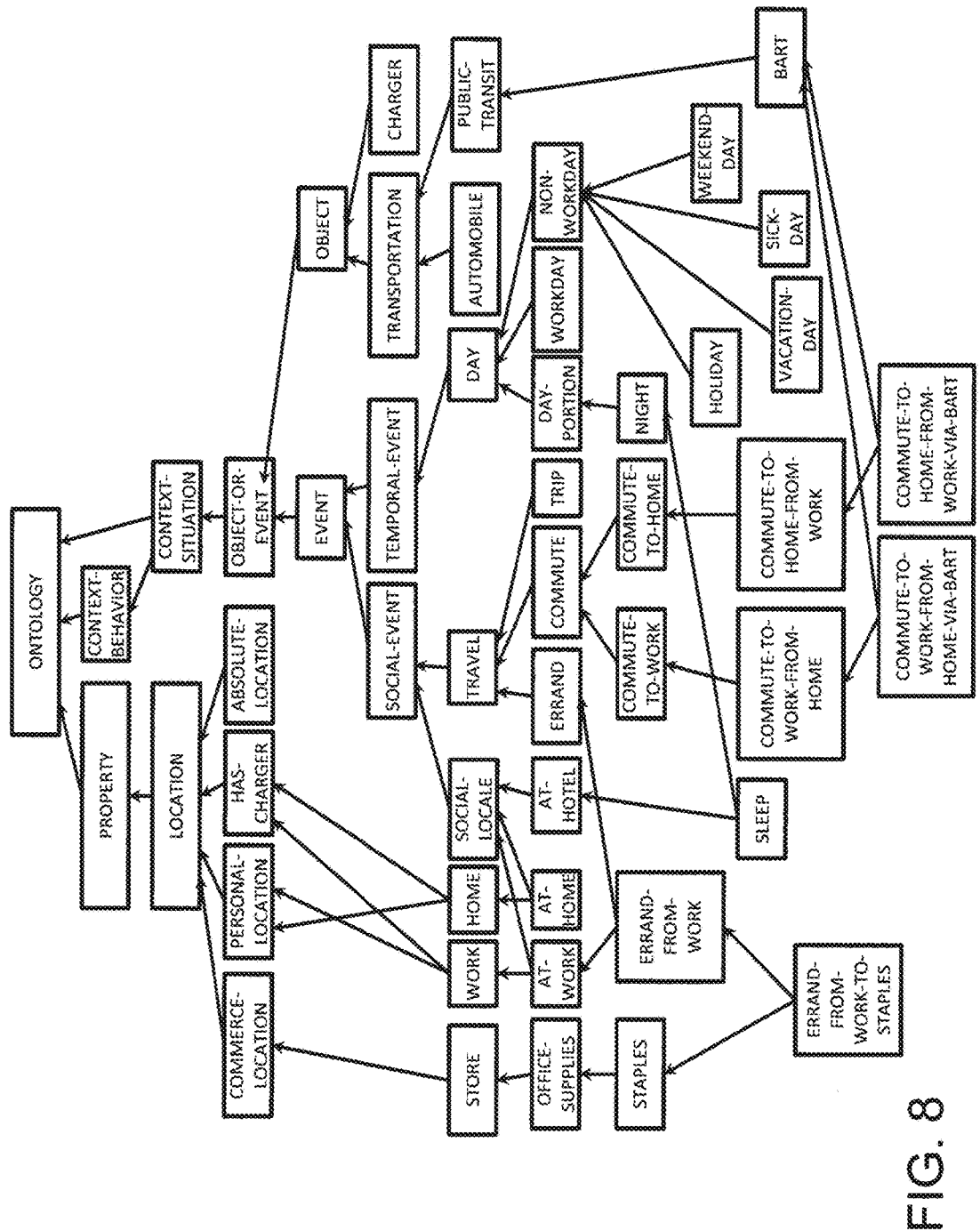
FIG. 8 shows an example of an ontology.

FIG. 8 shows a more detailed diagram of an example of a context ontology. The context ontology may be referred to as the Context Ontology with Resource and Policy Semantics repository or CORPS. The example shown in FIG. 8 is a subset of the CORPS ontology that can be used for making context-based determinations and predictions, identifying normal patterns of activity, and identifying abnormal patterns of activity. The predictions can relate to resource usage, device compromise, and other predictions.

Referring now to FIG. 8, a set of high level data categories with particular values for the high level data may be called a context situation. This feature may be referred to as context-awareness. For example, a set of processed context information regarding device location over time may show that the device is moving at a speed of 2.5 miles per hour (mph). This set of high-level data (which was generated by processing low-level position data over time) corresponds to a context situation, one that could be conceptually labeled as LOW-SPEED-MOTION.

A different set of high-level data from an accelerometer sensor on the computing device could after preprocessing be determined to represent the small shocks of feet hitting the ground at a regular pace of 1.5 times per second, which corresponds to a normal pace of foot-ground impacts when walking. This context situation could conceptually be labeled as TAKING-STEPS.

Note that neither of the two context situations above necessarily implies that the user is walking (moving on foot). In the former case, the user could be riding in a low speed conveyance and not walking. In the latter case, the user could be walking in place and not moving anywhere. If both context situations, LOW-SPEED-MOTION and TAKING-STEPS are occurring at the same instant in time, this likely represents a higher level conceptual context situation WALKING. The WALKING context situation has fused information from multiple sources and represents an inference, or the result of a reasoning process on other context situations. All three context situations can be considered as active at this point in time.

The manner in which conceptual context situations are related to each other is an ontology. An ontology is a lattice of nodes corresponding to concepts that have various properties or values, and in which nodes may have various relationships to other nodes; in this definition we use the mathematical meaning of the term lattice. The use of the ontology allows for the economical composition of context situations that have different levels of granularity, or represent successively more complex or abstract context situations. Context situations are modeled in the ontology according to their potential usefulness in other activities, such as defining policy rules for context adaptation, or for data security or privacy enforcement. The ontology can be expressed using a variety of formats, such as OWL (Web Ontology Language) or KIF (Knowledge Interchange Format).

A context situation is something that is happening at a particular point in time. Context information can change, which means that a given context situation may no longer be active or current because of the change in context information, but a new context situation may now be active or current. Multiple context situations can be active at any point in time, either because the context situations represent different levels of abstraction, or because they relate to different dimensions of context, or because they are compositions of multiple concurrent context situations.

For example, the context situations COMMUTE and COMMUTE-TO-WORK and COMMUTE-TO-WORK-FROM-HOME and COMMUTE-TO-WORK-FROM-HOME-VIA-BART (or TRAIN) may all be active at the same time, but they represent different levels of abstraction. The context situation USING-EMAIL-APP may be occurring at the same time as all of these other context situations. More specific combinations of co-occurring context situations can be made explicit and labeled to the extent that they are useful for policy management.

For example, if it were useful, the context situation USING-EMAIL-APP-WHILE-COMMUTING-TO-WORK-FROM-HOME-VIA-BART could be made explicit. In general, the Context Manager decides how far to go in recording information about combination context situations based on how frequently they occur in the user and device history. A highly detailed combination context situation that only has ever occurred once is not likely to be useful in the future, and thus would not be explicitly represented.

On the other hand, a highly detailed combination that occurs very frequently could be useful in making resource predictions, predictions of device compromise, predictions of security breaches, identifications of anomalies, and so forth. A sequence of context situations is one form of what may be called a context behavior. The context behavior could involve major changes in a context situation, such as the user leaving work, and then commuting home. This is a sequence context behavior.

Another form of a context behavior is one in which there are multiple context situations involved, but a higher level context situation may still be active throughout the entire context behavior. An example is a context behavior in which the context situation AT-WORKPLACE is active for eight hours, during which a variety of lower level context situations such as WALKING, MEETING, and TYPING occur. This is an aggregate context behavior.

Both context situations and context behaviors can have different levels of abstraction, or different granularities of time resolution, and can contain other sequences or context behaviors. U.S. patent application Ser. No. 13/686,028 (the '028 application), filed Nov. 27, 2012, provides further discussion of context and is incorporated by reference along with all other references cited in this application. In an embodiment, context situations and behaviors may be determined wholly or in part by such machine learning techniques as clustering of particular combinations of monitored or acquired data, and results of various automatic and manual evaluation and analysis processes.

The policy manager is responsible for policy enforcement. The policy manager may take action on the computing device elements (applications, operating system, resources). Actions can include starting an application, killing a running application, disabling a resource, or modifying the current state or configuration settings of an application or the operating system or resource. Actions can include the policy manager directly and automatically taking the actions, or prompting the computing device user for permission to take the actions, or suggesting to the computing device user that the user take specific actions. Actions can include changing the type or level of monitoring on a device. Action can include alerts, notifications, or reports to the user or to network or enterprise administrators, or to suppliers of applications or device components.

The components may function at the application program level, firmware, or operating system level in order to carry out their respective functions. More particularly, in a specific implementation, one or more of the components are included in an application program. In this specific implementation, the application program may be available for download on an application marketplace.

Some examples of application marketplaces include Google Play Store, iOS App Store, Amazon Appstore, and others. Instead or additionally, the application program may be pre-loaded onto the device such as by the device manufacturer or a network provider. In another specific implementation, one or more components are operating system specific code modules that can be implemented as libraries and device drivers.

More particularly, in some embodiments, the policy manager may operate in the device as a client application hosted by the device, as is shown in FIG. 6. In an alternative embodiment, the policy manager may be provided by and integrated within the operating system of the device.

In either of the embodiments, the policy manager may be configured to manage the creating and applying of policies described herein. In another embodiment, the policy manager may operate on a server in communication with the device. For example, the policy manager may be executed on a server and may create the policy to be assigned to the device.

In some embodiments, the server may receive data (e.g., an identification of personal data) from the device, create a policy based on the received data, and then transmit the policy to the device. In an alternative embodiment, functions of the policy manager may be distributed between the device and the server. For example, certain components or modules of the policy manager may be executed by the device while other components or modules may be executed by the server. As such, both the device and a server may perform actions associated with the creating and using of a policy as disclosed herein.

In various specific implementations, the monitoring on the device could take place from an application, could take place from the kernel either as a module or elsewhere, could take place from a secure mode such as from the ARM TrustZone, could take place from the baseband radio (baseband radio, baseband processor, baseband radio processor); or it could take place from the Boot ROM; or it could take place in the graphics processor (GPU) or the video interface; or it could take place as part of a System-On-Chip (SoC) trace or debug solution (such as the ARM CoreSight™ technology, or the System Trace Macrocell (STM) and Trace Memory Controller (TMC)); or it could take place from a DSP or other processor on the device, including ones that have their own different primary purpose, or ones that are in place primarily to support monitoring, debugging, or tracing activities.

Monitoring could take place from a memory controller. It could take place from an audio or video codec. It could take place from a power processor. It could take place from a storage device (internal or external to the device) or from storage controllers or storage device drivers. It could take place from a camera or camera DSP or processor. It could take place from an external connector driver or processor (for example USB 2.0/3.0 network connectors or device drivers). It could take place from a power management processor or controller or device driver. It could take place from a system bus which is transporting data from one part of the device to another part of the device. It can consume any debugging or trace information available from any component on the device, including, for example, the System Trace Protocol (STP from the MIPI® Alliance).

Monitoring may be through any appropriate interface. For example, there are various Mobile Industry Processor Interfaces (MIPI) for monitoring, e.g., MIPI Battery Interface (BIF), MIPI Camera Interface (Camera Serial Interface, CSI, CSI-2, CSI-3), System Trace Protocol (STP, STPv2), Open System Trace (OST), Parallel Trace Interface (PTI), Trace Wrapper Protocol (TWP), DigRF$^{SM}$ or RFFE (RF Front-End); Display Interface (Display Serial Interface DSI, Display Command Set DCS, Display Pixel Interface DPI, Display Bus Interface DBI, High Speed Synchronous Serial Interface HIS, Low Latency Interface LLI, Device Descriptor Block DDB, Serial Low-power Inter-chip Media Bus SLIMbus®, System Power Management Interface SPMI, Unified Protocol (UniPro), just to name a few examples.

Monitoring could take place from or using the touch-screen controller; or it could take place from or using the battery or other replenishable power supply charging controllers. Or it could take place from an instrumented virtual machine (such as the Android Dalvik VM or a Java VM). It could take place from or using a motion or other sensor-oriented or context-management coprocessor such as the Apple M7 processor.

Monitoring could take place from the network itself. For example, monitoring can include the personal constellation of a user's personal devices; or from the IoT (Internet of Things) in the home or the workplace or the car; or from a virtual private network (VPN) pipe. Monitoring can include firmware image data, network behavior, filesystem behavior, process behavior, operating system kernel state and behavior, information regarding whether a device has been rooted, etc.

Figure 7:
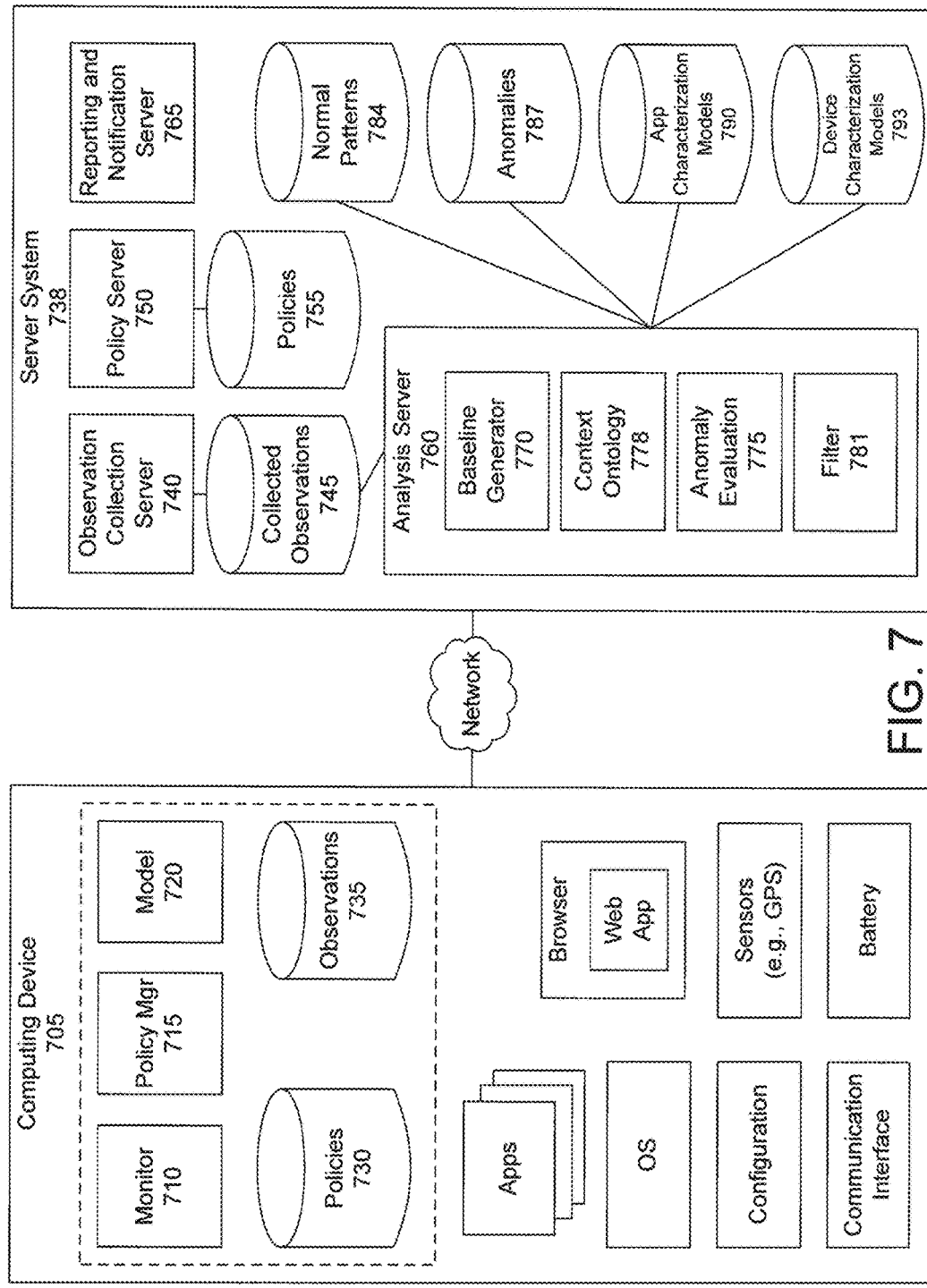
FIG. 7 shows a block diagram of a system including a computing device and a server for device monitoring, evaluating, and responding.
Figure 9:
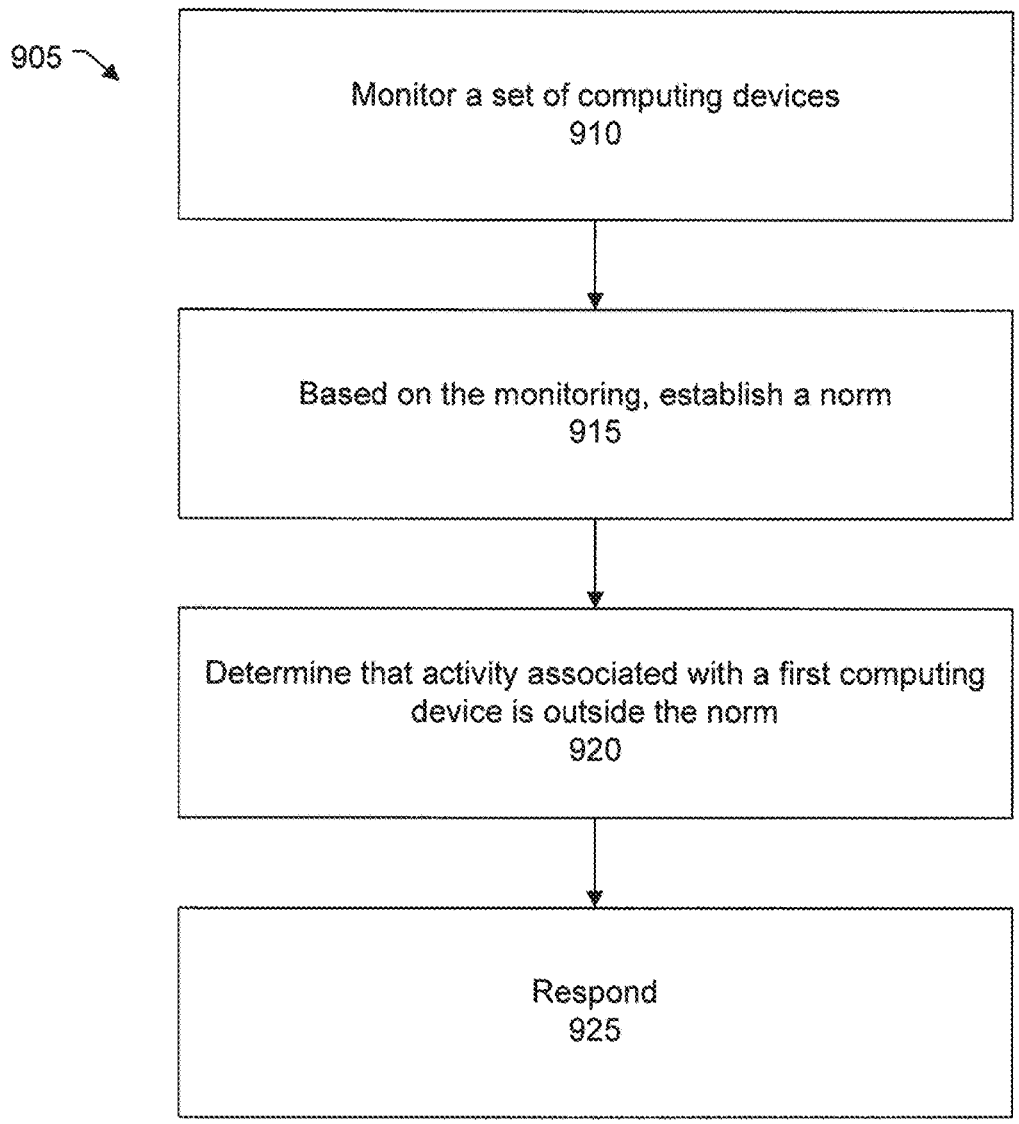
FIG. 9 shows a flow diagram for device monitoring, evaluating, and responding.
Figure 10:
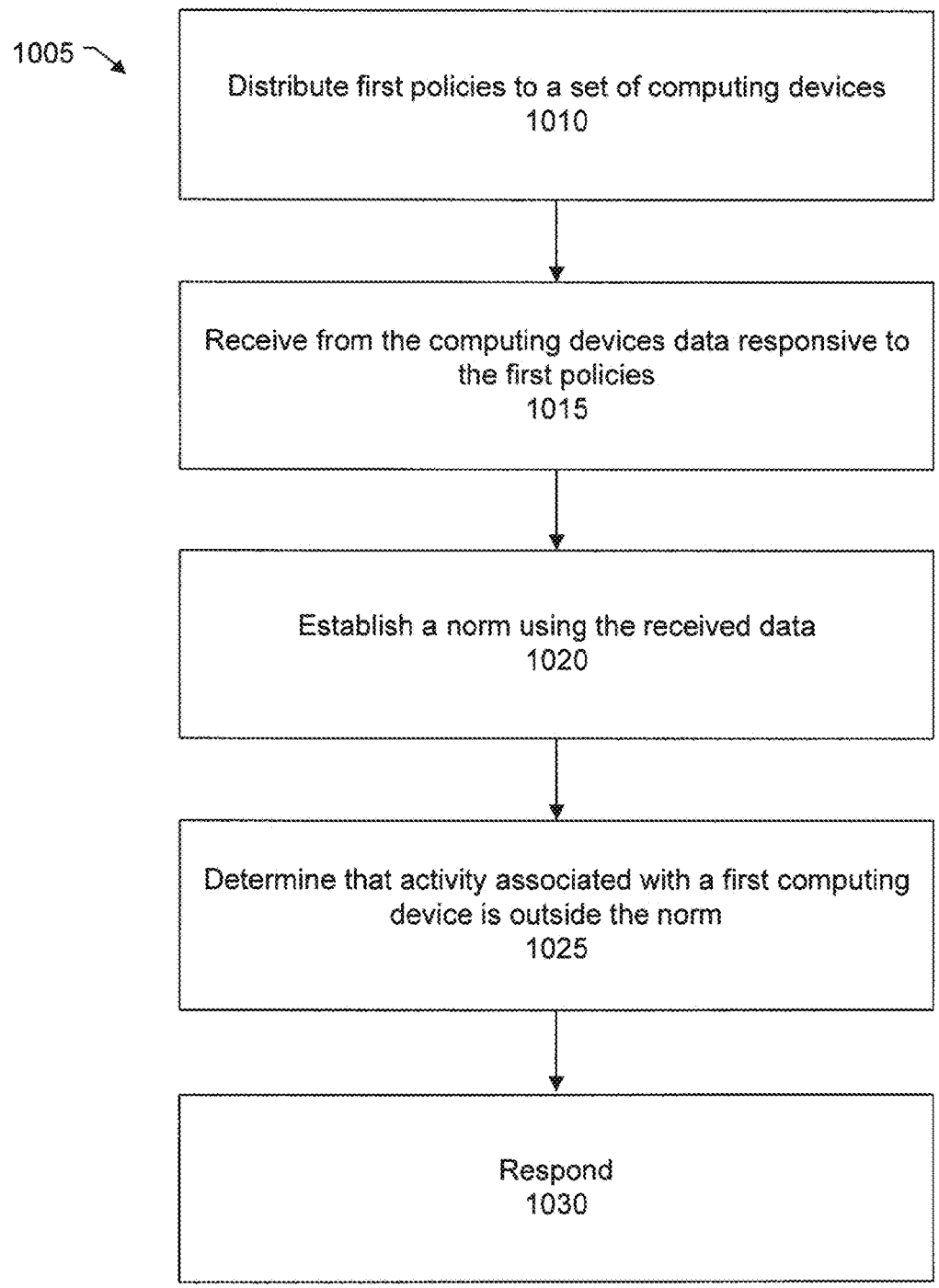
FIG. 10 shows a flow diagram for distributing and updating policies.

FIG. 7 shows a more detailed block diagram of a specific implementation of a system for monitoring, evaluating, and responding to anomalies. FIG. 9 shows an overall flow 905 of a specific implementation of the system shown in FIG. 7. FIG. 10 shows an overall flow 1005 of a specific implementation for policy-based monitoring, evaluation, and response.

Referring now to FIG. 7, in this specific implementation, a computing device 705 includes components of a monitoring system including a monitor 710, policy manager 715, model 720, policy database 730, and observations database 735.

As discussed, the monitor is responsible for observing configuration, state, and behavior on the device. Monitoring can include behavior logging, network capture, network logging, location logging, etc. Such observations are stored in observations database 735. In a specific implementation, the observations are transmitted to the server for evaluation and analysis; in such a case the observations may or may not be stored on the device in the observations database 735. The policy manager is responsible for policy enforcement. Policies provided to the device are stored in policy database 730. The model indicates what behavior is normal.

This system further includes a server system 738 that includes server-side components including an observation collection server 740, a data store 745 for storing collected observations, a policy server 750, a data store 755 for storing policies, an analysis server 760, and a reporting and notification server 765.

There can be multiple servers that are part of a server system 738, and these several servers may be responsible for different parts of the monitor, evaluate and response activities. For example, a security provider may operate a server system which connects with a particular set of consumer computing devices, and an enterprise may operate a server system which connects with a different set of enterprise-related computing devices. These several systems may communicate and share collected observations, normal patters, anomalies, app characterization models, and device characterization models.

The analysis server analyzes the observations collected by the collection server. The analysis server includes a baseline generator 770, anomaly evaluation component 775, context ontology 778, and filter 781. Output from the analysis server is stored in various data stores. Specifically, a data store 784 stores baselines or normal usage patterns, a data store 787 stores anomalies, a data store 790 stores application characterization models, and a data store 793 stores device characterization models.

Referring to FIG. 9, in brief, a flow of the system includes monitoring a set of computing devices (step 910) to collect observation data, based on the monitoring, establishing a norm or baseline (step 915), determining that activity associated with a first computing device is outside the norm (step 920), and responding (step 925).

In a specific implementation, the monitoring, evaluation, and response is based on one or more policies. For example, in a specific implementation, a flow of the system includes distributing first policies to a set of computing devices (step 1010—FIG. 10), receiving from the computing devices observation data responsive to the first policies (step 1015), establishing a norm using the received data (step 1020), determining that activity associated with a first computing device is outside the norm (step 1025), and responding (step 1030).

Observations can include device events, states, state changes, configuration, user activity, application activity, duration of activity, geographic location of device during such activity (e.g., longitude and latitude), application requests (e.g., programmatic requests to operating system services and resources), date and time of occurrence, accesses to user data (e.g., accesses to user contacts), applications that have been installed, network connections that have been made, types of network connections made (e.g., virtual private network), remote services that have been called, websites that have been contacted, or combinations of these.

An observation can include device data, application data, or both. U.S. patent application Ser. No. 12/868,669, filed Aug. 25, 2010, now U.S. Pat. No. 8,347,386, issued Jan. 1, 2013, which is incorporated by reference, includes a discussion of device and application data that may be provided to the server for evaluation and analysis. In particular, device data pertains to the state, capabilities, operating system, firmware version, memory capacity, available communication ports, battery limitations, hardware characteristics and other "baseline" information that may be common to all similar devices absent user customization. Device data may include the default specifications for a device as it is received from a manufacturer, service provider, or IT service. Device data may include state information common to all similar computing devices after they have all been upgraded in some fashion.

Further discussion of what information may be transmitted to a server for analysis regarding malware or other is provided in U.S. patent application Ser. No. 13/460,549, filed Apr. 30, 2012, U.S. patent application Ser. No. 13/461, 054, filed May 1, 2012, U.S. patent application Ser. No. 13/461,984, filed May 2, 2012, U.S. patent application Ser. No. 13/689,588, filed Nov. 29, 2012, U.S. patent application Ser. No. 13/033,025, filed Feb. 23, 2011, U.S. patent application Ser. No. 12/868,672, filed Aug. 25, 2010, now U.S. Pat. No. 8,533,844, issued Aug. 25, 2010, U.S. patent application Ser. No. 13/958,434, filed Aug. 2, 2013, U.S. patent application Ser. No. 13/484,132, filed May 30, 2012, U.S. patent application Ser. No. 12/868,676, filed Aug. 25, 2010, U.S. patent application Ser. No. 13/896,852, filed May 17, 2013, U.S. patent application Ser. No. 13/335,779, filed Dec. 22, 2011, U.S. patent application Ser. No. 12/255,621, filed Oct. 21, 2008, now U.S. Pat. No. 8,108,933, issued Jan. 31, 2012, U.S. patent application Ser. No. 13/333,654, filed Dec. 21, 2011, now U.S. Pat. No. 8,381,303, issued Feb. 19, 2013, U.S. patent application Ser. No. 13/741,988, filed Jan. 15, 2013, and U.S. patent application Ser. No. 13/742,173, filed Jan. 15, 2013—all of which are incorporated by reference.

More particularly, application data includes data that pertains to a particular application, file, or object that may be installed or run on a computing device. Application data includes both data objects and information about data objects, such as behavioral data, metadata, a hash of the data object, or combinations of these. Data objects include application packages that may be particular to certain computing devices.

For example, iPhone OS devices typically use IPA files or APP packages, Android OS devices typically use APK files, Windows Mobile devices typically use CAB, EXE or DLL files, and Symbian OS devices typically use SIS files. Devices may also support cross-platform application formats such as the SWF format underlying Adobe's Flash runtime or JAR files that can be run on Java virtual machines.

Application data includes data objects that are malware or spyware, and thereby can negatively affect a computing device. Malware and spyware include applications, files, and other data objects that are purposefully designed to adversely affect or steal information from a computing device.

Application data also includes data objects that are not designed for nefarious reasons, but may have coding flaws or other issues that can negatively affect a device. Application data also includes data objects that may be undesirable for various reasons. For example, a data object may be undesirable because it compromises privacy, overtaxes a device's battery or network connection, has objectionable content, or combinations of these.

Application data includes metadata about data objects. For example, metadata is information about a specific data object, rather than the data object itself. Metadata includes the location on a computing device's filesystem where a data object is stored, a hash of the data object, the name of the data object, a unique identifier present in or associated with the data object such as a GUID or UUID, security information related to the data object such as its cryptographic signer information or level of permissions granted, and characteristics of how the data object is installed on or integrates with the computing device's operating system.

Metadata for a data object may also include from where the data object came (e.g., a URL from where it was downloaded, an application marketplace from which it was downloaded, a memory card from where it was installed or stored). Metadata may also be retrieved from an application marketplace. Such metadata, called marketplace metadata, includes information about a data object such as the title, number of downloads, user comments about the data object, user reviews, user ratings, the description of the data object, permissions requested by the data object, hardware or software requirements for the data object, information about the data object's author, the price of the data object, the language or languages supported by the data object, screenshots, and other information that a marketplace may provide.

Metadata may include information about the data object (e.g., application program) that is displayed on an application marketplace, online forum, blog, social network platform, or combinations of these. Additional metadata for an object can relate to how and where the data object is stored in a filesystem. For example, the filesystem permission flags for the data object, the time created and modified and last accessed, the setuid and setgid permission bits. Additional metadata can be associated with the filesystem within which the data object resides, such as filesystem mount point information, filesystem partion sizes and types, mapping to physical hardware, etc.

In an embodiment, application data also includes behavioral data. Behavioral data includes information about how an application interacts with or uses a computing device's resources, such as memory usage, battery usage, network usage, storage usage, CPU usages, API usage, errors and crashes, network services connected to (e.g., remote host address and port), and runtime library linkage. Behavioral data also includes information about how an application, file or data object, when it is run, utilizes the functionalities of the computing device's operating system, such as notifications and messaging between processes or installed applications.

Behavioral data may include information about what the data object did when it ran on the device. Examples of behavioral data include information about network connections caused by the data object (e.g., server names, source/destination addresses and ports, duration of connection, connection protocols, amount of data transmitted and received, total number of connections, frequency of connections, and network interface information for the connection, DNS requests made), behavior of the data object when run (e.g., system calls, API calls, libraries used, inter-process communication calls, number of SMS messages transmitted, number of email messages sent, information about user interfaces displayed, URLs accessed), overhead caused by the data object (e.g., battery used, CPU time used, network data transmitted, storage used, memory used). Other behavioral data includes the context when a particular behavior occurred (e.g., whether the phone's screen was off when the data object sent an SMS message, whether the user was using the data object when it connected to a remote server, etc.).

Other examples of observation data that may be collected include security related events such as: device not checked in (e.g., device not checked in with the Lookout for Business (L4B) application or monitoring infrastructure or a Mobile Device Management (MDM) application); device does not have device admin specified or it is turned off; security module was uninstalled (applicable in embodiments having a persistent piece/watchdog which can detect this, such a piece may be a preload or separate app install); malware/adware/spyware discovered; malware/adware/spyware still present; phishing site encountered/blocked/ignored; device rooted; root enabled; side loading enabled; personal identification number (PIN) code or password not set; encryption not set; Subscriber Identity Module (SIM) card swapped; security program features triggered; device connected to insecure wifi; device powered off; device battery removed; etc. These examples of observation data include both event and state data. A difference between the two includes that events happen and can be sent to a server, whereas state is something that changes so that on each state change, the device may send updates to a server.

Baseline generator 770 (FIG. 7) is responsible for establishing a norm. The generator can baseline what constitutes normal activity for a herd of users, devices, applications, or web sites. In an embodiment, norms are the usual values for configuration and state, and the usual values for behaviors observed. Norms can be with respect to a particular population. A population may be defined by a particular filter or set of characteristics or values on configuration. E.g., all Samsung Galaxy S4 phones with a given level of firmware and given version of operating system using network operator Verizon. A filter can be broad, using only some characteristics, or very detailed, using many characteristics of values. Different levels of norms can be defined for different levels of filters.

Table B below shows an example of a frequency norm for a particular application program Y.

TABLE B

| Permission | Norm |
| --- | --- |
| Make phone calls | 5 |
| Read Contacts | 3 |

The first column in Table B above lists the permissions requested by application program Y. The second column lists the norm for each permission. In this example, the value for a norm is a frequency. For example, according to the data in Table B, the norm for phone calls by application Y is five phone calls over a particular time period. The norm for accessing user contacts by application Y is three times over the same or a different time period. Norms in general can relate to the type or kind of state or event or sequence of events or frequency of events; there can be norms for any individual type of collected data or context information or for combinations of data or context information.

The norms are calculated using data gathered across the herd or set of devices. In this example, each device of the set of devices includes an installation of application Y. A monitor module of the system on each of the devices has made observations associated with application Y activity (e.g., phone calls by application Y and reading of contacts by application Y). The observations are sent to the collection server. The analysis server has analyzed the collected observations and established norms for application Y as shown in Table B above.

In this example, the norm is a measure of central tendency. A measure of central tendency is a central value or a typical value for a probability distribution. The norm can include or represent, for example, an average, arithmetic mean, median, mode, geometric mean, harmonic mean, weighted mean, truncated mean, interquartile mean, midrange, midhinge, trimean, Winsorized mean, geometric median, or some other central or typical value. A norm may be such a value, or can be modeled in other ways, such as a mean and standard deviation for a frequency norm, or a list of usual network endpoint locations to which an application connects, or a list of system services invoked by an application, etc.

Norms can be used to define policies for monitoring configuration, state, and behavior of elements of a device. Norms can be used to define policies for evaluation of conditions on a device. Norms can be used to define policies for response to detected or suspected conditions.

Anomaly evaluation component 775 is responsible for identifying anomalies. In an embodiment, anomalies are the opposite of norms. For a given filter, observed configuration or state or behavior outside the norms represents an anomaly. A deviation of known applications (or apps) from known behavior can indicate an anomaly.

For example, Table C below shows the sample data in Table B above for an application program Y and some corresponding sample data for an application program Y' that is masquerading as application program Y.

TABLE C

| Permission | Norm | Application Y' |
| --- | --- | --- |
| Make phone calls | 5 | 15 |
| Read Contacts | 3 | 5 |

From the sample data in Table C above, application Y' made 15 phone calls as compared to the 5 phone call norm for application Y—a deviation of 10 phone calls above the norm of 5. Application Y' read the user's contacts 5 times as compared to the norm of 3 times—a deviation of 2 above the norm of 3. If, for example, the threshold deviation for the permission "make phone calls" is 4, the 15 phone calls made by application Y' would be identified or flagged as an anomaly. If, for example, the threshold deviation for the permission "read contacts" is 3, the 5 accesses of contacts by application Y' would not be identified as an anomaly.

Factors that can be used in making assessments or evaluations include:

1) Protocols used by the app, for authentication, for data transmission? Is HTTPS/TLS used? For web apps, is there mixed use of HTTPS/HTTP resources?

2) Is there server push to the application? How frequent? From what network locations? Do the network locations of server push change?

3) Are there push notifications for the app? What protocols or technologies are used for notifications? How are notifications displayed on the device? What is the frequency of notifications?

4) What are the sources for the app? (app stores, websites, side loads) How frequently is the app updated from each of these locations? How old is this app version? How many users of this and previous app versions (as reported from an app store, as measured in system's database)? What is the entire history of app versions, including sources of app downloads, popularity of install at different time periods, what devices and device configurations across the app installs (including device hardware, components, firmware versions, OS levels, service library versions, etc.).

5) What data sources or device services or sensors are accessed or updated by the app? How frequently? How much of these data sources (e.g., accesses one contact at a time, or a small number, or a large number or percentage, or all contacts)? Is data from these sources sent off the device? How frequently? To what locations? Under what contextual conditions (context situations and context behaviors)?

An anomaly by itself may indicate a condition, or may need to be interpreted by an evaluation or assessment function, which is driven by an evaluation policy. An evaluation policy determines a condition assessment, which may dictate particular actions from a response policy. Observations or events may have variables, characteristics, or features with attributes that can be binary, categorical or continuous, or may have only one attribute univariate or multiple attributes multivariate.

In an embodiment, the system detects observations that support known/identified conditions (indicator of compromise, indicator of lost device, indicator of found, indicator of different user, etc.); and unknown conditions (anomalies).

Some examples of the different types of anomalies that may be identified include point anomalies, contextual anomalies, and collective anomalies. A point anomaly includes a simplest, a single instance of an observation that does not fit the norms. A contextual anomaly refers to an observation that is normal in one context but not another. There can be contextual attributes and behavioral attributes. Contextual attributes determine the context for interpretation. Behavioral attributes can be used to determine indicators.

A collective anomaly describes a set or sequence of observations that individually are not anomalous but taken together are anomalous. Contextual anomalies can include contextual attributes and can be spatial, graphs, sequential, or profile. Further discussion of context is provided in the '028 application.

In an embodiment, the system makes predictions not just about resources (e.g., battery level), but about conditions which may be extant on the device, e.g., indicator of compromise, indicator of lost device, and so forth. Context situations and context behaviors can include "configuration context situations" and "configuration context behaviors."

For example, the particular values for versions and levels of device components, firmware versions, and operating system versions represent on example of a configuration context situation. A change in firmware version, e.g., as rolled out by a network operator, constitutes a "configuration context behavior," a temporal sequence of different configuration context situations.

More particularly, in a specific implementation, a technique of the system includes device/firmware fingerprinting. There are a number of sources of data for firmware and build identification. Data gathered at registration time, and periodically updated by clients can be used to perform security analysis on the state of security in the platform ecosystem. This data, however, can require significant post-processing and the fields available vary (and sometimes change) across OEM and device-builds. An embodiment of the "continuous monitoring" system acquires information about changes in firmware and builds a first-class data set about the state of patch cycles in the field.

There are a number of indicators of compromise that the system can find a means to monitor on clients. In an embodiment, the system enables "probes" to watch for these indicators of compromise on client devices and signal events to back-end infrastructure for monitoring purposes. The system monitors network behavior and changes in firmware to enable Host and Network IDS capabilities through back-end data modeling and analysis. The system monitors, profiles, and scores the state of the device's configuration in real-time or near real-time.

Anomaly detection can be supervised, semi-supervised, or unsupervised. These are machine learning terms of the art for automated procedures of inferring a function with or without labeled training data. For supervised anomaly detection, there are labeled data/examples are available for normal and anomalous conditions; the labeled data/examples constitute the "supervision." For semi-supervised anomaly detection, labeled data/examples exist only for normal class. Unsupervised anomaly detection does not require training data. The techniques in this category make the implicit assumption that normal instances are far more frequent than anomalies in the test data. In a specific implementation, unsupervised anomaly detection is the operating assumption. Once the system has classified or labeled something, as in the norms or as being anomalous, the system can also use semi-supervised and supervised methods.

In a specific implementation, the output of anomaly detection includes scores or labels; scores with thresholds or ranges of scores can be used to derive labels. In a specific implementation, evaluation policies are used to determine a set of indicators of conditions. Examples of indicators include an indicator of compromise, lost device, stolen device, found device, or data compromise.

An indicator of compromise includes an indication that there has been compromise or attempted compromise of components or applications or data or the device itself. An indicator of lost device refers to an indication that the device is no longer in the possession or control of its normal user. For example, any of the following can represent an indicator of compromise around device state: the introduction of new executable code in an anomalous fashion (eg not a user-installed app, and not a mainstream firmware update); the modification of system-owned portions of the device indicating presence of a persistent back-door or other anomalous modification to a portion of the device (typically firmware) that requires privilege and where system updates are the normal modification vector; the introduction of new kernel code through loadable modules or other means that indicate an abnormal running state of the operating system kernel; the modification to key OS kernel structures—including but not limited to system call tables, interrupt service tables, process identity and privilege structures, internal executable linkage structures, loadable module state, or device driver callback structures indicating a compromise of the integrity of the kernel; the launch of new and unexpected processes at an elevated or otherwise abnormal privilege level.

Indicators of lost device can include a deviation in device typing or touch patterns or carrying or holding patterns (angle, position, height of device while interactions take place), or pattern of applications used, for how long, with what frequency, in what sequence after unlocking or first attending to a device after a period of inactivity, etc. These can all indicate that a different user is interacting with the device. Response policies for this indicator can include requesting additional authentication.

An example of an indicator of lost device includes 1) a fall of device; 2) followed by period of no accelerometer activity; 3) followed by device being picked up; and 4) a plurality of failed login attempts. These events can be an indicator of lost device followed by an indicator of lost device found by someone. Other activities or sequence of activities could indicate lost device found by helpful stranger or lost device found by malicious person.

The system can analyze patterns of usage anomalies to determine whether or not a device should be classified as lost. Usage data may be gathered from an accelerometer (e.g., device placement on a table in a particular context may imply this is not the usual user, whereas device placement in a docking station may imply this is the usual user). Usage anomalies may include calls to new or different phone numbers (especially to ones not in the user's contacts database), different attention span (e.g., screen time on versus off), visits to new web sites, or combinations of these.

In an embodiment, an authentication component of the system can detect that the current user is different from the usual user. Detection can be through a model using sensors, usage, or both. Such detection may be used for authentication. In some cases, this signal may not be developed enough for initial authentication, but can "firm up" in terms of confidence over time, leading to authentication for higher level of access (e.g., the scenario of some apps accessible from lock screen with no or minimal authentication; matching models of usage that this is the proper user automatically grants higher level of authentication then access). In an embodiment, permissions can be prevented or requested dynamically.

An indicator of stolen device refers to an indication that the device has been stolen. A sequence of activities that may be an indicator of theft include removal of SIM card, battery, or both. An indicator of found device refers to an indicator further developed after an indicator of lost or stolen device. Sub-indicators are indicator of found-by-benign-person or found-by-malicious-person.

An indicator of data compromise refers to an indication of data (including sensitive data such as corporate data or personally identifying information (PII)) having been read for uses or in quantities not normal, or having been written or erased, or having been exfiltrated from the device.

Other examples of malware post-infection behavior indicators include all contacts accessed, location exfiltration, or at different times, or contexts, (e.g., location accessed when device not in motion), actions performed with no user initiation, unusual combination of all kinds of app behavior, access to accounts data store, new/different network connections by IP/domain/protocols, or combinations of these.

"Spreading Characteristics" (indicators that something has been compromised) may include a change in access patterns of processes and IDs to hardware components. For example, a particular application may exhibit different behavior if compromised or altered. In other words, a change in "normal" patterns can indicate compromise, or could indicate a new version. The system can distinguish between a new version of an application and a compromised version of the application using cloud-reported results. The cloud-reported results, the monitored data collected at a server, may show different observations for an application on one user's device from the same application on hundreds of other devices. An anomalous kernel state may be defined in terms of number and names of processes, their memory usage, measures of integrity checked.

An input to indicator determination can be something external to the device itself, e.g., a public notice of a hack or breach of a site or service to which device or its apps or web apps connect, which can raise other aspects or trigger certain responses. Aggregate responses from the crowd or herd can trigger responses on a device even if there were no indications directly from the device. Prophylactic responses or a heightened level of alert or protection can be raised or subsequently lowered.

The context situations and behaviors described in the '028 application can be extended to include indicators of compromise or lost or found or theft or data loss prevention (DLP) problems or PII problems, etc. Being in a different context situation can change what is considered anomalous or ok or known bad behavior or sensitivity to levels of anomalousness.

In a specific implementation, indicators are a result of monitoring observations and evaluation policies. Indicators can activate specific actions that are part of a response policy. A response policy can include actions which change the monitoring policy. A monitoring policy can specify what gets monitored, with what level of detail, what happens to observations, (e.g., are they fed into an evaluation policy decision making process, are they then sent off the device for an assessment or evaluation process running elsewhere, e.g., on a different device or on a server).

Actions can include changing configuration or state or settings on the device, disabling or uninstalling or blocking applications or services, sending notifications to users or administrators, determining device location or sounding device alarms or making sounds, backing up or encrypting or deleting data on device, etc, or combinations of these.

Techniques that can be used in anomaly detection include statistical profiling using histograms, parametric statistical modeling, nonparametric statistical modeling, Bayesian networks, neural networks, support vector machines (SVM), rule-based systems, clustering based, nearest neighbor-based, spectral methods (principal component analysis (PCA), compact matrix decomposition (CMD)), information theoretic (Kolmogorov complexity, entropy, relative entropy), mixtures of models, regression, or combinations of these. Neural network variations include, multi layered perceptrons, hidden Markov model (HMM), neural tree, autoassociative networks, adaptive resonance theory based, radial basis function-based, hopfield networks, and oscillatory networks.

In a specific implementation, events are gathered, monitored, or observed on multiple devices. In this specific implementation, the events are not logged per se, but are input to an evaluation/assessment process (which can occur on device or on other devices or servers) which is dictated by a current evaluation policy. Actions in a response policy might determine that monitored observations or aggregates or summaries or transformed versions of observations may be kept in memory for a limited period of time, or persisted to storage, or sent off the device.

Observables/monitored items may have an intrinsic severity level e.g., a single observable may lead the evaluation/assessment process to develop an indicator of compromise or indicator of lost device or indicator of stolen device or indicator of privacy violation or indicator of DLP data ex filtration or loss, etc. Or it may be a sequence of such items which lead to an indicator of a given condition.

Occurrence of enough of these particularly with combinations of other anomalous behaviors or events depending on sensitivity level for user or device or organization or sub organization (e.g., sales versus engineering or level of user expertise whether explicitly set or determined) or history of risky behavior or past malware events or lost devices, etc. can raise or escalate the level of response to indicators.

Current context can also affect assessment of event or confluence of events. There can be priming because events or indicators A and B have already occurred which may mean that there is a lowered sensitivity for next event C. In a specific implementation, risk models of device, applications, user, or combinations of these are generated. The risk model may be a configurable risk model (e.g. several types of risk are independently evaluated, and enterprise can configure how they add up to produce responses).

Determination of normal versus anomalous behaviors can be specified as known ok or known bad behaviors as single events or combinations or frequencies of events. Norms of behavior for a specific category of device plus OS level plus firmware level plus carrier can be provisioned to a device for on device assessment of good or bad or anomalous behavior.

Some differences in application behavior can be due to functional differences such as user expertise or types of tasks or nature of work, etc. or other factors. These differences may have clusters but all such clusters are significantly populated and thus not anomalous. But a sudden i.e., in short period of time, change in which cluster users, device, or application are in can be significant as an indicator for further investigation.

Further investigation might involve changing the set of event information gathered on the device from one set of information to another second set. The second set may be larger or smaller than the first set. The second set may involve more detailed anomaly detection than the first set. A response may include changing the sampling frequency or level of detail including going from counting events of a type to sending individual details and, optionally, including data or metadata for each event. Some sampling or gathering of information may be done in hardware, software, or both. A model of what behaviors are normal can be on server or in device.

Monitoring on device and subsequent evaluation can mean there may be no communication with server if behavior measurements lie within known ok areas. That is the measurements may be within the norms for the configuration context situations chosen to be active in a monitoring policy.

Several configuration context situations may be active at one time. Each configuration context situation may have different levels of granularity. E.g., one piece of monitoring policy may apply to an Android phone, for any device type or level of operating system or firmware. Another piece of monitoring policy may only apply for a given version of firmware, and a given hardware device model, and a given network operator.

Similarly, notions of "norms" can apply to 1) what is known to be the norm for a given user; 2) known ok for device; 3) known ok for OS; 4) known ok OS level; 5) known ok firmware level; 6) known ok for device to be rooted or not; 7) known ok for level of user; 8) known ok for age of user; 9) known ok for occupation of user; 10) known ok for organization or organizational unit of user; 11) known ok for contextual situation or behavior, or combinations of these.

For example, the analysis server can generate a normal context behavior model and an actual context behavior model. The actual context behavior model can be compared with the normal context behavior model to determine deviations, if any. For example, a user's expected morning routine may include relatively little use of the computing device, but the user's afternoon routine may include heavy usage of the computing device to, for example, make phone calls, run productivity applications, check email, and so forth. Consider, however, that for a particular morning the user's actual usage of the computing device deviates such that actual usage is lower than expected. The deviation may be an indicator of a particular condition (e.g., indicator of compromise or lost device).

In a specific embodiment, the analysis includes a rules evaluation. Rules can be for specific events or frequency of events or for if events or count or volume or only if anomalous for user. Rules can be authored by an analyst or administrator, or can be created by an automated association rule learning process. Association rule learning is a method for discovering relationships that exist between a number of variables in a large database.

Traditionally, association rules that are discovered have an associated support and confidence, which refer to how frequently the antecedent of a rule occurs within a dataset (support) and how frequently the consequence occurs when the antecedent occurs (confidence). Rules with high support are useful because they are applicable to a large portion of the data in a dataset. Rules with high confidence are useful in evaluating potential anomalies. E.g., if a rule states an operating system kernel process has 100% confidence of never making an internet network connection, then any operating system kernel process observed making an internet network connection is anomalous (with 100% confidence). In a specific embodiment, the analysis server applies machine learning techniques to evaluate the collected data, establish the norms, and identify anomalies. Learning can be unsupervised or semi supervised or supervised but former is generally the case.

Using component norms and evaluation policies to determine lost or stolen device characterization, or to determine that the device has been found by a benign or malicious actor, and the related is further described in U.S. patent application Ser. No. 12/372,719, filed Feb. 17, 2009, now U.S. Pat. No. 8,467,768, issued Jun. 18, 2013, U.S. patent application Ser. No. 13/160,447, filed Jun. 14, 2011, U.S. patent application Ser. No. 13/863,240, filed Apr. 15, 2013, U.S. patent application Ser. No. 13/423,036, filed Mar. 16, 2012, U.S. patent application Ser. No. 13/842,884, filed Mar. 15, 2013, U.S. patent application Ser. No. 14/050,644, filed Oct. 10, 2013, U.S. patent application Ser. No. 14/050,804, filed Oct. 10, 2013, U.S. patent application Ser. No. 14/051,261, filed Oct. 10, 2013, U.S. patent application Ser. No. 14/051,373, filed Oct. 10, 2013, U.S. patent application Ser. No. 14/051,343, filed Oct. 10, 2013, U.S. patent application Ser. No. 13/849,379, filed Mar. 22, 2013, and are incorporated by reference. Techniques applicable for using machine learning on the component norms and observed monitoring data to predict carrier or device churn are discussed in U.S. patent application Ser. No. 12/876,018, filed Sep. 3, 2010, now U.S. Pat. No. 8,538,815, issued Sep. 17, 2013, U.S. patent application Ser. No. 13/960,585, filed Aug. 6, 2013, and U.S. patent application Ser. No. 14/098,473, filed Dec. 6, 2013, and are incorporated by reference.

In a specific implementation, one or more evaluation processes may run in a specialized processor such as a GPU or baseband processor e.g., for dealing with events related to RF communication or in a sensor processor or in a neural processor (e.g., Qualcomm Zeroth processor).

In a specific implementation, there are classes of responses to determinations of bad or anomalous findings. A determination of bad or anomalous findings can include more or additional investigation, some limiting of function, a raising of the level of required authentication, a demand for immediate authentication, the turning on of logging of more or additional events including sending such logs off the device or shutting down certain apps or sensors or features or capabilities of the device, a changing of authentication requirements or credentials for external services (e.g., cloud services or websites including from device or from a server in response to an indication from device or from server), or combinations of these.

That is, there can be different classes of information for which there are monitoring policies, evaluation policies, and response policies. For example, there can be policies directed to device hardware configuration (including components, and firmware), policies directed to device behavior (including sensors), policies directed to device OS and related configuration and behavior, policies directed to device applications configuration and behavior, policies directed to web apps configuration and behavior, policies directed to system (device) or cloud services configuration and behavior, or combinations of these.

In a specific implementation, the system generates an audit trail of all configuration changes for the device (plus across the "herd" of similar devices). In this specific implementation, the audit trail can be used to develop context situations and behaviors for contextual norms and contextual anomaly monitoring and evaluation policies.

In another specific implementation, when there is a processor separate from the device's general purpose CPU, such as a Neural Processor (NPU), which is receiving monitoring policies and/or evaluation policies, the processor can accept such policies from a number of sources, e.g., from a number of different security programs, the processor or the program which places the policies into the processor for execution can protect these policies from: reading by a party other than the one which signed them, encrypting them, only allowing authorized parties to put policies into the processor, protecting results from the processor for privacy and security reasons with encryption or permissioning models, or combinations of these.

In an embodiment with such an NPU, there could be two or more different security programs which use the NPU to accomplish efficient monitoring of activities on the device with respect to a model or a policy. It would be disadvantageous to any particular vendor of a security program if other parties could examine the models or policies that are placed into the NPU by the security program vendor. Thus the presence of an authorization mechanism for writing models or policies into an NPU for execution, or for reading such models or policies from an NPU, serves to protect the intellectual property of the vendor of a security program using an NPU for such a purpose.

In another specific implementation, there can be in a monitoring or evaluation policy a large number of things to monitor or to check against. For example, there may be a list of known good or bad network locations or geolocations; both for storage reasons and for privacy protection reasons this information can be in a form which allows for monitoring and evaluation with having the details of the list discernible by other processes on the device; e.g., a Bloom filter downloaded so that the device can check if a match or not but not have actual history of user activities or a readable list of locations.

Bloom filters are data structures which are designed for extremely rapid and memory efficient operations to determine if an element is present in a set, and which do not disclose the complete description or enumeration of the set. For example, a Bloom filter for use in testing whether a network destination is in a set of known good destinations (or alternatively in a different Bloom filter, a set of known bad destinations) can test a given monitored network destination rapidly to determine if it is in a known good set (or known bad set); but the size of the data structure is markedly smaller than a list of all the destinations in the set, and markedly faster in terms of operation.

Monitoring or evaluation policies can use Bloom filters for any particular measurable or observable item on a device, or for combinations of such items, and can be used when it would be impractical to have an exhaustive list of values defining a set's membership function due to the size of such a list and the time it would take to perform matching against such a list. Typical operations involving a Bloom filter support extreme acceleration of operation. A Bloom filter is a probabilistic data structure which upon testing whether an element is a member of a set returns either "possibly yes" or "definitely no." That is, there can be false positives but never any false negatives. In the event that evaluation using a Bloom filter results in a "yes" answer, confirmation can be obtained by other means, such as by communication with a server which has the resources to hold an exhaustive list of items defining set membership.

An application characterization model stored in data store 790 may include a set of attributes that characterize application behavior. The set of attributes can include attributes related to security, reliability (crash frequency), network utilization, battery utilization, requested permissions, or combinations of these. A device characterization model stored in data store 793 may include a set of attributes that characterize device behavior. The set of attributes can include attributes related to battery life, dropped calls, other network connections, indicators of compromise, indicators of possible attacks, or combinations of these.

As an example, consider a network connection from a process that never makes network connections. This might be manifested in terms of a server-side policy that looks for anomalies of processes that never make network connections, or a device side policy that is perhaps hard-coded that if this process ever makes a network connection, flag or otherwise provide a notification. Another example of an anomaly includes a shared library that was loaded from the SD card and executed. This can be defined by the system as extremely anomalous behavior.

In a specific implementation, the system includes expert system. The expert system can be from the client side to the server side. The expert system can run in either place, or otherwise be provisioned to either place. In this specific implementation, the expert system provides for analyzing device characteristics. Such characteristics can relate to files (e.g., actual files stored on the system, their hash identifiers, number of files, or size of files), system integrity (e.g., changes to system integrity such as system partition changing, kernel image changing, or baseband radio changing in some way).

As another example, with respect to applications, a problem solved by the system includes identifying how an application behaves. This can include everything from whether not the application locates the user, whether or not it locates the user in the foreground versus the background. Locating in the foreground versus background are very different things. For example, if the user is interacting with an application and it locates the user, this is very different from the device being in the user's pocket while the user is walking around (but has not opened the application) and yet the application locates the user.

Another example of characterizing an application includes identifying the network connections an application makes. This could be the actual netflow (NetFlow is a network protocol developed by Cisco Systems for collecting IP traffic information), what servers it talks to (endpoints), on what ports, with what protocols (e.g., Transmission Control Protocol (TCP) or User Datagram Protocol (UDP)), how much data does it send, what is the duration of the connection, and so forth.

Application characterization could include the content of the network connection. For example, the application sent this data or it accessed this uniform resource locator (URL) via Hypertext Transfer Protocol (HTTP), or the server returned this Secure Sockets Layer (SSL) certificate as the server-side certificate, or any other piece of information that might be used to characterize.

Other characterization information includes timing information about the packets. This can be significant because computing devices (e.g., mobile computing devices), their presence on the network in terms of their negotiated data channel is often times determined by a timer. For example, if there is no data it will go to an idle state, if there is data it might go to a low channel state, and then if more data is sent within a particular time period it might go to a high channel state, then those states will idle back. So if the device is in a high channel state, say 30 seconds with no data the device will go back to a low channel state. Thirty more seconds of no data the device will go to an idle state.

However, if there is an application that is sending data at a rate that is slightly above those timers, there will be hysteresis moving from the low power to the high power or the low power to idle throughout the day. And this is a major problem for network operators. This can be detected looking at the timing of network transmissions by a given application. Characterization of an application can include a native executable or a webpage application.

In some cases, there is a trend away from applications (e.g., mobile applications or "apps") and towards web applications. In that case, the system may not need to be doing the same thing in the web browser. In that case instead of categorizing apps, the system can categorize webpages. Thus, the root webpage that is visited (it may be the direct URL with query parameters, it may be a given domain) can be characterized. The characterization may include identifying the network connections seen from this webpage, what capabilities of using HTML5 extended capabilities such as location, contacts, putting icons on home pages, recording voice, so on and so forth.

HTML5 and related specifications from the Worldwide Web Consortium (W3C) include the Web Audio API (which can allow audio recording from a device viewing a webpage in a browser), the Media Capture API (which can allow a webpage and thus a remote website to capture images, audio, or video from a device's camera and microphone), the Geolocation API (which can allow a webpage and thus a remote website to determine or track the geolocation of the device viewing the webpage), the DeviceOrientation Event specification (which can allow a webpage and thus a remote website to access the sensors in a device to determine orientation, motion, and acceleration). Any of these capabilities can be used to attack or compromise the privacy and security of the user of a device, thus it is important to identify and categorize the usage of such capabilities by web applications or webpages.

A problem solved by the system from a security standpoint is that the system can analyze some things in the lab, but not all the behavior will be triggered in the lab. A clever adversary can detect that they are in a VM (virtual machine) or detect that they're not on one of their target devices. It is almost an infinitely complicated problem to simulate all possible use cases particularly in the form of a targeted attack. For example, the payload may only trigger if you are in the Metro DC area. And, as a dynamic analysis system, in some cases it will be challenging to simulate or even determine where this logic lives. It can be challenging to simulate all possible locations in the world on the device. That may be a computationally infeasible problem.

Similarly, for webpages the same problem is present. That is, most historical analysis systems took place on the server side. However, gathering data from devices, from sensors out in the world, allows for a determination of the web page's behavior both in terms of what network connections it makes, e.g., loaded images, javascripts, talking to the device, and possibly in terms of if you also instrument the browser itself and look at its capabilities, look at what the impact of the browser on the system is.

For example, if the browser is compromised, then all of a sudden it may start loading up more shared libraries than it normally does, or making direct inbound network connections, or dropping things in various places on the system that it shouldn't be. That in and of itself can be a signal, and that can be attributed back to the webpage itself.

So, there can be a strong tie-in between the application characterization and a browser, in particular, web page characterization. These things can live together. Characterizing that the browser process might take into account what active web pages are being visited by the browser process. And tagged with "the browser did these things when it visited this webpage." So, in some implementations, systems for the characterization of applications, web browsers, and web applications and webpages are not separate systems (although they can be separate); they can be linked.

Frequently used browsers on mobile devices are now or may in the future begin to support extensions in the same way that desktop browsers do (e.g., Firefox, Chrome, etc.); such extensions (including plugins, browser helpers, and the like) present a large increase in the potential attack surface. In a specific implementation, a method includes instrumenting both the process and other aspects of it (browser extensions, etc.). This instrumentation may in an embodiment include a component which runs at a greater privilege than the browser, this component not even in the browser, but looking at the browser, with inspection of what the browser has visited. The system using this instrumentation can then detect a variety of potential or actual attacks. In a specific implementation, there is an inspection module that inspects resources (e.g., web pages) visited by the browser. In this specific implementation, the inspection module is separate from the browser. Privileges associated with the inspection module may be greater than privileges associated with the browser.

Referring now to step 910 (FIG. 9), as can be appreciated there is a large amount of data available for collection. If the aperture of monitoring is wide open, the benefit of collecting such a large volume of data may be outweighed by the cost of collection given today's cost of storage, bandwidth, etc. Thus, a feature of the system can include a "variable aperture" to weigh the cost of data collection in terms of privacy and performance, and limit the amount of data gathered accordingly.

For example, the system provides the ability to gather a large amount of information, everything from the actual content of network streams, to the battery, to the types of networks it connects to. Consider that something such as a web browser where the server knows this is a web browser it will connect to many different services.

In some cases, it is not important to understand what the browser connects to. That may not be a significant indicator for a particular application. This could be detected automatically or it could be set manually. In some cases, there is so much variation in these services connections that may not be worth monitoring, it may just be noise. A web browser can conceivably connect to any website connected to the internet, depending on the desires and actions of the user of the web browser.

Performing a detailed characterization of the web browser as a whole in terms of network destinations it connects to may have little value in detecting potential or actual compromise of the device or the user's data or privacy. Rather, characterizing particular websites or web applications specifically identified, or determined to be examples of web applications in a particular category, such as financial or commerce web applications, is of more value. Such characterization of web applications has been previously described.

In other words, there may be a large amount of data that can be collected. Collecting such a large volume of data can, in reasonable networks, and reasonable devices, adversely impact network and device performance. The network, device, or both may crash. Simply gathering the data would be very expensive.

Thus, in a specific implementation, a feature of the system includes a variable aperture. A variable aperture can be implemented using any number of techniques, some of which are discussed in U.S. Pat. No. 8,347,386 and applications related to the '386 patent.

More particularly, in a specific implementation, a device gathers a default set of data. In this specific implementation, the server can send commands to the device that instruct the device to gather more or less data. In another specific implementation, a device will characterize an application at a higher level of aperture, a higher level of data for the first epoch, say for the first week or two weeks, and then subsequent checkins will contain less and less data.

A method may include gathering a first quantity of data associated with an application during a first time period, characterizing the application based on the first quantity of data, gathering a second quantity of data associated with the application during a second time period, and re-characterizing the application based on the second quantity of data. The first quantity of data may be greater than the second quantity of data, and the second time period may be after the first time period. A duration of the first time period may be the same as or different from a duration of the second time period.

The initial characterization of the application using the first data may result in the application program being allowed to execute on a computing device. For example, the initial characterization may indicate that the application is not malware. The subsequent re-characterization of the application using the second data, however, may indicate that the application program is malware. Thus, after the subsequent re-characterization, the application program may be prevented from executing on the computing device.

Conversely, the initial characterization of the application using the first data may result in the application not being allowed to execute on a computing device. The subsequent re-characterization of the application program using the second data, however, may indicate that the application program is not malware. Thus, after the subsequent re-characterization, the application program may be allowed to execute on the computing device.

In another specific implementation, the device attempts to characterize a given piece of itself or an application then only sends deltas in the behavior. Consider, as an example, that a particular application talks to or makes connections to these ten servers. If the servers do not change, the system does not record anything else. Whereas only on change does the characterization change. That can be flipped on its head and the server can characterize an application and tell the device, what the server believes this application does, here is the bound, it talks to these servers, gets location only in the foreground, and doesn't access anything else on the device.

A method may include characterizing an application to generate a characterization model of the application, monitoring application activity, comparing the application activity to the characterization model, determining whether there is a difference between the application activity and the activity expected by the characterization model, if there is a difference, then transmitting the difference to a server.

In another specific implementation, the system provides for a compact and efficient and reasonable way for representing a model or diagram for the herd. The model allows for judicious checking such that the model does not need to be checked for every aspect on every device all the time. Rather, the model allows for periodic checks that are sufficient to conclude that further action is not required. The checks, actions, or both may relate to risk level, to other changes on the system which may trigger monitor level changes. The system provides techniques to fast path checking so that if the behavior is the normal behavior, no or relatively few actions need to be taken.

In a specific implementation, the system statistically samples and frequently monitors almost everything across at least some devices, but on average for any one individual device very little is to be monitored. The cost of monitoring is amortized across the entire base of similar devices and installations. This can extend to the amortization of different types of monitoring across different devices; e.g., on these thousand devices the system only monitors file system access for App X; on that thousand devices the system only monitors network connections for App X.

In a specific implementation, the system can further reduce the monitoring load using probabilistic techniques. For example, if monitoring network destinations of an app to characterize network behavior, the system can have set a threshold probability, e.g., 0.01, for performing the monitoring and measurement.

When the system is ready to monitor then event, the system rapidly generates a random or pseudo-random number in the range of 0 to 1 and if it is lower than the threshold only then does it perform the monitoring activity. If the app being monitored is one that is installed on millions of monitored devices, then a statistically valid characterization of the app's behavior can be accomplished across the entire population of app installations with a tunable overhead that is as low as desired.

In an embodiment the system may decide to monitor some elements only when the current device cpu load or network usage or associated network costs are low thus minimizing the impact of monitoring on an individual device. E.g., if the current cpu busy is measured from 0 (not busy) to 1 (busy) in a recent time interval the system can for example set a probabilistic monitoring threshold to the value (1−cpubusy). Thus some monitoring can still occur at any time but is usually activated only when such monitoring activity will not impact the device operation nor associated costs, e.g., for network data usage charges.

There can be combinations of monitoring levels and monitoring types. Techniques including Latin Squares, and other techniques used in the design of experiments to make selections may be adapted to reducing the individual monitoring on any one device. So, e.g., system is monitoring app X on this device already so the system won't monitor anything else (no other apps) on that device. And the system can change which devices get which monitoring roles over time (changed sample selection); and can rotate devices in and out of the being-monitored/sampled pool, so no device gets monitored this way all the time (for the purposes of app characterization).

There can be variable levels of monitoring for only the most severe sorts of things. For example, the server may not monitor network connections but may monitor access to the file system and location data, or other contents for popular applications, whereas the system may do full characterization for other applications if there is a high CPU penalty.

As discussed above, FIG. 10 shows a flow example of policies used in monitoring, evaluating, and responding. In step 1010, first policies are distributed to a set of computing devices. Distributing the first policies may include pre-installing the first policies on the computing devices, transmitting the first policies from a server to a device after the device has been purchased by a user, or installing the first policies onto a device from a local computing device or product (e.g., from a memory card, or from a desktop computer). In a specific implementation, the computing devices may be associated with a particular organization, company, or enterprise. The distribution of the first polices may be through an administrator of the organization.

As discussed, in step 1015, data (e.g., observations) responsive to the first policies is collected at server. A norm is established using the collected data (step 1020). In step 1025, a determination is made that activity associated with a first computing device is outside the norm. That is, an anomaly is detected. The activity may violate the established norm by falling above the norm or below the norm by a predetermined value or threshold.

In a step 1030, a response is initiated. In a specific implementation, the response includes transmitting a second policy to the first computing device to replace the first policy. The second policy may, for example, modify, alter, or change the monitoring of the first computing device.

Depending upon the evaluation, the second policy may specify increased monitoring of the first computing device. Alternatively, the second policy may specify decreased monitoring of the first computing device.

Increased monitoring may be appropriate when the system has a suspicion of malicious activity. Increasing the monitoring allows for the collection of additional data before making a final determination of there being or there not being malicious activity. Decreased monitoring may be appropriate when there is an extremely low likelihood of malicious activity. Decreasing the monitoring allows for conservation of computing resources (e.g., storage, battery, processing cycles, or network bandwidth). There can be other types of responses as discussed elsewhere in this patent application.

Figure 11:
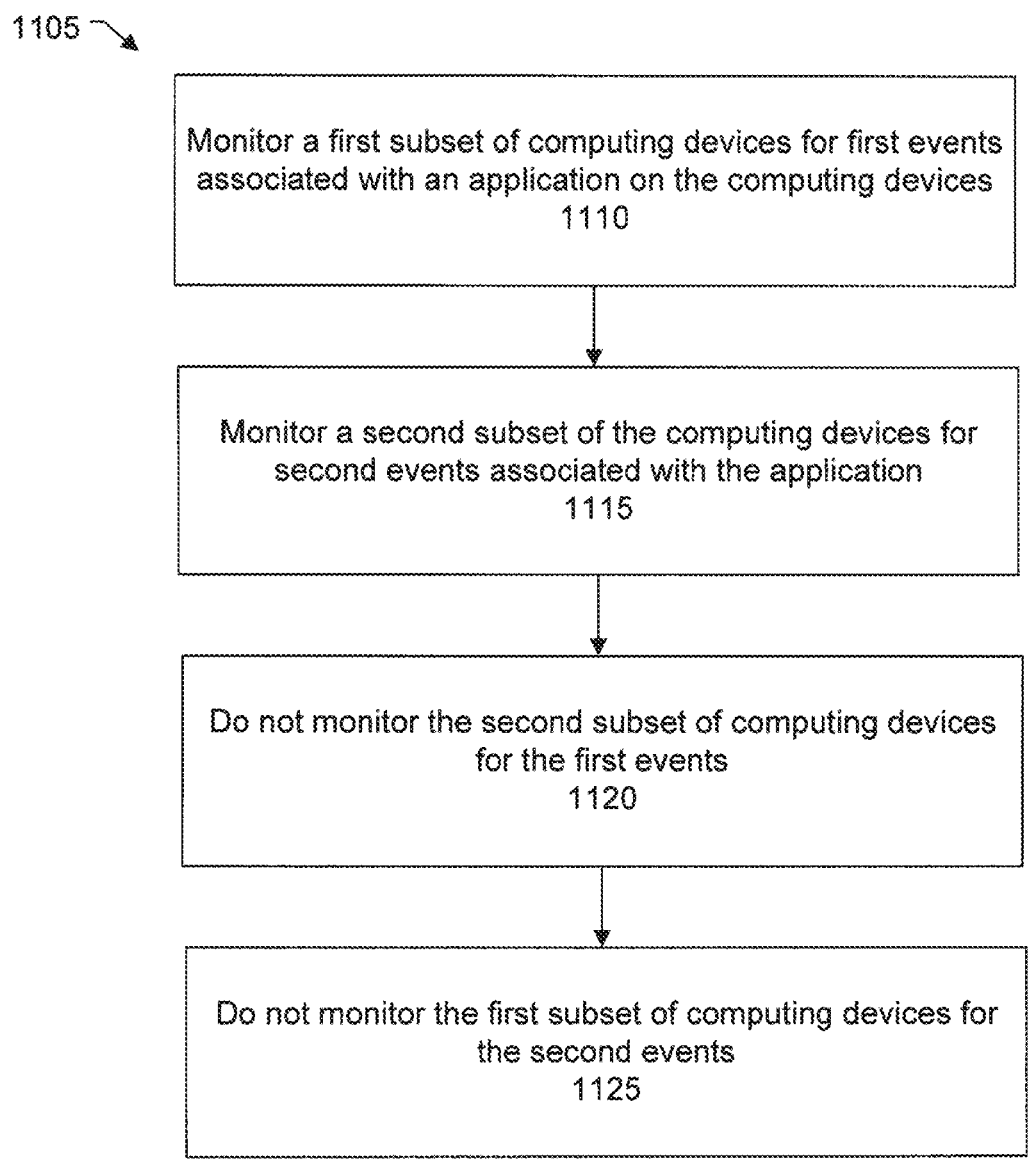
FIG. 11 shows a flow diagram for amortizing the cost of monitoring across two or more devices.

FIG. 11 shows a flow 1105 of a specific implementation for amortizing the cost of monitoring over a set of computing devices. As shown in the example of FIG. 11, a method may include monitoring a first subset of a set of computing devices for first events associated with an application program on the set of computing devices (step 1110), and monitoring a second subset of the set of computing devices for second events associated with the application program (step 1115). The second subset of computing devices may not be monitored for the first events (step 1120). The first subset of computing devices may not be monitored for the second events (1125). The first events may include file system accesses for the application. The second events may include network connections for the application.

In another specific implementation, the method further includes after the monitoring a first subset of computing device for first events associated with an application program, not monitoring the first subset of computing for the first events, and monitoring the first subset for the second events associated with the application program.

In another specific implementation, the popularity of an app (application) is the signal. For example, assume that monitoring of a thousand devices is desirable in order to significantly and statistically characterize an application's behavior. The system may, after a thousand devices' worth of data (e.g., a thousand devices having monitored this binary), terminate the monitoring. That is, any device above 1,000 is not monitored. There can be a desire to characterize a device's typical behavior. If vulnerabilities are a concern, then the system can monitor from a thousand and just feed back the model of the boundaries that saw from that set and only if an application exceeds its boundaries is the server alerted. A method may include monitoring computing devices until a predetermined number of computing devices to monitor has been reached.

In this specific implementation, because there is such a thin tail, the most popular applications are on a large number of devices, the actual monitoring load on a device can be drastically reduced. For example, consider Instagram, Facebook, and Chrome. If the full characterization from a thousand devices has been generated, the vast majority of devices in the world may not actually need to do any monitoring other than boundaries. In other words, here's what this process normally does, only alert the server if it exceeds those boundaries.

A method may include monitoring a set of computing devices to generate a model of an application program that has been installed on each computing device. The method may further include when a number of computing devices that have been monitored reaches a threshold, terminating the monitoring, providing the model to a first computing device that has the application program installed and that has not been monitored, instructing the first computing device to compare the model to activity associated with the application program installed on the first mobile, and if the comparison indicates a difference between the model and the activity, receiving from the first computing device an indication of the difference.

Alternatively, if the desire includes characterizing applications and not intrusion detection, the system may refrain from acting on those applications because the server already knows how to characterize it. Any application that is good as determined by a manual reviewer, signed by a known good signer, say Google signing key, the system may choose to do no characterization because it's from a known developer. So, the system may not be concerned about it.

A method may include identifying an application program on a computing device, determining whether attributes associated with the application program satisfies criteria for not monitoring, if the application program satisfies the criteria for not monitoring, not monitoring the application program, and if the application program does not satisfying the criteria for not monitoring, monitoring the application program. The criteria for not monitoring may include one or more of first criteria indicating whether or not the application program has been manually reviewed, or second criteria indicating whether or not the application program has been signed by a signer categorized as good.

There can be different attributes to monitor on different devices to help amortize individual measurements/monitors across different devices. In a specific implementation, the system dynamically adjusts monitoring, transmitting data, or both based on current costs as viewed from the perspective of an individual device. Costs can include the cost of monitoring (measured in terms of the increase in cpu load on the device or increased latency in the monitored operation), the cost of sending (measured in terms of a fraction of available bandwidth or the monetary cost for the transmission of particular amount of collected data when data usage is metered), or both.

For example, a device may only have two applications under monitor. Another person (or device) may have another two. Or all devices may have all applications under monitor but the system may be monitoring different things from each application. And that depends on what is the cost of monitoring. If the system finds that the cost of monitoring is not very high, whereas the cost of sending data is higher, or it's simply the ability to store the data on the device side or on the server side is higher, then it might be different.

The system's ability to monitor may depend on device permissions. The system's ability to monitor may be dependent on various characteristics of the device. For example, in a preloaded embodiment, the system can monitor more data than in non-preloaded embodiment. Similarly, if the system is on a device where access to the root is permitted, where there is, for example, a superuser app installed, or a jailbroken iPhone, the system's ability to monitor is different. However, the system may see across a network of devices, the same application under both high privilege circumstances and low privilege circumstances.

In a specific implementation, the system itself determines what sorts or types of information to can monitor. The system can choose to monitor more from the high permission devices as compared to the low permission devices. So, rather than choosing, for example, a thousand of the million people who had this application installed to monitor, the system is smart and can conclude, for example, that from these ten thousand devices more data can be obtained than these 990,000 devices. Therefore, the system may choose to monitor those ten thousand devices, because the system can get more data from them, whereas if the system just randomly samples them, the system may be on very few devices where a lot of data can be obtained.

A method may include examining a first level of permissions available on first computing devices, examining a second level of permissions available on second computing devices, determining that the first level of permissions are greater than the second level of permissions, and based on the determination, monitoring the first computing devices at a degree greater than the second computing devices. A number of computing devices of the first computing device may be less than a number of computing devices of the second computing devices.

There can be choosing which devices to monitor based on the types or quantities or varieties of information that it is possible to monitor on those devices. And that can be something that is based on factors such as is this running in a privileged mode or not, or device reports what it can monitor, and the server selects what information it needs from the available devices that can monitor it. This can avoid sandboxing and other sorts of issues. This feature further allows the system to operate in a world where there are varying levels of ability to monitor across the device space.

There can be user-level "opt in" choices for what or how much or how frequent they are willing to have monitored, or how much resource they are willing to have monitored, or different levels of monitoring depending on current battery or other resource state (bandwidth/data limits, etc.)). So on preloaded devices or devices where the system is built into the kernel, the system can provide comprehensive monitoring.

A method may include monitoring a computing device, detecting that a resource state of the computing device has changed, and adjusting the monitoring of the computing device in response to the change. Adjusting the monitoring may include decreasing or increasing the monitoring.

For example, the resource may include a battery. The state change may include a power level of the battery decreasing or falling below a threshold power level. In response to the battery decreasing to below the threshold power level, the system can reduce the monitoring to help conserve the remaining battery power. Alternatively, the system may detect an increasing level of charge in the battery. For example, the computing device may be plugged into an outlet. In this case, the system can increase the monitoring to help gather additional data for a comprehensive analysis.

As another example, the resource may include network bandwidth. The state change may include usage of the network exceeding a threshold level. In response to the usage exceeding the threshold level, the system can reduce monitoring to help ensure that the user does not incur data usage overcharges.

There can be privacy settings or a policy which prohibit device monitoring activities. The device can include general purpose monitoring features (in hardware, software, or both) which can be used by different applications. For example, a device may include a neural processor (or other processor) that prohibits unsigned models; prohibits models not signed by approved signers; prohibits or limits the number or type of models during particular context situations (see discussion of context in U.S. patent application Ser. No. 13/686, 028); flushes/erases any stored information in a motion or sensor or context management coprocessor or created by such based on policy or triggered context events (e.g. upon entering the corporate premises turn off these capabilities).

Monitoring of behavior can include recording what monitoring models are active, introduced, removed, changed, activated, de-activated, etc.

In a specific implementation, the actual content or a portion of the actual content (of a network transmission or of a data file or of an application executable or any component or media asset of an application) can be gathered. In an embodiment, the structure of the piece of content rather than the actual data or text contained is what may be gathered so as to preserve data privacy.

For example, a network protocol data unit or a file such as a PDF file has a specified data structure, which includes metadata and control fields defining the structure, and data fields which may contain sensitive user data. The system may extract the structural parts of such a piece of content while modifying the portions that contain potentially sensitive text or data (e.g., replacing these portions with constant values or randomly generated values). The resulting modified piece of content can be analyzed for conformance to the specification for a particular type of content; malformed content can be detected.

Many security attacks employ malformed content to exploit vulnerabilities in application or system libraries which process such content, e.g., to perform buffer overflows to allow malware code to execute. This embodiment is used to permit the analysis of the structure of pieces of content, particularly analysis at a server remote from a device containing the piece of content, without having transmitted any of the potentially sensitive data contained within the piece of content; only the structural elements of the piece of content are transmitted to a server for analysis.

Analyzing the collected data to establish a norm (steps 915 and 1020, FIGS. 9 and 10) can include characterizing what is going on in the device (e.g., a DIDS Distributed Intrusion Detection System). The system gathers data from all sorts of devices in the world. The perspectives for analysis can include a single device perspective (e.g., what does this look like from the device/client aspect?) or a server's perspective (e.g., what does this look like from the server's perspective when we see multiple devices?).

In some cases, there will be a sufficient amount of data to quickly make a decision or to take an action in and of themselves. For example, a shared library loaded from a place that shared libraries are never loaded from can be a clear indicator of compromise. As another example, a network connection to a known malicious server can be an indicator of compromise.

In other cases, there may be things that could happen, but they might happen in legitimate situations. A feature of the system provides for a rule or expert system to distinguish between legitimate and illegitimate situations. For example, consider that there is a certain system service that makes a network connection. The device might not actually have a rule that says this is an indicator of compromise, or the server may not even have a rule to say that's an indicator of compromise, however, the observation made is that computing devices operate in herds; they are not individuals.

For example, every Droid Razr Max HD on Verizon has one of several firmware versions and Verizon manages the tiered rollout of new firmware versions. So, the characterization of a given process (let's just say it's a system service that stems from this particular executable in a particular place with a given hash on this device and that carrier) should have a narrow band of characteristics across that entire herd. That executable may operate differently on a different hardware device with a different carrier, but that can be considered "OK", because the server can say, can identify what the groupings are.

For example, the server may categorize, all Motorola devices as being in a particular group, (different levels of centroid can be drawn). This now this becomes an anomaly detection problem. This system can identify and collect functional characteristics from lots of devices. There can be a scoping or correlation to a process, to an application, based on a given segment of those functional characteristics.

The system can determine what are the normal operating characteristics. This allows for presenting vectors that may be of interest, identifying network connections, file 10, accesses to sensitive data or locations, and identifying abilities of an application to make phone calls. While these applications may have the "permissions" to do these things, whether they actually "do it" is/might be depend on the device.

For some classes of apps it may be very dependent on the user or class of user, and the user's particular workload, or type of workload for a class or category of user. If it "is" dependent on the user, what we should expect to see, if your herd is by and large not compromised (the non-compromised devices outweigh the compromised devices), then you should see that if you look at operating characteristic A versus B, if there's a large gap between the percentage of devices having one characteristic, and B is compromised, it should be close to zero.

So you can say if there is a large gap between the percentages of devices having one characteristic versus another characteristic, there are tradeoffs, (e.g., a characteristic being does it access location). If, for example, 99.9 percent of devices do not access location by this particular process or service or executable, versus 0.1 percent that do, then we can determine that 0.1 percent to be an anomaly.

However, if, for example, the ratio is 90 percent versus 10 percent then it may be due to user behavior differences or other factors. So, the system can automatically determine whether an anomaly is significant because there is a large base of users to look around. And this can be, if we predefine what these characteristics are, and gather the data from many devices, as to whether these characteristics are met, then the anomaly determination can be made at the server. And there are many anomalies that are indicators of compromise, and not simply anomalies.

So, put another way, if a device leaves the herd then something is (may be) bad. From there, when an indicator of compromise is detected, that may be directly an indicator to notify an administrator or take a response action, or it may be an input to a model. In an implementation, the model is run locally. In this specific implementation, the device only sends what is not according to the model. It might be an input into the model. For example, a particular indicator of compromise may be noisy. But if such an indicator is detected, plus increased battery drain on the device, then that might be a flag. That is, the combination may be sufficient to notify an administrator. In an implementation, the overall systems goal in a security context is to, with a low false positive and a low false negative rate, to notify administrators or take response actions when something bad happened. The threshold trigger for an anomaly can be configurable such as by a user or administrator.

In a specific implementation, a predictive analytic system is provided to determine whether something bad has happened. The system may also take into consideration the risk level of the device in the past, e.g. if it only downloads apps from a particular trusted source, say Google Play or Apple App Store, the user's risk level may be low. Therefore, the user's sensitivity towards certain anomalies may also be lower later.

So, in a characterization system, there may be a higher threshold to actually take a response action. In contrast, another user may frequently install applications that are not popular or weird or come from untrusted sources. For this user, the threshold may be extremely low, so that even a slight indicator, which on that first or former device, would not trigger a response action, on the second or latter device, that has high risk to it, may trigger a response action.

So put another way, this is the predictive analytics for the likely risk which plays into the decision of whether to take a response action. Predictive analytics can be a forward looking predictive analytics and a backward looking predictive analytics. A predictive analytics system can answer questions such as will this device be compromised, or do we believe this device has been compromised? Which in and of itself may take into account its prior probability to be compromised, based on user behavior and what not.

Another example of the herd is firmware. For example, consider the types of files that make up an operating system's core capabilities, the kernel, various systems libraries, other application libraries and services. Typical mobile phone deployments move as herds. Verizon, as an example, rolls out a new firmware image and they roll it out from 1 percent to 100 percent over the course of two weeks, and they might roll it back if something bad happens.

However, if a device strays from the herd (the lone gazelle) that is usually an indicator of compromise, or an indicator that the person has rooted their phone. Either way, something bad has happened. That can be very hard to identify from the device itself. "My firmware is modified, why did that happen?" It's hard to tell if when looking at one device, whether that was simply because of an update, or that was a big problem.

The server, however, knows what the herd looks like. That is, the server can identify what the difference between that and the herd is. The system can obtain the actual change from the client, analyze what the actual delta between the binaries are, and have a report on what the changed functionality was. There can be alerts, notifications to user, to admin, etc.

So, for example, a new file is dropped in the system partition. From a device perspective, something has changed, but it can be difficult to determine what has changed. The server, however, can determine that the difference between the device and the herd is there's a setuid binary in the system partition. This can generate an alert. As another example, the difference between the device and the herd can be that the device kernel has been modified, and there are three new capabilities in the kernel, that allow it to make network connections. There can be a determination of three new such capabilities. That can be flagged by the system as suspicious. Thus, a feature of the system takes a very, very complex and intractable problem and isolates on exactly the differences that make a particular device stand out from the herd.

The system is an improvement over traditional network-based anomaly detection because network-based anomaly detection only sees network connectivity, and it typically does not see the source of that network activity, and typically is only looking at an aperture of one enterprise, or one network, where oftentimes across the world a given source is consistent in what it does, but, if you don't know the source, then everything looks like an anomaly, if you get a new source in that enterprise that hadn't been there before, it can be difficult to determine whether or not the new source presents a threat.

In a situation in which some monitoring is possible from the network (e.g., in a VPN infrastructure, at a network appliance or server, or in a network switch, or a network operator's infrastructure), the system may switch off some monitoring on the device itself because it can be more efficiently or effectively or completely done from that point in the network; albeit enough monitoring is still ongoing to allow for correlation of on-device monitoring activity with in-network monitoring activity.

For example, deep packet inspection of network transmissions can be a very time and compute intensive operation. It is desirable to do such inspection and monitoring from a network appliance through which the network transmission flows rather than on the sending or receiving device, in order to conserve the limited computation resources on the device. The device may simply monitor that a network transmission is being performed by app A on device D to network destination N at time T. The network appliance R (e.g., router, switch, firewall, etc.) may perform deep packet inspection on a network transmission that it sees going from the device D to network destination N at time T.

An observation collection server can receive the data gathered from device D and network appliance R and correlate the information from both based on them both involving a transmission from device D to network destination N at time T. The data gathered from the device D attributes the network transmission to installed app A, and the data gathered from the network appliance R has detailed results of deep packet inspection on the contents of the network transmission. The result of the correlation provides a more complete picture of monitored activities than would have been possible or feasible from either the device D or the network appliance R alone.

In a situation in which there is a personal constellation including personal mobile devices and/or including sessile devices that are part of the user's IoT (Internet of Things) then some of the monitoring may be, like in the network correlation example above, offloadable to some of those other devices; or these other devices can provide richer monitoring context for the overall system.

For example, a smartphone through which all communication flows from a smartwatch can perform network content analysis for data transmitted from an application running on the smartwatch. Additionally, some enriching associated context information, such as the current geolocation, can be obtained from the connected smartphone (the smartwatch may not have the ability to determine geolocation). Some functions, such as sending monitoring data to a remote monitoring analytics server or reporting to other users or administrators may be performed by a device in such a grouping on behalf of other devices in the grouping. For example, a user's smartwatch communicates only via the user's smartphone, thus the user's smartphone is facilitating the monitoring of the smartwatch. Some or all of the monitoring may be offloaded to network infrastructure.

As discussed above, in a specific implementation, the system generates an audit trail or audit system. The audit records things that happen on the device (e.g., here's what happened on this device, here are the connections made by this device, of all of the behavior on a device attributed to what did it). An audit is useful and valuable. The audit helps to characterize all of the behavior from a device (network connections and so forth) attributed to what did it, and can be used to show device state.

In an implementation, the system combines "what happened" with the "source" of that with the "context" in which it happened. For example, the user was at home at this location when this thing happened; the device was on versus the device was off; it was plugged in or not; it was connected via Wi-Fi vs. cell; and so forth. All these sorts of information in context (e.g. in terms of an insider threat), can be modeled by the system. In a specific implementation, the focus is not trying to look at attacks.

Rather, consider, as an example, that a particular user is doing something funny or strange. There can be a mobile banking app or a very sensitive database. A device may choose to report when a user opens this application and opens this information under what context was it. The context can include what network were they connected to, where were they in the world, was the screen on versus the screen off, was it plugged in versus not, what orientation is the phone in, e.g., all of these things can be signals to did it happen in the background versus when the user is there and attending to the device. In an embodiment the monitoring system on the device or on a server may transmit this additional context information or a security evaluation of the device or both to the app itself, or to a server associated with the app or web app to aid in security or fraud risk evaluation. In an embodiment elements of the monitoring system may be embedded within an app (e.g., as an SDK included in a mobile banking app) to facilitate such an operation.

An audit may further include a record of when was last time the user entered their passcode; if in a multi user device which user was it that did it. The audit may include a picture of the user when this thing happens to verify it was in fact that user. For example, if it's a sensitive database, take a picture of the user when it happens (non-repudiation of actions).

Consider a payroll or a financial transaction that happened. There can be proof for non-repudiation of this, with the context around the event. Thus, if some sort of fraud happened there's non-repudiation; if something bad happened, the system can provide the context around that event, e.g., it was at your home WiFi, the system has the user's picture, the user has logged in versus not, the user was at a restaurant, the phone was in the user's pocket or in the phone's holster, the orientation was vertical and the screen was turned off, and a financial transaction was made. This is an instant change in how a response to the incident is made; that could all be stored on the server side, i.e., an audit log for that device. There can be the prevention of financial transactions or transaction having economic consequences e.g. send premium SMS, from occurring by an application that is not in foreground.

Upon a determination that there has been a deviation from the norm (steps 920 and 1025, FIGS. 9 and 10), the system responds with a response action (steps 925 and 1030). There can be any number of and combinations of response actions. If something bad has been detected, the system may send an email or some other sort of notification to a systems administrator, the end user, or both. Additional response actions can include retrieving an anomalous object from the device, in whole or part, and metadata related to the anomalous object (e.g., filesystem permissions, location within the filesystem, times and dates of creation, update, and last access, etc.) and transmitting the object and related data to a server for remote analysis, evaluation, or classification.

Another example of a response action includes reducing network connectivity on the device. Reducing network connectivity could manifest itself in a number of ways. Consider, as an example, virtual private network (VPN).

Email services in an enterprise VPN may stop authenticating that user and block it. In a specific implementation, terminating the authentication is by a plugin into the VPN architecture or the email server. This could be implemented by proxy. Instead or additionally, it could implemented in an identity services engine (such as ISE by Cisco).

Thus, in an embodiment, the system actually cuts off service availability. The service can be a VPN type service, or an email service, or web access, or login from that device or for that user, until the situation is remediated. The service may be actually cut it off from the network in general. An operator may turn off that device's data connection until they can verify that the device has been cleaned up or remediated. For example, there can be a request sent from server to operator requesting the operator's network turn off that device's data connection from the standpoint of the operator's network infrastructure.

Instead or additionally, there can be an isolation of the data connection to only a certain set of endpoints. Conversely, there can be a restriction of the device that prevents the device from connecting to a certain set of endpoints (e.g., the enterprise infrastructure endpoints). There can be a throttling down of their data connection. An enterprise might choose to remove the device's ability to connect to the enterprise network via 802.1x; Or any other sort of network access control (NAC).

Since the system has characterized the application with a model, a response can be to turn off any connectivity that is outside the model. In an implementation, consumer devices may be allowed more freedom to operate than enterprise devices. That is, enterprise devices may have a hard firewall around an application. The firewall can impose restrictions on the application binary/system service to prevent activity that has not been characterized. In other words, the application is not allowed to do anything the system hasn't already seen.

This could be implemented as a series of SE Linux policies, that's Mandatory Access Control (MAC), where everything on the device has a strict access control. The system characterizes what the device (or application) typically does. The system ensures the device (or application) is not allowed to do anything other than that. A signal of compromise may flip a switch into this firewall mode, or a user choice/selection to have a secure device may decide that. The system's ability to collect data related to behavior of applications, components, system libraries, firmware, sensors, etc. means that the derived notions or norms for behavior can be used to generate such policies for distribution to devices. These policies would enforce that no actions or behaviors which do not conform to the norms of behavior as discovered from a large population of devices will be allowed to occur. Thus, these policies enforce that these apps or components or libraries or sensors behave normally, and deviations from normality is disallowed.

This can be a prohibitively hard problem for someone to manually configure. For example, the new version of Facebook may all of a sudden access contacts. In a legacy mandatory access control model, somebody would have to go in and add the ability to access contacts into that profile. In a world of thousands and thousands of applications that's untenable. However, if the system automatically determines what the herd does. Thus, if, for example, 99 percent of all Facebook applications in the world access contacts, then it's probably OK that contacts are accessed.

In other words, in a specific embodiment, the system does not stop the device from getting compromised, but instead detects when it is compromised, and when it does the system can amputate it. And so the system can characterize what that application should do, so that that new characteristic, let's say there's a browser, and the browser does not ordinarily load SO's (a shared library) from the SD card. A model can include an attribute indicating that the browser is not allowed to load any files from the SD card. It can't open anything. It doesn't normally do this. So, a compromise would try to do that, but fail under mandatory access control. Whereas in an indicator of compromise it might flag that it did something weird, and then take a response action, but the exploit itself still went/happened.

A response may include one or more of increasing monitoring of herd (e.g., increasing monitoring of the specific user, device, or application), decreasing monitoring of herd (e.g., reducing monitoring of the specific user, device, or application), starting monitoring a different component (e.g., start monitoring a different application), stopping monitoring a component (e.g., stop monitoring an application), starting monitoring on different devices for a given application or component, stopping monitoring on different devices for a given application or component, updating policies, alerting an administrator, alerting the user, alerting another user, wiping the device, locking the device, locating the device, blocking an application, changing device settings, backing up data, encrypting data, deleting data, enterprise or system-wide actions, requesting authentication, making predictions about a specific user or application, throttling usage, maintaining the status quo, recommending certain device settings, or suggesting which apps shouldn't be installed A response may be based on the degree or severity of anomaly. A response may include making a connection more secure, or making a connection less secure. U.S. patent application Ser. No. 14/071,366, filed Nov. 4, 2013, discusses techniques for analyzing and establishing network connections having the appropriate level of security for a particular context and is incorporated by reference.

In a specific implementation, a method includes developing resource usage models derived from the set of all users or devices employing the same configuration of devices, components, hardware, locations, applications, or combinations of these. In this specific implementation, the system can proactively identify devices that are performing out of spec and generate offers to the user to replace them.

In some cases, a user may not be aware that the device performance is outside of the norm or is outside of the specifications. A device may have a manufacturing issue or other defect that adversely affects the performance of the device. The defect, however, may not be so serious as to completely render the device useless. Nonetheless, the user may not be obtaining the full benefit and features of the device because of the defect.

For example, there can be a manufacturing defect that causes the batteries to drain rapidly, a defect that causes longer charging times for the device battery, a defect that causes a reduction in WiFi signal strength, and so forth. An offer to replace a device that is performing outside of specifications can include an explanation of the defect, a performance comparison of the user's device with other non-defective devices, information on how to obtain a replacement device, or combinations of these.

Some examples of a performance comparison include a comparison of the device's battery life versus the battery life of other non-defective devices, a comparison of the device's battery charging time versus the battery charging time of other non-defective devices, and so forth. The comparison can be in the form of a chart such as a bar chart. For example, a height of a first bar of a bar chart may indicate the charging time of the user's device. A height of a second bar, adjacent the first bar, of the bar chart may indicate the charging time of other devices.

An offer may include text, graphics (e.g., comparison chart), or both. An offer may be transmitted to the user as a text message, email, voice message, or combinations of these. U.S. patent application Ser. No. 13/960,585, which is incorporated by reference, provides a further discussion of generating offers for replacing computing devices.

In a specific implementation, a device is provided with one or more probes. The probes monitor some aspect of what is going on in the device, and funnel up/send a stream of event data to a service. The service may be referred to as ETS (event telemetry service). Event data can include security events. Current security event reporting services are inadequate. In this specific implementation, an independent service is provided that takes all this event telemetry and funnels the data off to a database. The database can be queried live. The system can generate queries for detections today, or in this range of time, and so forth. The database can be a relational database. In an embodiment there can be multiple such databases, some of which are associated with a particular organization or enterprise and which are collecting data from that organization's or enterprise's devices, and others of which may be collecting data from other devices. The systems containing these databases can be connected to share anonymized data gathered from a larger population of devices to facilitate analysis and evaluation, determination of norms of behavior, assessment of application prevalence, etc.

In another specific implementation, techniques are provided for fingerprinting, and more particularly, firmware fingerprinting. Data can be obtained about firmware versions on devices. In some cases, the data is incomplete. For example, there may not be firmware history. A complete set of things that identify a piece of firmware and how they change over time is desirable because it allows for watching for vulnerabilities over time.

Fingerprinting all the files on the firmware allows for generating and examining the clusters of things that line up and things that don't. The system can assess legitimate firmware updates. The system may determine, for example, that a firmware version appears to be the same as another firmware version, but has these three files that don't belong there. Further analysis by the system can answer questions such as, what are they, and why do they exist? The system can identify things.

This specific implementation of the system may be referred to as a DIDS Distributed Host Intrusion Detection System. In this specific implementation, there is an army of things feeding the system data about what is out there. This allows for the examination and detection of outliers. The system provides the ability to gather network activity. The system may be referred to as a Network Intrusion Detection System (NIDS). In effect, the system is actually a Distributed NIDS. In a specific implementation, a method includes spinning up an army of emulators to do this to run code. In another specific implementation, a method includes gathering the data from real live devices. Gathering data from real live devices can be more desirable because real interactions are happening. Endpoint address, rather than content, may be collected.

A specific implementation of the system maps UID back to a process, and maps the process to a particular executable object; on and Android system this includes mapping to an Android package name. In this specific implementation, barring shared UIDs, the system maps an application (app) to a network connection. In a specific implementation, the mapping is performed in an unprivileged context.

In another specific implementation, the mapping is performed in a privileged context (e.g., root). In a privileged context like root there can be fingerprinting key kernel structures; monitoring network traffic; and applying signatures. The mapping may include mapping out process memory; identifying new memory segments that come into play that are abnormal for something or changed permissions on memory mapping. For example, there may be an exploit running that's trying to expand its hold on the system. Mapping process memory can include what code is loaded from the original binary executable(s), from shared libraries, where in the filesystem these shared libraries are located (file path and permissions, or on an external device of SD memory card), a hash of all code loaded into the process or a hash of just the base image, signing identifiers, names, version and build information, etc. Mapping process memory can also include information about what forms of interprocess communication or shared memory may be active from a process to other processes.

A method may include mapping of kernel modules that is facilitated by a privileged executive process. The mapping may include a splitting into two or more chunks. A first chunk of process operates a low privilege level. A second chunk of process operates at a high privilege level, and can take certain actions and feed data back to the low side. The splitting process can include chunks that operate at the kernel level versus the user level, or as a privileged executive process vs. part of the unprivileged core. For example, if a task includes opening a file that is in/root/foo it's not readable e.g., if I want to open a file in root's home directory; . . . or a particular/dev/mem (or/dev/kmem). A request can be made to the privileged component to do that and it will open a file descriptor and pass that back to the system as an open file handle that the system can read from, that the system can do something with even though this was generally not readable. "Openssh" is an example of a program that uses privilege separated process to separate its tasks into separate processes with only the specific privileges required to perform each individual task. It included Inter-Process Communication (IPC) channels to operate at different privilege levels. Privilege separation is a technique to reduce the likelihood of or damage from a computer security attack. The system provides a number of techniques to do this without increasing the attack surface.

In another specific implementation, an Event Distribution Fabric or Event Telemetry System (ETS) is provided. In this specific implementation, there are channelized data feeds. The ETS itself becomes a generic frontend for routing this chunk of data, ID of device, and a named channel that is feed it to, and a pluggable system back here, where desired components can be plug and play on these channels; e.g., over here the system can funnel this off into a database . . . or over here the system can aggregate this into a data warehouse view.

Consider, as an example, an app install event. The event can be funneled off into a server-side data store and analysis platform for determining app presence but also into the app presence dataset bucketed by geolocation. There can be a pub/sub type distribution. In a specific implementation, a Twitter Storm (a distributed, fault-tolerant, real-time computation system useful for performing real-time analytic activities such as stream data mining) is employed as opposed to traditional message queues to deal with high volume. Other competent methods for performing analytics in the face of high volume, velocity, and variety of data can be employed. Alternatively, multicast on a network may be used to simplify distribution of data to multiple analytical engines.

A feature of the system provides for a generalized architecture that facilitates data point plus analytics on it. The framework is established and components can be added or bolted to the framework as desired. For example, there can be a detection event component that may be connected to the framework. Other examples of components that may be added include the System on a Chip ("SOC") monitoring or tracing service. Providing continuous monitoring for people regardless of which device or devices they are using is a Managed Service Provider (MSP) service. There can be an associated Service Level Agreement (SLA). There can be apps with low prevalence. The system facilitates scale of processing. Aspects of the system include a service for an enterprise. The system can facilitate machine to machine (M2M) communication.

This patent application describes a system for monitoring, evaluating, and responding in connection with security. Aspects of the system, however, are applicable to non-security applications such as indoor location tracking, car crash detection, telematics, and the IoT (Internet of Things).

Figure 12:
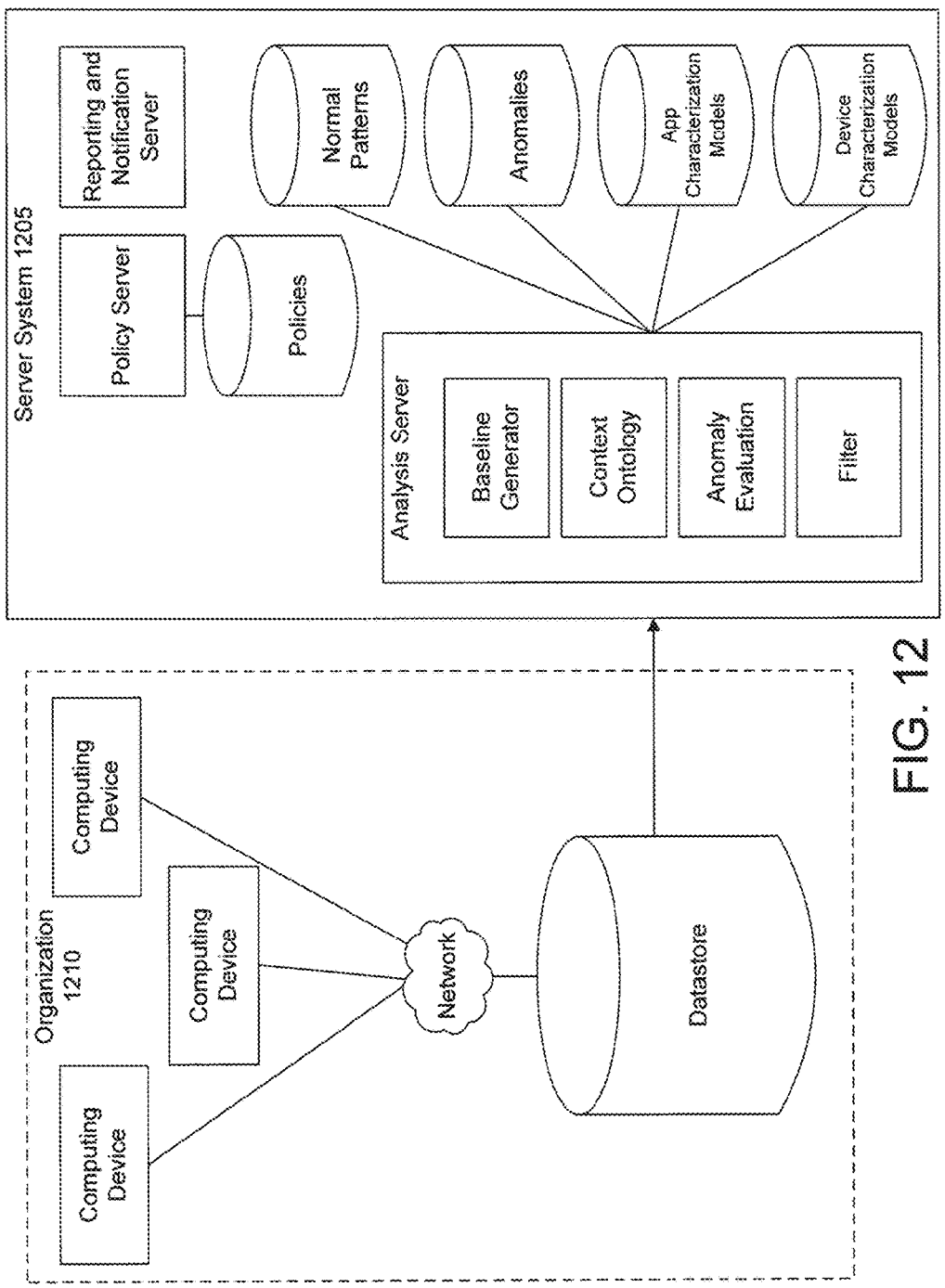
FIG. 12 shows a block diagram of another specific implementation of a system for device monitoring, evaluation, and response.

FIG. 12 shows a block diagram of an environment in which another specific implementation of a monitoring system may be implemented. This implementation is similar to the implementation shown in FIG. 7. In this specific implementation, however, a system 1205 analyzes data collected by an external or third party system 1210. For example, the third party system may belong to a particular organization or enterprise.

Figure 13:
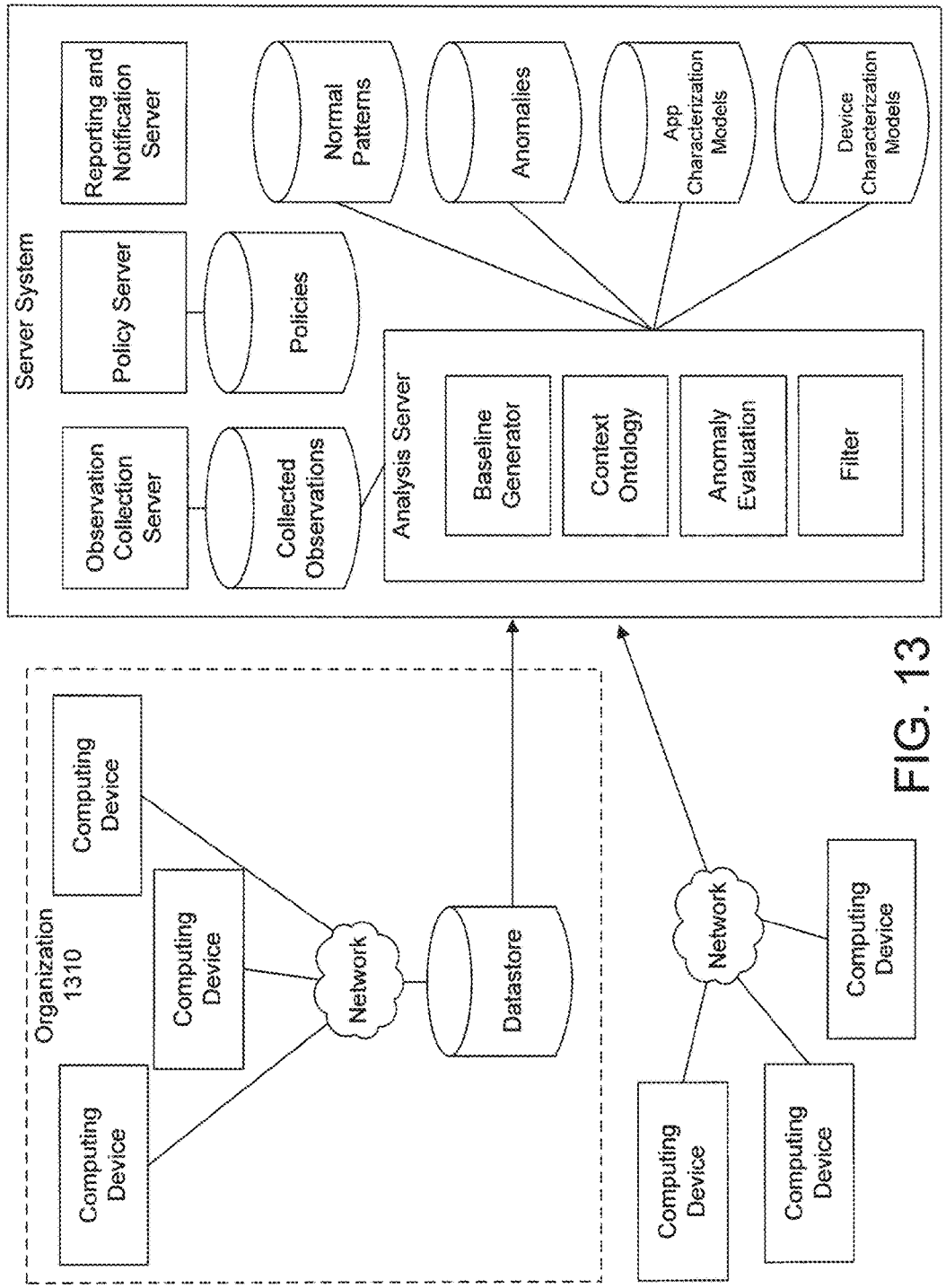
FIG. 13 shows a block diagram of another specific implementation of a system for device monitoring, evaluation, and response.

FIG. 13 shows a block diagram of an environment in which another specific implementation of a monitoring system may be implemented. This implementation is similar to the implementations show in FIGS. 7 and 12. In this specific implementation, however, a system 1305 analyzes both data collected within the system (e.g., via central collection server) and data collected externally such as by a third party system 1310.

In various specific implementations, a system stores collected data into a database, a system stores specific data for devices/appls/components for an enterprise or organization into that organization's database, or a system stores anonymized data for devices/appls/components into a shared database. An analysis may include analyzing using data in the organization's database, analyzing using data in the shared database, or analyzing using data in both databases. There can be a promotion to a shared database analysis on data in the organization's database. Alerts to an administrator may be based on data in the organization's database or shared databases.

Figure 14:
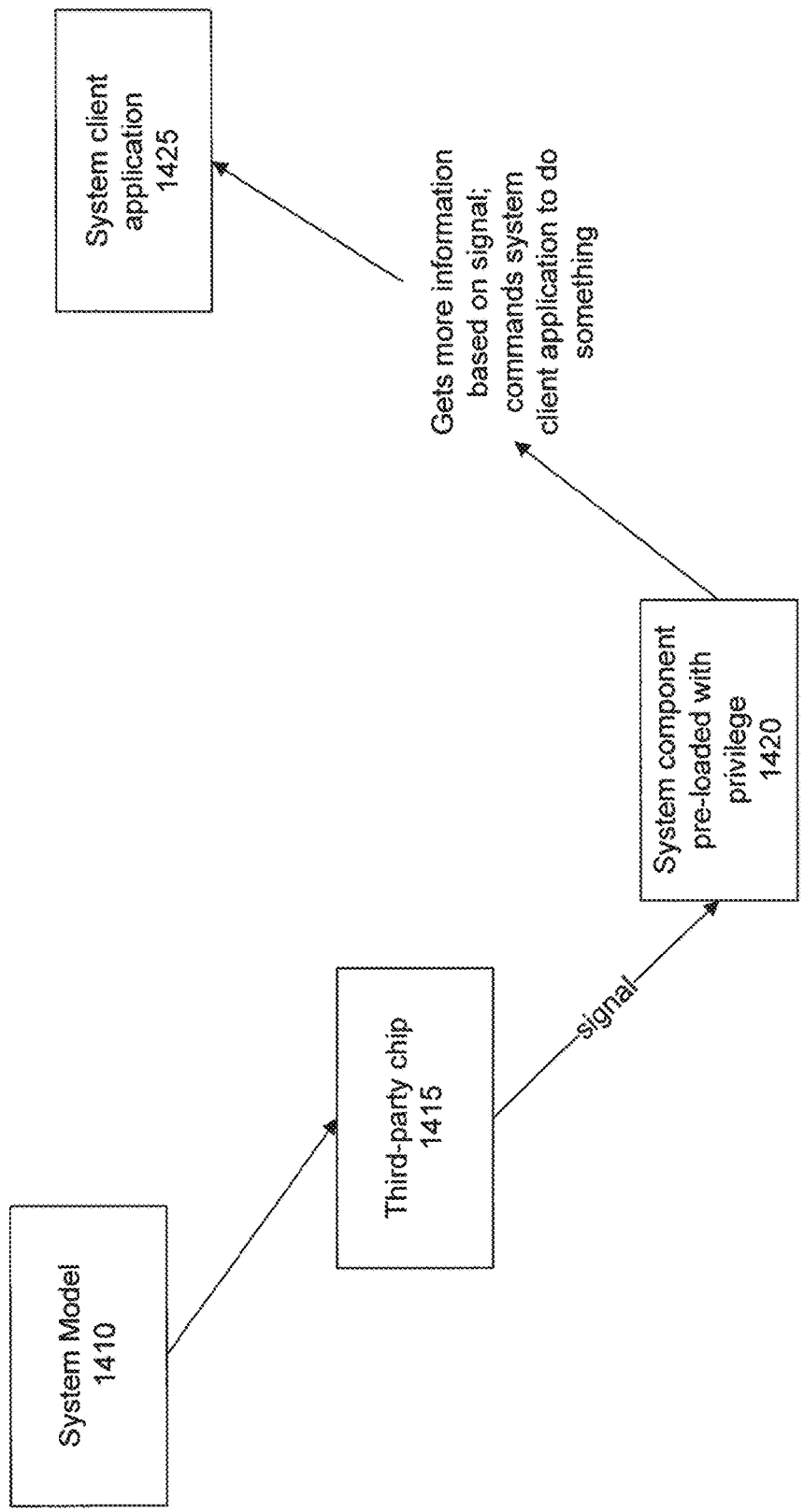
FIG. 14 shows a block diagram of a specific implementation of a "complete solution" for device monitoring, evaluation, and response.

FIG. 14 shows a flow diagram of another specific embodiment of a system for monitoring, evaluating, and responding. In this specific embodiment, a "complete solution" is shown as involving more than just the "signals" that can be emitted from a third-party solution using the system model. In this specific embodiment, a whole solution includes a system model 1410, a third-party chip 1415, a system component pre-loaded with privilege 1420, and a system client application 1425. This specific embodiment t provides for transforming static criteria into models dynamically, such as at run-time. New models, modified models, or both can be added into the detection system. The third-party chip may be supplied by, for example, Qualcomm.

Fingerprinting of a Device for Herd Analysis

The individual devices of a herd may be fingerprinted to assist with the evaluation of the herd devices, i.e., the devices that are associated with a particular herd. A herd may be, for example, a group of users, a group of devices, a group of applications, or a group of websites. Thus, devices that are associated with a herd may be devices associated with a group of users, such as a fleet of devices associated with an enterprise. Similarly, devices that are associated with a herd may be devices associated with a maker of devices, such as devices made by a particular manufacturer. Furthermore, devices associated with a herd may be devices associated with a particular application, such as an operating system. A device may be fingerprinted in many ways, such as using one or more of the following: hardware identifiers collected from the device, cryptographic verification of the contents of files in firmware, information about firmware files and their attributes, and any other fingerprinting method discussed within this application.

Upon gathering fingerprint data from the devices of a herd, the gathered data may be analyzed to determine one or more characteristics that that are shared—characteristics that are consistent or normal for the herd devices. For example, the analysis of herd data may indicate that certain firmware files are present on all or a vast majority of herd devices. Then, data gathered from an individual herd device may be compared to the determined herd characteristics or norms, in this example the presence of the shared filed. If that comparison detects that the individual herd device is somehow anomalous in comparison to the herd, e.g., the device is missing the certain firmware files, or that the certain firmware files are hidden, that detected anomaly constitutes a possible indicator that the device is compromised.

An anomaly may be any difference between the individual device and the herd devices. This includes, e.g.: any difference in files (e.g., a file is present in the herd devices, but missing from the individual device, or vice versa); differences between attributes or contents (e.g., a file length is different, a file hash is different, a file flag or permission is different (e.g.: UNIX-style flags such as "rwx"; read/write/execute permissions for user, group, or public; and special file permissions such as the "setuid," "setgid," and "sticky bit"); and differences in how a device stores a file (e.g., the file is hidden).

In particular, a firmware file that is characteristically present in the herd devices but missing from a particular device of the herd is an example of an indicator of compromise. Indications of compromise (like any result from other tests, probes, data collections, fingerprinting operations, comparisons, or determinations) may be reported, as described above, to, e.g.: a user of the device, an administrator, an identity service, a security broker, and an app-based or cloud-based provider of a service. An indicator of compromise may be the basis for changing the risk level of a device. One indicator of compromise may be considered less indicative of risk than one or more other indicators of compromise. Thus, a single indicator of compromise may not change the risk level of a device, or may not change the risk level of the device as much as if several indicators of compromise were detected, or as much as if a different indicator of compromise were detected.

The fingerprinting of a device may also be accomplished by performing probes or tests to detect different behavior by device contents, e.g., device firmware. In such cases the "fingerprint" may be a pattern or result of the device's actions rather than the content of its files, or the identifiers of its components. For example, an attacker may have modified components of the firmware or OS dealing with filesystem operations in an attempt to deceive an observer regarding what is really in a file system. The attempted deception may have been intended to prevent the detection of certain files or to prevent the detection of changed attributes or contents of certain files. Such deceptive modifications may be discovered by probing the device.

In embodiments, probes or tests may be performed regarding normal case behavior, edge case behavior, and error case behavior.

In an embodiment, a probe of normal case behavior includes performing a normal case operation on a particular device and detecting whether the behavior and results from the device correspond to those expected if the same operation had been performed on other devices of the herd. The "expected" behavior or results may be obtained from, e.g., performing the same operation on one or more of the herd devices, and from knowledge of the functioning of the normal case. Any particular normal case operation, e.g., use of an API or system call ("syscall"), may be a basis for a probe or test used to fingerprint behavior. If a result or a behavior is not as expected, then that may be an indication of compromise.

In an example of an embodiment of a probe of normal case behavior, a file is created and written to a particular location. The probe then examines whether the file appears in a normal filesystem interrogation. If the file does not appear in the interrogation as expected, then that is an indication the device is compromised. In a similar example, file content is written to a file in a particular location. The probe then examines whether the file has the just-written file contents. If the file content is not as expected, then that is an indication of compromise.

If an attacker has modified a component in an API or for a system call in order to hide information or behavior, an edge case probe or error case probe (or both) may be able to detect that modification where a normal case probe would not, e.g., because the modification itself changes the normal case.

In an embodiment, a probe of edge case behavior includes performing an edge case operation on a particular device and detecting whether the behavior and results from the device are the same as if the same operation had been performed on the other devices of the herd. Examples of edge case operations include complicated or seldomly-used operations of an API or system call. Examples of edge case operations also include otherwise-normal case operations with edge case conditions or parameters. As with normal case probes, the "expected" behavior or results in a probe of an edge case may be obtained from performing the same operation on one or more of the herd devices, and from knowledge of the functioning of the edge case operation, conditions, and parameters. In addition, for some edge cases based on edge case parameters and conditions and an otherwise-normal case operation, the expected results may be obtained by using normal case versions of the edge case conditions or parameters in the otherwise-normal case operation being probed. If the result of the edge case operation on the particular device is different from a result obtained using the otherwise-normal case operation on the particular device, then that is an indication of compromise of the particular device.

In an example of an edge case probe, a file operation is performed (e.g., list contents of a directory or navigate to a file) using an edge case (e.g., a complicated or relative file path, such as/usr/./../usr/./bin/./) and the probe determines whether the results match the same operation using a normal case (e.g., a simple path, such as/user/bin/).

Another example of an edge case probe is a probe involving the use of symbolic links ("symlinks"). An attacker having modified the normal filesystem operation may not have properly implemented deception regarding symbolic link operations. A probe may create a new symbolic link to an existing file and use the new symbolic link to perform a file operation. The probe may then compare the results of using the symbolic link to results obtained from performing the file operation without having used the symbolic link (having accessed the file directly). The results from having accessed the file directly may be obtained from performing the operation on the particular device, or from performing the operation on one or more devices of the herd. If a result of using the new symbolic on the particular device is different from a result obtained from accessing the file directly on the particular device, then that is an indication of compromise of the particular device.

In an embodiment, a probe of error case behavior includes performing an error case operation on a particular device and detecting whether the behavior or results from the particular device are the same as if the same operation had been performed on other devices of the herd, e.g., the operation results in an error condition or failure. If a result of error case operation on the particular device is different from a result obtained from the error case operation on other devices of the herd, then that is an indication of compromise of the particular device.

In an embodiment, a probe may attempt to perform a system call that is normally implemented in firmware to determine whether it is still implemented and performs as expected. If an implementation of the system call does not exist, then that is an indication of compromise. In an embodiment, a probe may attempt to perform a system call that is not normally implemented in the firmware to determine whether an implementation of that system call exists. If an implementation exists then that is an indication of compromise.

In an embodiment, a device may have a secure processing facility (such as a trusted execution environment (TEE) or secure enclave processor (SEP)) that may perform computations. Such a secure processing facility may be separate from the general purpose processor in the device or may be a secure area of the main processor. In either case, the secure processing facility may run its own copy of an operating system or a different operating system. Such a secure processing facility provides a higher level of security for some operations, which may include, but are not limited to, cryptographic operations. Any of the data collection processes, or fingerprinting processes described within this application, may be performed from a secure processing facility on a device.

In an embodiment using a secure processing facility, results from a fingerprinting operation performed from a secure processing facility on a device are compared to results from a fingerprinting operation performed from the general purpose operating system of the same device. If the comparison indicates that the results differ, it is an indicator of compromise of the specific device.

In an embodiment, results from a fingerprinting operation performed from a secure processing facility on a specific device are compared to results from a set of fingerprinting operations performed from secure processing facilities on multiple devices in a group (herd). If the comparison indicates that the results differ, it is an indicator that the specific device is compromised.

Multidimensional Herd Analysis

In some embodiments, a relevant herd may be a sub-set ("sub-herd") of a second herd. In these embodiments, the characteristics and norms of herds and sub-herds may be determined by analysis of fingerprint data (e.g., the presence or absence or files, markers, or behavior) within and between herds and sub-herds of devices. In such embodiments, the choice of the relevant herd may have a determinative impact on whether a specific device exhibits an anomaly.

Examples of herds and sub-herds include but are not limited to:
- Herd: Device manufacturer
  - Sub-herd: Device model
    - Sub-herd: Device model firmware
- Herd: Operating System
  - Sub-herd: Operating System version
- Herd: Chipset manufacturer
  - Sub-herd: Chipset version number
    - Sub-herd: Chipset firmware version
- Herd: Network Operator
  - Sub-herd: Current device connection medium (4G, 3G, EGPRS, WiFi, etc)
- Herd: Device state
  - Sub-herd: Unlocked, locked, airplane mode, etc.
- Herd: User role currently using the device (consumer, enterprise 1 employee, enterprise 2 employee)
  - Sub-herd: User role (consumer—child of a family of consumers)
- Herd: Enterprise fleet (e.g. Intel fleet)
  - Sub-herd: Enterprise sub-fleet (e.g. Sales, HR, Executive, Finance, etc.)

In these embodiments, the relationships between the herds and sub-herds may be used to determine what is, or is not, anomalous. For example, a file or other marker may always be missing from devices in a sub-herd that includes Executives who use iPhones on the AT&T network in the herd of Enterprise 1. That same file or other marker may never be missing from a sub-herd that includes the Finance team members who use iPhones on the AT&T network in the herd of Enterprise 1. Subsequently, if it is detected that the file or other marker is missing from one of the devices belonging to the sub-herd Finance team, then this result is an anomaly relative to sub-herd that includes the Finance team members who use iPhones on the AT&T network in the herd of Enterprise 1. This anomaly is an indication that the device is compromised and may be considered a reason to elevate the risk level associated with that particular Finance team member's device. This elevated risk may be communicated to the administrator console and/or the individual user. On the other hand, should it be detected that that same file or other marker is missing from one of the devices belonging to the sub-herd Executives, then there is no anomaly, as that file or other marked is never found on devices belonging to the Executive sub-herd.

The above embodiment may be applied to an example where a specific encryption engine is used for accessing bank payments. Devices belonging to the Executive sub-herd might not have all of the files or other markers associated with that encryption engine. In contrast, devices belonging to the Finance team sub-herd would be expected to have all those files or other markers. For this reason, the absence of a file or other marker related to the encryption engine from a device of the Finance team sub-herd would be an indicator that the device is compromised.

A similar approach may be applied to any combination of herds and sub-herds. That is, a first group of devices may include devices made by a first device manufacturer, and a second group of devices may include devices associated with a first enterprise. Devices of the first group may or may not be in the second group. Devices of the second group may or may not be in the first group. Thus, the files or other markers (e.g., herd characteristics and norms) of one or both of the groups may be used to determine anomalous behavior of any specific device. Furthermore, any number of herd/group structures and substructures may be used in combination. For example, a specific device may belong to multiple herds and sub-herds, each herd and sub-herd with determined characteristics and norms. To determine whether the specific device is compromised, the fingerprint or behavior of the specific device may be probed, tested, or otherwise compared to each of the characteristics and norms of the herds and sub-herds to which the specific device belongs.

In a determination of an anomaly, where the norm is the presence of a file or marker, the anomaly would be the absence of that file or marker. Conversely, where the norm is the absence, the anomaly would be the presence of the file or marker. The same is true for any data considered in the creation of a fingerprint, herd characteristic, or herd norm. Furthermore, fingerprints, characteristics, and norms may be determined using numerous data points, such as files or other markers, the presence or absence of each being relevant. In other cases, fingerprints, characteristics, and norms may be determined based on a unique combination of data points, e.g., specific files and markers that when found together in a specific device may be considered the norm, or may be considered an anomaly.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A method comprising:
   at a server, based on a first data collection policy, collecting observation data from a plurality of devices, the collected observation data including information associated with at least one of device configuration, device state, and device behavior;
   at the server, determining a normal pattern of activity occurring on the plurality of devices by processing the collected observation data, the normal pattern of activity being associated with at least one of the device configuration, the device state, and the device behavior of the plurality of devices;
   at the server, deriving a second data collection policy from the determined normal pattern of activity occurring on the plurality of devices, the second data collection policy being different from the first data collection policy;
   at the server, based on the derived second data collection policy, collecting first device data from a first device of the plurality of devices;

at the server, comparing the normal pattern of activity occurring on the plurality of devices with a first pattern of activity occurring on the first device, the first pattern of activity being determined using the first device data;
at the server, determining that a deviation between the normal pattern of activity and the first pattern of activity associated with the first device is outside of a threshold deviation; and
upon the determination, generating alert information by the server, wherein the alert information when processed causes performance of a first action on the first device.

2. The method of claim 1, wherein the action on the first device comprises: blocking the first device from accessing a service.

3. The method of claim 1, wherein the action on the first device comprises: transmitting to the first device instructions to uninstall an application program on the first device.

4. The method of claim 1, wherein the step of generating an alert further comprises: transmitting a message to an administrator.

5. The method of claim 1, wherein the observation data collected comprises:
a first set of observation data associated with an organization and collected from a first subset of the plurality of devices associated with the organization, and
a second set of observation data collected from a second subset of the plurality of device not associated with the organization.

6. A method comprising:
at a server, based on a first data collection policy, collecting observation data from a plurality of devices, the collected observation data including information associated with at least one of device configuration, device state, and device behavior;
at the server, determining a normal pattern of activity occurring on the plurality of devices by processing the collected observation data, the normal pattern of activity being associated with at least one of the device configuration, the device state, and the device behavior of the plurality of devices;
at the server, deriving a second data collection policy from the determined normal pattern of activity occurring on the plurality of devices, the second data collection policy being different from the first data collection policy;
at the server, based on the derived second data collection policy, collecting first device data from a first device of the plurality of devices;
at the server, comparing the normal pattern of activity occurring on the plurality of devices with a first pattern of activity occurring on the first device, the first pattern of activity being determined using the first device data;
at the server, determining that a deviation between the normal pattern of activity and the first pattern of activity associated with the first device is outside of a threshold deviation; and
upon the determination, generating alert information by the server, wherein the alert information when processed causes at least one of: the transmitting by the server of a message to an administrator; the blocking of the first device from accessing a service; and transmitting to the first device instructions to uninstall an application program on the first device.

7. The method of claim 6, wherein the observation data collected comprises:

a first set of observation data associated with an organization and collected from a first subset of the plurality of devices associated with the organization, and
a second set of observation data collected from a second subset of the plurality of device not associated with the organization.

8. The method of claim 7, wherein:
the first device is associated with the organization; and
the determining the normal pattern of activity occurring on the plurality of devices by processing the collected observation data comprises processing the collected observation data from the first subset of the plurality of devices and not processing the collected observation data from the second subset of the plurality of devices to determine the normal pattern of activity.

9. A method comprising:
at a server, monitoring a plurality of devices for observation data based on a first data monitoring policy, the monitored observation data including information associated with at least one of device configuration, device state, and device behavior;
at the server, establishing a normal pattern of activity occurring on the plurality of devices based on the monitored observation data, the normal pattern of activity being associated with at least one of the device configuration, the device state, and the device behavior of the plurality of devices;
at the server, deriving a second data monitoring policy from the determined normal pattern of activity occurring on the plurality of devices, the second data monitoring policy being different from the first data monitoring policy;
at the server, based on the derived second data monitoring policy, monitoring a first device of the plurality of devices for first device data;
at the server, comparing the normal pattern of activity occurring on the plurality of devices with a first pattern of activity occurring on the first device, the first pattern of activity being determined by the monitored first device data;
at the server, determining that the first pattern of activity associated with the first device of the plurality of devices is outside of a threshold deviation from the normal pattern of activity; and
upon the determination, modifying the second data monitoring policy for monitoring of the first device by the server.

10. The method of claim 9, wherein the step of modifying the second data monitoring policy comprises:
increasing the monitoring of the first device.

11. The method of claim 9, wherein the step of modifying the second data monitoring policy comprises:
decreasing the monitoring of the first device.

12. The method of claim 9, wherein the normal pattern of activity indicates that a first event occurs during a first context, and the step of determining that activity on the first device is outside the normal pattern of activity comprises:
determining that the first event occurred on the first device during a second context, different from the first context.

13. The method of claim 9, wherein the step of determining that the first pattern of activity on the first device is outside the normal pattern of activity comprises:
receiving from the first device an indication that a shared library has been loaded on the first device from a memory card.

14. The method of claim 9 comprising:
generating a model of characteristics for a specific application program on the plurality of device; and
wherein the step of determining that the first pattern of activity on the first device is outside the normal pattern of activity comprises:
determining that an application program, on the first device and identified as being the same as the specific application program, has a characteristic that is not included in the model of characteristics.

15. The method of claim 9, wherein the step of monitoring the plurality of devices comprises:
monitoring a first subset of the plurality of devices for first events associated with an application program on the plurality of devices; and
monitoring a second subset of the plurality of devices for second events associated with the application program,
wherein the second subset of devices is not monitored for the first events, and the first subset of devices is not monitored for the second events.

16. A method comprising:
at a server, distributing first policies to a plurality of devices, the plurality of devices includes a first device;
at a server, receiving, from the plurality of devices, observation data responsive to the first policies for observation data, the received observation data including information associated with at least one of device configuration, device state, and device behavior;
at the server, determining a normal pattern of activity occurring on the plurality of devices using the received observation data, the normal pattern of activity being associated with at least one of the device configuration, the device state, and the device behavior of the plurality of devices;
at the server, receiving first device data from a first device of the plurality of devices, the first device data being based on a second policy that has been derived from the normal pattern of activity occurring on the plurality of devices;
at the server, determining a first pattern of activity occurring on the first device using the received first device data;
at the server, comparing the normal pattern of activity with the first pattern of activity occurring on the first device;
at the server, determining that the first pattern of activity deviates from the normal pattern of activity outside of a threshold value; and
upon the determination, transmitting by the server, the second policy to the first device to replace the first policy distributed to the first device.

17. The method of claim 16, wherein the first policy specifies collection of a first level of detail, and the second policy specifies collection of a second level of detail greater than the first level of detail.

18. The method of claim 16, wherein the first policy specifies sampling data associated with the first device at a first frequency, and the second policy specifies sampling the data at a second frequency, greater than the first frequency.

19. The method of claim 16, wherein observation data responsive to the first policies has been anonymized to exclude personally identifiable information (PII).

20. The method of claim 16, wherein a violation of the normal pattern of activity is detected when the normal pattern of activity specifies a first sequence of events, and the first pattern of activity specifies a second sequence of the events, different from the first sequence.

* * * * *